United States Patent
Dutronc et al.

(10) Patent No.: US 10,075,321 B2
(45) Date of Patent: Sep. 11, 2018

(54) EXPLOITATION OF FREQUENCY TWISTED WAVES IN WIRELESS COMMUNICATION SYSTEMS TO INCREASE TRANSMISSION CAPACITY THEREOF

(71) Applicant: EUTELSAT S A, Paris (FR)

(72) Inventors: Jacques Dutronc, Paris (FR); Antonio Saitto, Paris (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 15/317,551

(22) PCT Filed: Jun. 10, 2015

(86) PCT No.: PCT/IB2015/001479
§ 371 (c)(1),
(2) Date: Dec. 9, 2016

(87) PCT Pub. No.: WO2015/189703
PCT Pub. Date: Dec. 17, 2015

(65) Prior Publication Data
US 2017/0126459 A1    May 4, 2017

(30) Foreign Application Priority Data
Jun. 10, 2014 (WO) ............... PCT/IB2014/002103

(51) Int. Cl.
*H04L 27/26* (2006.01)
*H04L 5/00* (2006.01)
(Continued)

(52) U.S. Cl.
CPC ....... *H04L 27/2659* (2013.01); *H04B 7/0413* (2013.01); *H04L 5/0007* (2013.01);
(Continued)

(58) Field of Classification Search
CPC ............ H04L 27/2659; H04L 27/2601; H04L 27/2678; H04L 27/2672; H04L 27/266;
(Continued)

(56) References Cited

U.S. PATENT DOCUMENTS 8,891,964 B2* 11/2014 Cvijetic ................. H04J 14/04
398/142
2013/0235744 A1  9/2013 Chen et al.
(Continued)

FOREIGN PATENT DOCUMENTS

GB     2 410 130 A    7/2005
WO   WO 2012/084039 A1   6/2012
(Continued)

OTHER PUBLICATIONS

International Search Report as issued in International Patent Application No. PCT/IB2015/001479, dated Dec. 11, 2015.
(Continued)

*Primary Examiner* — David B. Lugo
(74) *Attorney, Agent, or Firm* — Pillsbury Winthrop Shaw Pittman LLP

(57) ABSTRACT

A system combining OFDM standard modulation with a superimposition of Orbital Angular Momentum modes, each OAM modes consisting in an overlapping decimated IFFTs with the main mode standard OFDM signal. Orthogonality of the OAM modes is assessed. A frame structure embodying both main mode OFDM samples and overlapping OAM modes is proposed.

17 Claims, 36 Drawing Sheets

(51) Int. Cl.
*H04B 7/04* (2017.01)
*H04B 7/0413* (2017.01)

(52) U.S. Cl.
CPC ........ *H04L 5/0048* (2013.01); *H04L 27/2601* (2013.01); *H04L 27/266* (2013.01); *H04L 27/2634* (2013.01); *H04L 27/2639* (2013.01); *H04L 27/2666* (2013.01); *H04L 27/2671* (2013.01); *H04L 27/2672* (2013.01); *H04L 27/2678* (2013.01); *H04L 27/2697* (2013.01)

(58) Field of Classification Search
CPC ............. H04L 27/2666; H04L 27/2671; H04L 27/2634; H04L 27/2697; H04L 27/2639; H04L 5/0007; H04L 5/0048; H04B 7/0413
See application file for complete search history.

(56) References Cited

U.S. PATENT DOCUMENTS

2013/0235885 A1* 9/2013 Chen ...................... H04L 5/0044
370/468
2015/0146815 A1* 5/2015 Berretta .................... H04L 5/04
375/279
2017/0117994 A1* 4/2017 Ashrafi ................. H04L 5/0007

FOREIGN PATENT DOCUMENTS

| WO | WO 2014/016655 A1 | 1/2014 |
| WO | WO 2015/067987 A1 | 5/2015 |
| WO | WO 2015/068036 A1 | 5/2015 |

OTHER PUBLICATIONS

Tamburini, F., et al., "Encoding many channels in the same frequency through radio vorticity: first experimental test," Radio vorticity channels: transmission tests, arXiv.org, Jul. 12, 2011, 17 pages.

Mohammadi, S. M., et al., "Orbital Angular Momentum in Radio—A System Study," IEEE Transactions on Antennas and Propagation, vol. 58, No. 2, Feb. 1, 2010, pp. 565-572.

* cited by examiner

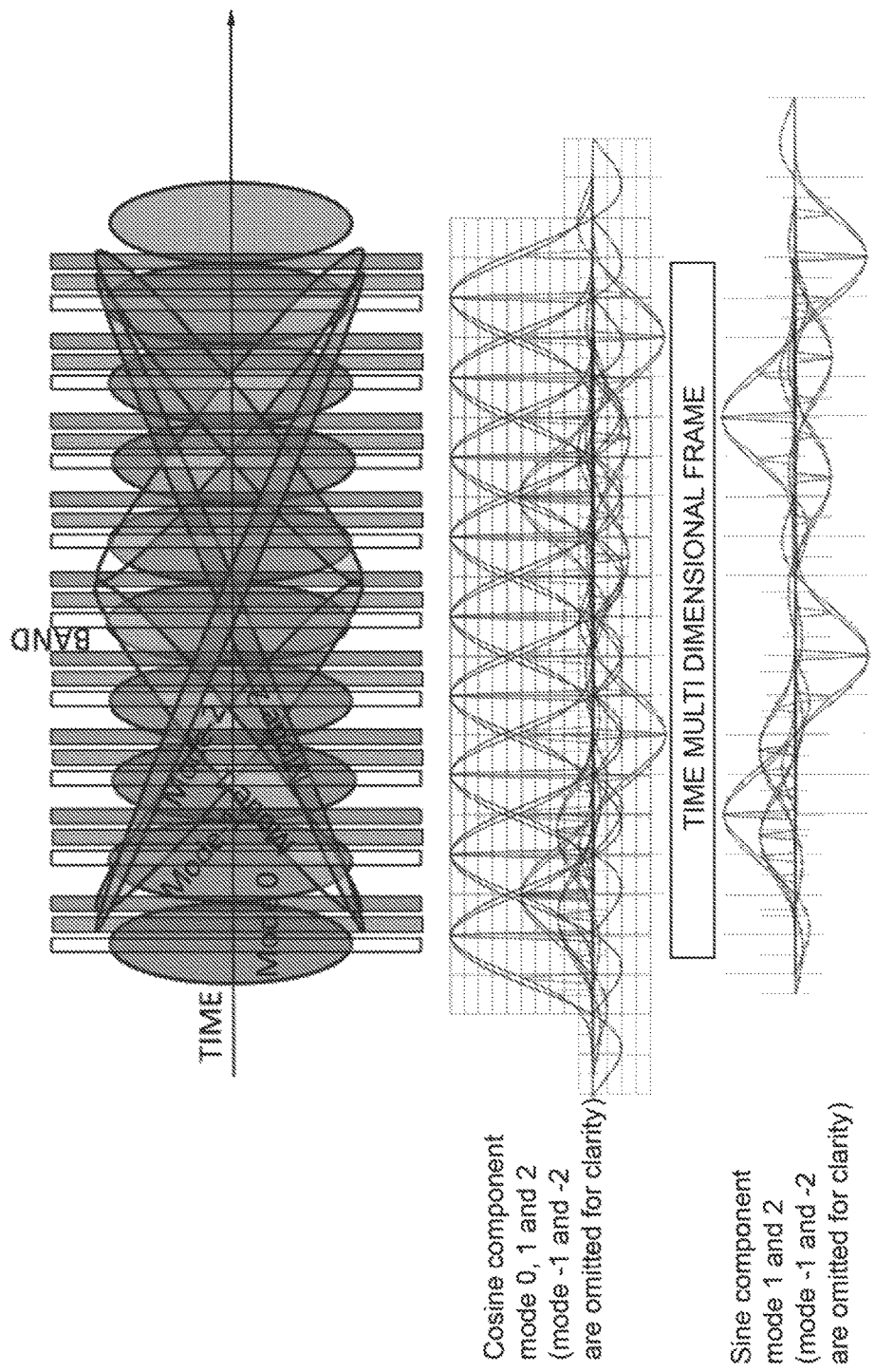

OFDM-OFDMA          SC-FDMA

FIG. 45

| | distance (<7 km) | | distance (<1.5 km) | |
|---|---|---|---|---|
| | Frequency Twist Reuse @ S/N= 6 dB | Frequency Twist Reuse @ S/N= 21 dB | Frequency Twist Reuse @ S/N= 6 dB | Frequency Twist Reuse @ S/N= 21 dB |
| NO TWISTED WAVES — LTE Conventional mode without Multi path MB bit/s at 20 MHz | 45 | 117 | 45 | 117 |
| LTE Conventional mode with constructive multi path MB bit/s at 20 MHz | 78 | 128 | 78 | 128 |
| LTE conventional mode with MIMO with limited Multi path at 20 MHz | 73 | 186 | 73 | 186 |
| TWISTED WAVES — LTE Conventional with Twisted Waves without Multi path MB bit/s at 20 MHz | 56 | 190 | 56 | 190 |
| LTE Conventional with Twisted Waves with constructive multi path MB bit/s at 20 MHz | | 303 | 110 | 221 |
| LTE Conventional with Twisted Waves with MIMO with limited Multi path MB bit/s at 20 MHz | 90 | 303 | 90 | 303 |

| | distance (<7 km) | | distance (<1.5 km) | |
|---|---|---|---|---|
| | Frequency Twist Reuse @ S/N = 6 dB | Frequency Twist Reuse @ S/N = 15 dB | Frequency Twist Reuse @ S/N = 6 dB | Frequency Twist Reuse @ S/N = 15 dB |
| NO TWISTED WAVES LTE Conventional mode without Multi path MB bit/s at 20 MHz | 43 | 78 | 43 | 78 |
| LTE Conventional mode with constructive multi path MB bit/s at 20 MHz | 68 | 89 | 68 | 89 |
| LTE conventional mode with MIMO with limited Multi path at 20 MHz | 69 | 125 | 69 | 125 |
| TWISTED WAVES LTE Conventional with Twisted Waves without Multi path MB bit/s at 20 MHz | 54 | 122 | 54 | 122 |
| LTE Conventional with Twisted Waves with constructive multi path MB bit/s at 20 MHz | | | 100 | 153 |
| LTE Conventional with Twisted Waves with limited MIMO Multi path MB bit/s at 20 MHz | 87 | 196 | 87 | 196 |

FIG. 46

EXPLOITATION OF FREQUENCY TWISTED WAVES IN WIRELESS COMMUNICATION SYSTEMS TO INCREASE TRANSMISSION CAPACITY THEREOF

CROSS-REFERENCE TO RELATED APPLICATIONS

This is the U.S. National Stage of PCT/IB2015/001479, filed Jun. 10, 2015, which in turn claims priority to International Application No. PCT/IB2014/002103, filed Jun. 10, 2014, the entire contents of all applications are incorporated herein by reference in their entireties.

TECHNICAL FIELD OF THE INVENTION

The present invention relates to the use of frequency twisted waves to increase transmission capacity of:
  in general, wireless communication systems based on Orthogonal Frequency-Division Multiplexing (OFDM) and/or Orthogonal Frequency-Division Multiple Access (OFDMA) and/or Single-Carrier Frequency-Division Multiple Access (SC-FDMA) and/or combinations/variants/developments of these technologies; and,
  in particular, 4G ($4^{th}$ Generation) cellular networks based on Long Term Evolution (LTE) and/or LTE Advanced standards, future 5G ($5^{th}$ Generation) cellular networks, and also wireless communication systems based on Worldwide Interoperability for Microwave Access (Wi-MAX) standard.

It is worth noting that, in the present application, the expressions "twisted modes/signals/waves" are used to denote orbital angular momentum modes with topological charge different than zero, and the expressions "main/conventional/traditional/plane mode/signal/wave" are used to denote the orbital angular momentum mode with topological charge equal to zero.

BACKGROUND ART

In consideration of Orbital Angular Momentum (OAM) potentialities of increasing transmission capacity and since radio frequency (RF) spectrum shortage problem is deeply felt in radio communications sector, recently a lot of experimental studies have been carried out on the use of OAM states, or modes, at RF (also known as radio vortices) in order to try to enhance RF spectrum reuse.

In this connection, reference may, for example, be made to:
  Mohammadi S. M. et al., "*Orbital Angular Momentum in Radio—A System Study*", IEEE TRANSACTIONS ON ANTENNAS AND PROPAGATION, IEEE SERVICE CENTER, PISCATAWAY, N.J., US, vol. 58, no. 2, 1 Feb. 2010, pages 565-572, which shows that standard antennas arranged in circular arrays can be used to generate RF beams carrying OAM;
  Tamburini F. et al., "*Encoding many channels in the same frequency through radio Vorticity: first experimental test*", arXiv.org, 12 Jul. 2011, Ithaca, N.Y., USA, which experimentally shows that it is possible to propagate and use the properties of twisted non-monochromatic incoherent radio waves to simultaneously transmit several radio channels on one and the same frequency by encoding them in different (and, thence, orthogonal) OAM states (even without using polarization or dense coding techniques);
  GB 2 410 130 A, which discloses a planar phased array antenna for transmitting and receiving OAM radio vortex modes, which antenna comprises a circular array of cavity backed axial mode spiral antenna elements whose phase is controlled such that the phase of each antenna element changes sequentially about the array; and
  WO 2012/084039 A1, which discloses a transmit antenna arrangement comprising N antenna elements arranged along a circumference with an angular separation of a degrees between neighboring antenna elements, the antenna arrangement comprising an OAM encoder arranged to receive N input signals for transmission, indexed from $M=-(N-1)/2$ up to $M=(N-1)/2$ for odd N and from $M=-(N-2)/2$ up to N/2 for even N; the OAM encoder connecting each input signal to each antenna element and giving each input signal M at each antenna element a phase shift of M*α relative to the phase of the same input signal M at an adjacent antenna element; wherein two or more antenna elements are directional, have their directivity in the same direction, and have an antenna aperture higher than, or equal to, 5λ, where λ is the wavelength of the N input signals.

From a mathematical perspective, the transmission of an OAM mode (or state) at a single RF (i.e., by using a pure tone) implies that the electrical field on the radiating aperture can be represented as:

$$F=(\rho,\phi)=F(\rho)e^{jk\phi},$$

where ρ and φ are the cylindrical coordinates on the radiating aperture, j is the imaginary unit, and k is a positive or negative integer.

The radiated field can be represented in the far zone as:

$$E(\vartheta, \varphi) = \frac{1}{R}\int\int_S F(\rho, \phi)e^{-j2\pi\frac{\rho}{\lambda}\sin(\vartheta)\cos(\varphi-\phi)}\rho d\rho d\phi,$$

where ν and φ are the spherical coordinates in the far field, R denotes the radius of the sphere centered on the radiating aperture, S denotes the integration surface used at reception side, and λ denotes the wavelength used.

As is known, due to intrinsic characteristics of OAM, an OAM mode transmitted at a single RF (i.e., by using a pure tone) is affected by a phase singularity which creates a null at the bore-sight direction, thereby resulting that $$E(0,0)=0.$$

In order for said phase singularity to be compensated, the integration surface S used at reception side should be sized so as to include the crown peak generated by the OAM mode.

In particular, the integration surface S used at reception side should be different for each OAM mode and, considering the sampling theorem applied to the radiating antenna, should have an area given by:

$$\Delta S = \Delta\Omega R^2 = 2\left(\frac{\lambda}{D}R\right)^2,$$

where D denotes the diameter of the radiating antenna.

Therefore, the price to be paid with pure OAM modes transmitted by using pure tones (i.e., single radiofrequencies) is that the dimensions of the equivalent receiving antenna depend on the distance R from, and on the diameter D of, the transmitting antenna.

This solution is impractical for satellite communications, where the aperture efficiency and the size of the antennas are very critical issues. For example, in geostationary-satellite-based communications in Ka band, for a ground antenna having a diameter D of about 9 m, the diameter of the receiving ring on board the geostationary satellite should be of the order of 50 km, thereby resulting impractical.

Thence, in view of the foregoing, the main criticality in using radio vorticity in practical systems is that the orthogonality between OAM modes depends on the size of antennas, on the distance between the transmitting and receiving antennas, and on the need for the receiving antenna to operate as an interferometer basis (as, for example, disclosed in the aforesaid papers "*Orbital Angular Momentum in Radio—A System Study*" and "*Encoding many channels in the same frequency through radio Vorticity: first experimental test*", in GB 2 410 130 A and in WO 2012/084039 A1). These constraints result in OAM-based radio communication systems which are inefficient and unusable for very long distances, such as the ones involved in satellite communications.

Moreover, further criticalities in the use of radio vorticity for satellite communications are represented by the need of an extremely accurate mutual pointing of the transmitting and receiving antennas, and by the unfeasibility of the geometry for Earth-satellite configurations due to the criticality of the positioning of the receiving antennas (or the receiving antenna elements).

A solution to the aforesaid technical problems is provided in the International Application No. PCT/IB2012/056804 (whose content is herewith enclosed by reference) filed on 28 Nov. 2012 in the name of EUTELSAT S. A., published on 30 Jan. 2014 with publication number WO 2014/016655 A1, and concerning a multidimensional space modulation technique for transmitting and/or receiving radio vortices at frequencies ranging from a few kHz to hundreds of GHz. Specifically, the multidimensional space modulation technique according to WO 2014/016655 A1 allows to transmit and/or receive orthogonal RF OAM modes in one and the same direction (i.e., the bore-sight direction) and to overcome, at the same time, the aforesaid technical problems caused by OAM phase singularity at the bore-sight direction, thereby allowing the use of radio vortices also for long-distance radio communications, such as satellite communications.

In particular, the multidimensional space modulation according to WO 2014/016655 A1 is actually a phase modulation applied to signals to be transmitted at RF such that to result in orthogonal radio vortices along the bore-sight direction. Therefore, the modulation according to WO 2014/016655 A1 is called multidimensional space modulation because it allows orthogonal RF OAM modes to be transmitted and/or received in one and the same direction, namely the bore-sight direction, wherein each OAM mode represents a specific space channel along the bore-sight direction, which specific space channel is orthogonal to all the other space channels represented by the other OAM modes.

In order for the multidimensional space modulation according to WO 2014/016655 A1 to be better understood, attention is drawn, by way of example, to the fact that, as is known, a twisted RF signal having, or carrying, the OAM mode m=+1 (where m, as is known, is called topological charge) is characterized by only one clockwise rotation of 360° of the Poynting vector around the propagation axis per period T and, thence, it can be generated by transmitting, for example by means of four ring-arranged transmitting antenna elements, RF signals associated with phases of 0°, 90°, 180°, and 270° clockwise distributed among said four ring-arranged transmitting antenna elements. Instead, WO 2014/016655 A1 proves that it is possible and convenient, in order to transmit at RF the OAM mode m=+1 and, at the same time, to solve the problem caused by OAM phase singularity at the bore-sight direction, to exploit only one antenna transmitting the four different phases 0°, 90°, 180°, and 270° at different times (or at different frequencies) with a time step of T'=T/4. This possibility increases the efficiency of the transmitting and receiving configuration, which can work regardless of the elementary antenna element spacing in an antenna array.

From a conceptual perspective, according to WO 2014/016655 A1, in order to manage OAM rotation, namely in order to control the speed of rotation of an RF OAM mode about the bore-sight direction, a supplementary phase modulation is introduced, which leaves only a residue of the OAM twist and keeps the OAM signature in a limited bandwidth. This residual rotation achieved by means of the supplementary phase modulation allows a signal having a proper bandwidth to be orthogonal to another signal having a different rotation (multiple of the minimum one). Therefore, an RF twisted wave can be transmitted by means of a modulated waveform and can be received by an antenna operating in the complex conjugated mode. The received signal is equal to the transmitted one, except for standard attenuation and transmission and reception gains. The bandwidth increase does not prevent the transmission of plane waves (i.e., the OAM mode m=0), but limits the number of OAM modes at different central frequencies in the available bandwidth. The multidimensional space modulation according to WO 2014/016655 A1 allows to use a standard antenna in place of a phased array antenna, since the used signals are natively orthogonal.

In detail, WO 2014/016655 A1 discloses a device for generating OAM modes for radio communications, which device is designed to receive one or more input digital signals, each of which:
  has a respective sampling period, which is a respective multiple of a given sampling period; and
  occupies a frequency bandwidth, which is a respective fraction of a given available frequency bandwidth.

The device for generating OAM modes according to WO 2014/016655 A1 is:
  operable to
    apply, to each input digital signal, a respective space modulation associated with a respective OAM mode having a respective topological charge to generate a corresponding modulated digital signal carrying said respective OAM mode, and
    provide an output digital signal based on the modulated digital signal(s); and
  configured to apply, to each input digital signal, the respective space modulation by interpolating said input digital signal and phase-modulating the interpolated input digital signal so as to generate a corresponding phase-modulated digital signal carrying said respective OAM mode, having the given sampling period, and occupying the given available frequency bandwidth.

In particular, the device for generating OAM modes according to WO 2014/016655 A1 is configured to apply, to each input digital signal, the respective space modulation by:

digitally interpolating said input digital signal thereby generating a corresponding digitally-interpolated signal having the given sampling period; and phase-modulating the corresponding digitally-interpolated signal on the basis of digital phase shifts related to the respective OAM mode so as to generate the corresponding phase-modulated digital signal.

For example, in order to generate OAM mode +1, WO 2014/016655 A1 teaches to:

digitally interpolate an input digital signal (having a sampling period equal to $4T_0$, where $T_0$ denotes the given sampling period) by outputting, for each digital sample of said digital signal, four corresponding digital samples with time step (i.e., time distance) $T_0$, thereby generating a corresponding digitally-interpolated signal having the given sampling period $T_0$;

apply, to each set of four digital samples obtained by means of the digital interpolation, digital phase shifts related to the OAM mode +1 (namely, digital phase shifts related to phase values 0, $\pi/2$, $\pi$ and $3\pi/2$) so as to generate a corresponding set of four phase-shifted digital samples, which corresponding set of four phase-shifted digital samples carries the OAM mode +1; and combine the sets of four phase-shifted digital samples into a single phase-modulated digital signal carrying the OAM mode +1, having the given sampling period $T_0$, and occupying the given available frequency bandwidth.

Accordingly, in order to generate OAM mode −1, WO 2014/016655 A1 teaches to:

digitally interpolate an input digital signal (having a sampling period equal to $4T_0$, where $T_0$ denotes the given sampling period) by outputting, for each digital sample of said digital signal, four corresponding digital samples with time step (i.e., time distance) $T_0$, thereby generating a corresponding digitally-interpolated signal having the given sampling period $T_0$;

apply, to each set of four digital samples obtained by means of the digital interpolation, digital phase shifts related to the OAM mode −1 (namely, digital phase shifts related to phase values 0, $3\pi/2$, $\pi$ and $\pi/2$) so as to generate a corresponding set of four phase-shifted digital samples, which corresponding set of four phase-shifted digital samples carries the OAM mode −1; and combine the sets of four phase-shifted digital samples into a single phase-modulated digital signal carrying the OAM mode −1, having the given sampling period $T_0$, and occupying the given available frequency bandwidth.

The generation of higher-order OAM modes (i.e., with $|m|>1$, where m denotes the topological charge of the OAM mode considered) according to WO 2014/016655 A1 is performed, mutatis mutandis, conceptually in the same way as the generation of OAM modes ±1 previously described.

OBJECT AND SUMMARY OF THE INVENTION

The Applicant has carried out an in-depth study in order to develop a practical, efficient mode for carrying out the multidimensional space modulation disclosed in WO 2014/016655 A1, and this in-depth study has led the Applicant to develop a new, inventive system and method for transmitting and receiving signals at Radio Frequency (RF) (including frequencies from a few kHz to hundreds of GHz) with increased transmission capacity.

Therefore, a general object of the present invention is that of increasing transmission capacity of wireless communication systems.

Moreover, a specific object of the present invention is that of increasing transmission capacity of:

in general, wireless communication systems based on OFDM and/or OFDMA and/or SC-FDMA and/or combinations/variants/developments of these technologies; and, specifically, 4G cellular networks based on LTE and/or LTE Advanced standards, future 5G cellular networks, and also wireless communication systems based on WiMAX standard.

These and other objects are achieved by the present invention in so far as it relates to a method for radio communications in a wireless communication system and to corresponding wireless communication system and devices/equipments, as defined in the appended claims.

In particular, the present invention concerns a method for radio communications in a wireless communication system including one or more base stations and one or more user terminals. Said method comprises performing a radio communication between a base station and a user terminal of said wireless communication system, wherein performing a radio communication includes transmitting, in a given time slot, first digital symbols by using a frequency-division technique, whereby the first digital symbols are carried by first frequency samples at respective sub-carriers, that are distributed over a predefined frequency band and belong to a given sub-carrier block.

Said method is characterized in that performing a radio communication further includes transmitting, in said given time slot, also second digital symbols by means of one or more frequency twisted modes, wherein each frequency twisted mode carries a respective orbital angular momentum mode with a respective topological charge different than zero by means of respective second frequency samples, that:

are phase-shifted with respect to each other on the basis of phase shifts related to said respective orbital angular momentum mode;

carry one or more respective symbols of said second digital symbols via said respective orbital angular momentum mode; and are at respective frequencies, that are distributed over said predefined frequency band and are different than the sub-carriers belonging to said given sub-carrier block.

Conveniently, the sub-carriers belonging to the given sub-carrier block are spaced apart by a predetermined frequency spacing; and each frequency twisted mode includes respective second frequency samples at respective frequencies that are spaced apart by said predefined frequency spacing and are distributed over said predefined frequency band between pairs of consecutive sub-carriers belonging to the given sub-carrier block.

More conveniently, the one or more frequency twisted modes comprise 2N frequency twisted modes, wherein N denotes an integer higher than one; each frequency twisted mode is identified by a respective index, that is an integer comprised between −N and +N and different than zero, and is related to the respective orbital angular momentum mode carried by said frequency twisted mode; and each pair of frequency twisted modes identified by indexes n and −n (where n denotes an integer comprised between one and +N) includes respective second frequency samples at respective frequencies that are:

the same ones for both said frequency twisted modes identified by said indexes n and −n;

spaced apart by said predefined frequency spacing; and, each, located between a respective pair of consecutive sub-carriers belonging to the given sub-carrier block.

Conveniently, for each second digital symbol to be transmitted in said given time slot, a respective frequency twisted mode carries, by means of respective second frequency samples, said second digital symbol via a phase-modulation related to the orbital angular momentum mode carried by said respective frequency twisted mode.

Preferably, the used frequency-division technique is comprised in the group including: Orthogonal Frequency-Division Multiplexing (OFDM), Orthogonal Frequency-Division Multiple Access (OFDMA), and Single-Carrier Frequency-Division Multiple Access (SC-FDMA).

Conveniently, the used frequency-division technique is OFDM or OFDMA, and performing a radio communication further includes:
  at transmission side,
    computing the first and second frequency samples carrying the first and second digital symbols, and generating a digital time signal representing a transform from frequency domain to time domain of said first and second frequency samples by using a predefined transmission matrix, and
    transmitting a radio frequency signal carrying the digital time signal generated; and
  at reception side,
    receiving the radio frequency signal,
    processing the received radio frequency signal so as to obtain a corresponding incoming digital signal, and extracting the first and second digital symbols from the incoming digital signal by using a reception matrix derived from the predefined transmission matrix.

Conveniently, the used frequency-division technique is SC-FDMA, and performing a radio communication further includes:
  at transmission side,
    computing the first and second frequency samples carrying the first and second digital symbols, and generating a digital time signal representing a transform from frequency domain to time domain of said first and second frequency samples by using a predefined transmission matrix and by applying to the first digital symbols a pre-processing based on Fourier Transform according to Single-Carrier Frequency-Division Multiple Access, and
    transmitting a radio frequency signal carrying the digital time signal generated; and
  at reception side,
    receiving the radio frequency signal,
    processing the received radio frequency signal so as to obtain a corresponding incoming digital signal, and extracting the first and second digital symbols from the incoming digital signal by using a reception matrix derived from the predefined transmission matrix and by carrying out a post-processing based on Inverse Fourier Transform according to Single-Carrier Frequency-Division Multiple Access so as to obtain the first digital symbols.

More conveniently, the reception matrix is derived from the predefined transmission matrix through a pseudo-inverse technique.

Conveniently, generating a digital time signal includes generating a digital time signal that includes a cyclic prefix followed by a time signal portion; wherein said time signal portion represents the transform from frequency domain to time domain of the first and second frequency samples; and wherein the cyclic prefix is a replica of an end portion of said time signal portion.

Finally, according to a preferred embodiment of the present invention, there preferably results that:
  if the base station and the user terminal performing the radio communication are not in a multipath scenario, the second digital symbols are transmitted up to a first maximum distance between said base station and said user terminal;
  if the base station and the user terminal performing the radio communication are in a multipath scenario and are configured to use a Multiple Input Multiple Output (MIMO) technology, the second digital symbols are transmitted up to a second maximum distance between said base station and said user terminal, wherein said second maximum distance is smaller than said first maximum distance; and,
  if the base station and the user terminal performing the radio communication are in a multipath scenario and are not configured to use any MIMO technology, the second digital symbols are transmitted up to a third maximum distance between said base station and said user terminal, wherein said third maximum distance is smaller than said second maximum distance.

BRIEF DESCRIPTION OF THE DRAWINGS

For a better understanding of the present invention, preferred embodiments, which are intended purely by way of non-limiting example, will now be described with reference to the attached drawings (all not to scale), where:

FIG. 5 schematically illustrates an example of multidimensional time frame representation on time-band plane along with even and odd properties of said multidimensional time frame;

FIGS. 45 and 46 show two tables related, respectively, to a downlink scenario and an uplink scenario in which frequency twisted waves are applied to an LTE cell;

DETAILED DESCRIPTION OF PREFERRED EMBODIMENTS OF THE INVENTION

Figure 1:
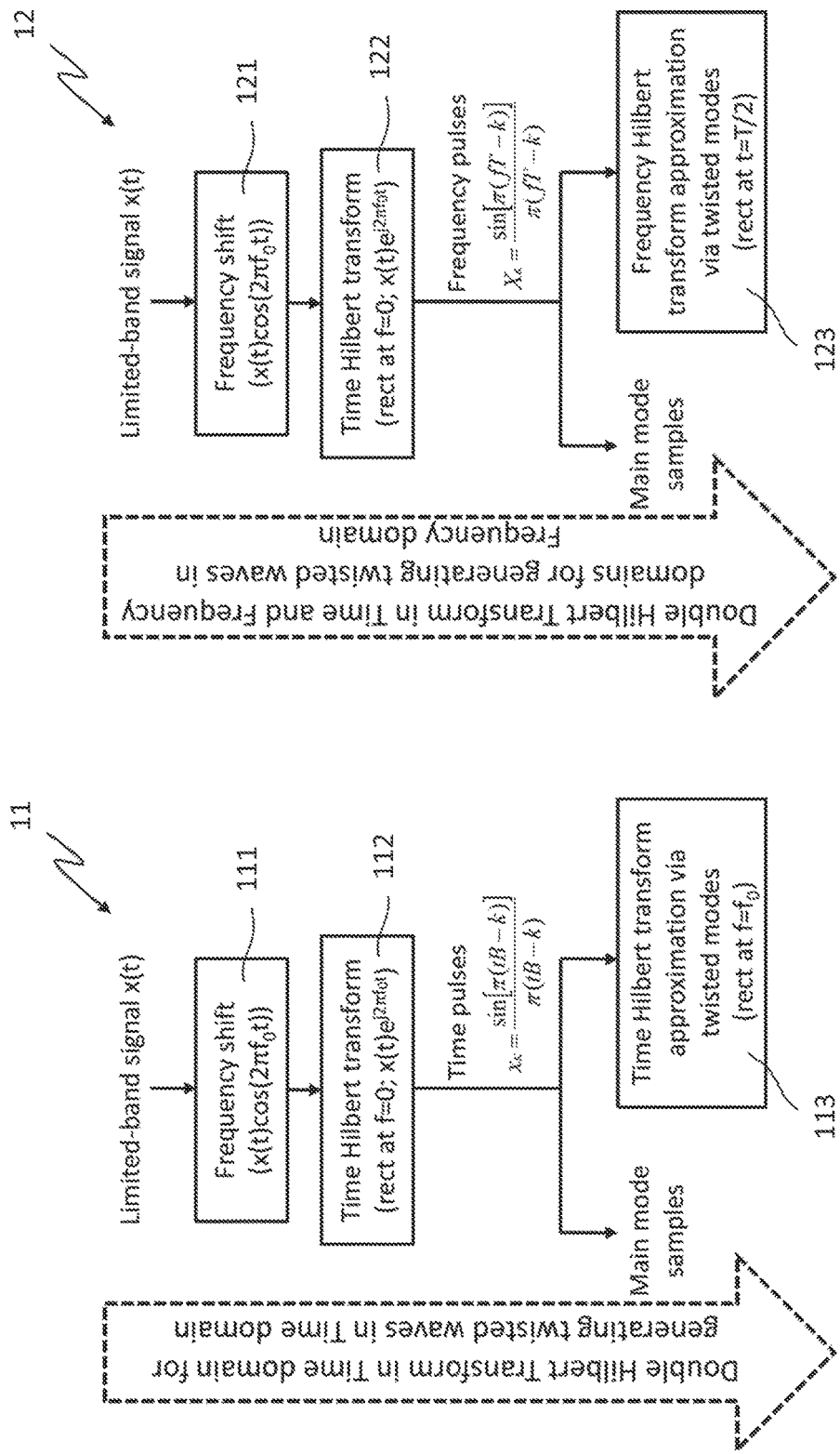
FIG. 1 schematically illustrates a comparison between a process for generating twisted waves in time domain according to International applications WO 2015/067987 A1 and WO 2015/068036 A1, and a process for generating twisted waves in frequency domain according to International application PCT/FR2014/051394.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

As previously explained, in the present application the expressions "twisted modes/signals/waves" are used to denote orbital angular momentum (OAM) modes with topological charge different than zero, and the expressions "main/conventional/traditional/plane mode/signal/wave" are used to denote the orbital angular momentum (OAM) mode with topological charge equal to zero.

Moreover, in the following, without losing generality, the present invention will be described by making specific reference to LTE cellular networks, remaining clear that the present invention can also be applied to other type of cellular or non-cellular wireless communication systems, such as those ones based on LTE Advanced and WiMAX standards, and, more in general, to any wireless communication system based on OFDM and/or OFDMA and/or SC-FDMA and/or combinations/variants/developments of these technologies.

International Application No. PCT/IB2013/003156 (whose content is herewith enclosed by reference), filed on 5 Nov. 2013 in the name of EUTELSAT S. A. and published on 14 May 2015 with publication number WO 2015/067987 A1, and also International Application No. PCT/IB2014/002607 (whose content is herewith enclosed by reference), filed on 29 Oct. 2014 in the name of EUTELSAT S. A. and published on 14 May 2015 with publication number WO 2015/068036 A1, disclose, both, the feasibility of increasing transmission capacity at Radio Frequency (RF) (including frequencies from a few kHz to hundreds of GHz) by exploiting a proper approximation in time domain of the Hilbert transform of digital analytical signals, wherein said approximation of the Hilbert transform is obtained by exploiting time twisted waves.

Moreover, International Application No. PCT/FR2014/051394 (whose content is herewith enclosed by reference) filed on 10 Jun. 2014 in the name of EUTELSAT S. A. teaches, by exploiting duality between time and frequency, to use also a twisted-wave-based approximation of the Hilbert transform in frequency domain in order to increase transmission capacity.

In the following an overview of time and frequency twisted waves will be presented, followed by a detailed description of one or more preferred embodiments of the present invention concerning application of frequency twisted waves to wireless/mobile communication systems in order to increase transmission capacity thereof.

As explained in WO 2015/067987 A1, WO 2015/068036 A1 and PCT/FR2014/051394, the bandwidth advantage obtainable by using twisted waves can be regarded as an extended use of the Hilbert transform.

In practical terms, the presentation, side by side, of half spectrum of two independent signals can be developed by exploiting twisted waves, keeping the two original signals independent.

The impossibility of realizing the discontinuity at the middle frequency for odd modes implies that the maximum theoretical advantage, which is equal to 2, is not obtainable, although a figure close to 1.7 is feasible.

The fact that time and frequency are conjugated variables allows to exploit twisted waves in both time and frequency domains. The two applications present similar aspects, but also some essential differences due to two main reasons: all digital processes operate in time domain, and the signal in frequency domain is complex and non-real.

Therefore, as just explained, twisted waves can be used in both time and frequency domains.

In particular, time twisting can be regarded as a new formalization of the Single Side Band (SSB) modulation applied to digital signals, while frequency twisting is completely new and can be considered an evolution of the very recent techniques based on OFDM/OFDMA and SC-FDMA.

In detail, let us consider a generic signal which is time-limited and also has a limited bandwidth; this aspect implies that the signal can be considered periodic outside the considered time interval, thereby enabling the application of Discrete Fourier Transform (DFT) techniques.

With reference to time twisted waves, as described in WO 2015/067987 A1 and WO 2015/068036 A1, the bandwidth limitation allows to consider the analytical representation of the signal by using the sine and cosine components. By introducing a supplementary use of the Hilbert transform to the analytical signal, or rather a twisted-wave-based approximation of the Hilbert transform, it is possible to have an additional signal occupying the same bandwidth and a larger time interval than the usual conventional signal (namely, the plane wave signal). This additional signal has a "space orthogonality" with respect to the plane wave signal based on even and odd components (considered at predefined time references). The orthogonality leads to a separate detection of the plane wave and twisted signals, wherein said detection is performed by using a detection matrix called generalized matched filter.

Moreover, with reference to frequency twisted waves, as described in PCT/FR2014/051394, the frequency limitation allows to consider the analytical signal (only positive frequencies) and the time limitation allows to introduce a supplementary use of the Hilbert transform to the analytical signal along the frequency axis, or rather a twisted-wave-based approximation of the Hilbert transform, thereby allowing to have an additional signal occupying a larger bandwidth than the original one. This is not a drawback, because the overall signal bandwidth is much larger than the one of a single frequency pulse (this is very similar to what happens to an OFDM signal, where the frequency pulses are two or three order of magnitude lesser than the full bandwidth).

In this respect, FIG. 1 schematically shows a comparison of the processes for generating twisted waves in time domain according to WO 2015/067987 A1 and WO 2015/068036 A1, and in frequency domain according to PCT/FR2014/051394.

In particular, as shown in FIG. 1, both the process according to WO 2015/067987 A1 and WO 2015/068036 A1 (denoted as a whole by 11) and the process according to PCT/FR2014/051394 (denoted as a whole by 12) are applied to a limited-band signal x(t) and include:
applying to the limited-band signal x(t) a frequency shift (block 111 and 121, respectively); and
performing a time Hilbert transform of the frequency-shifted signal to get the analytical signal (block 112 and 122, respectively).

Instead, the two processes are differentiated by the fact that:
the process 11 according to WO 2015/067987 A1 and WO 2015/068036 A1 exploits an approximation in time domain of the Hilbert transform of the analytical signal to create time twisted waves (block 113); and
the process 12 according to PCT/FR2014/051394 exploits an approximation in frequency domain of the Hilbert transform of the analytical signal to create frequency twisted waves (block 123).

Moreover, WO 2015/068036 A1 explains that a good representation of a time twisted wave signal requires a bandwidth slightly larger than the minimum one defined by Nyquist and, for each pair of twisted modes ±n, a respective sample sequence properly time-spaced.

In particular, as explained in WO 2015/068036 A1, the use of a raised cosine filter is non-optimum, due to the use of two different reference times:
a first one used for sampling; and
a second one for increasing the bandwidth, namely for obtaining a bandwidth slightly larger than the minimum one defined by Nyquist.

Instead, the use of a Gaussian filter gives much more freedom in the selection of the two reference times, or rather enables:
only one time reference to be used; and,
nevertheless, a bandwidth slightly larger than the minimum one defined by Nyquist to be obtained.

In particular, it is possible to simplify the twisted wave generation by considering that there is no defined condition between the shape of the filter and the sampling time.

Figure 2:
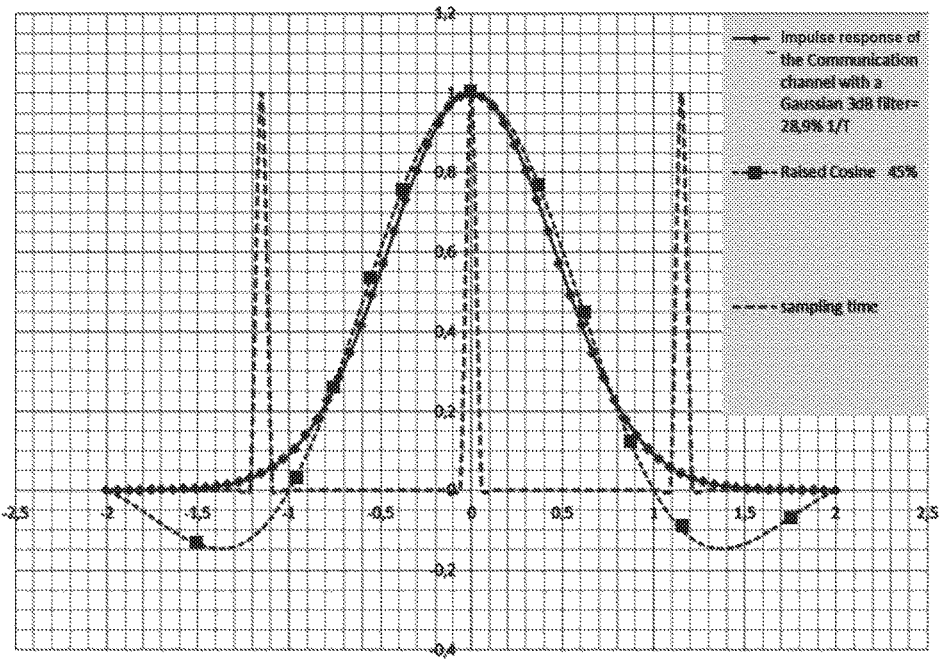
FIGS. 2 and 3 schematically illustrate comparisons between the use of raised cosine filtering and the use of Gaussian filtering for generating time twisted waves.

With reference to FIG. 2, which shows a comparison between a Gaussian filter and raised cosine filter used for time twisted modes, it is worth noting that two different aspects have to be managed with the raised cosine filter, namely the time function of the filter and the sampling time, with the latter larger than the former one (in the case shown in FIG. 2 the ratio between the time function of the raised cosine filter and the sampling time is 1.15). In addition, the roll-off factor has to be optimized for the best performance of the generalized matched filter used at reception side.

Instead, by using a Gaussian filter, only one parameter has to be defined with respect to the sampling time, i.e., the 3 dB bandwidth of the Gaussian filter itself. This implies a much better performance in terms of bandwidth, and the selection of one single time reference.

Figure 3:
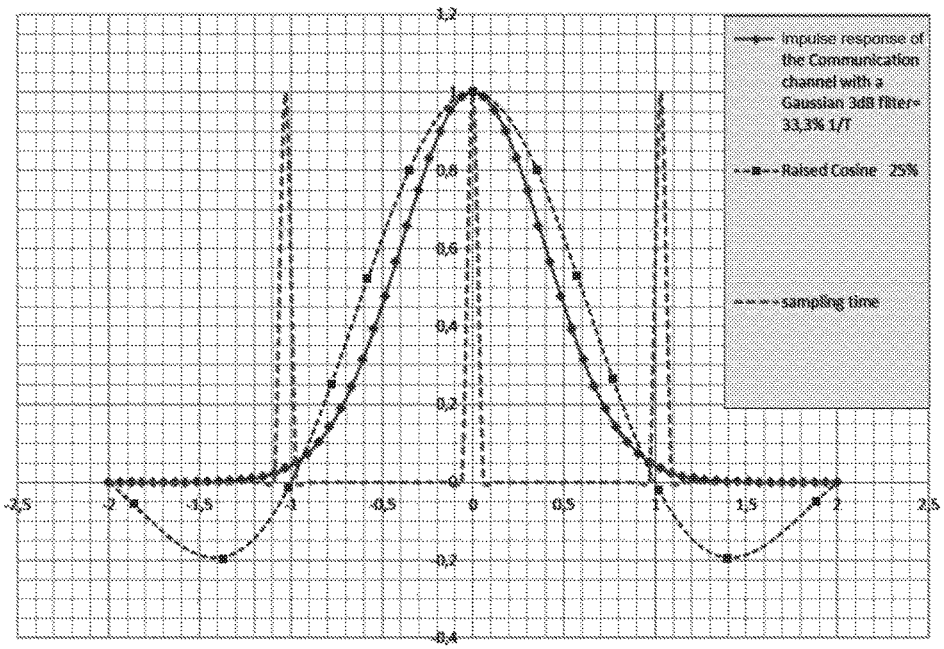

From FIG. 3, which shows a further comparison between a Gaussian filter and raised cosine filter used for time twisted modes, it can be noted that, if the 3 dB bandwidth of the Gaussian filter is set to 33.3% instead of 28.9% (as shown in FIG. 2) with the sampling time at 1.15, the overall behavior is the same. The bandwidth increase of this solution is about 6.6% of the standard solution for a raised cosine filter with a 25% roll-off.

The advantage in using Gaussian filtering instead of traditional raised cosine filtering for time twisted waves is essentially due to RF frame structure, which does not need the strong limiting condition on the zero position of the filter's time response.

In greater detail, as explained in WO 2015/068036 A1, a practical system based on time twisted waves can use only the modes n=0,±1,±2, thereby achieving a potential frequency reuse close to 1.7.

Anyway, there are some implementation-related aspects which are to be carefully considered. In particular, a first aspect is the need to keep the reference sampling frequency; therefore, it is necessary to have more samples than the minimum number achievable with a twice oversampling; for example, if modes up to n=±2 are used, the time frame includes 9 symbols of the main mode oversampled by a factor 2 thereby resulting 18 symbol samples; in order to keep memory of the even/odd relation, it is necessary to add a digital vestigial component, i.e., to introduce in the same time frame 19 filter samples (which corresponds to a bandwidth increase of about 6.6%), that is equivalent to use a larger 3 dB bandwidth for a Gaussian filter.

Moreover, a second aspect is the use, for each mode, of a time sequence capable of generating, with respect to the other modes, the possibility of operating between an even and an odd component, i.e., capable of defining a reference frequency with respect to which the mode spectrum has this even/odd symmetry; to this end, it is convenient to define, for each mode, a frequency shift capable of satisfying this need; in particular, this frequency shift is given by:

$$f_n = \frac{nB}{2},$$

with a time sequence of $$\frac{4n}{B}$$

(where n denotes the considered mode, and B denotes the reciprocal of the symbol period T). In time domain this frequency shift corresponds to a sampling shift of $$\frac{T}{2^n}.$$

Figure 4:
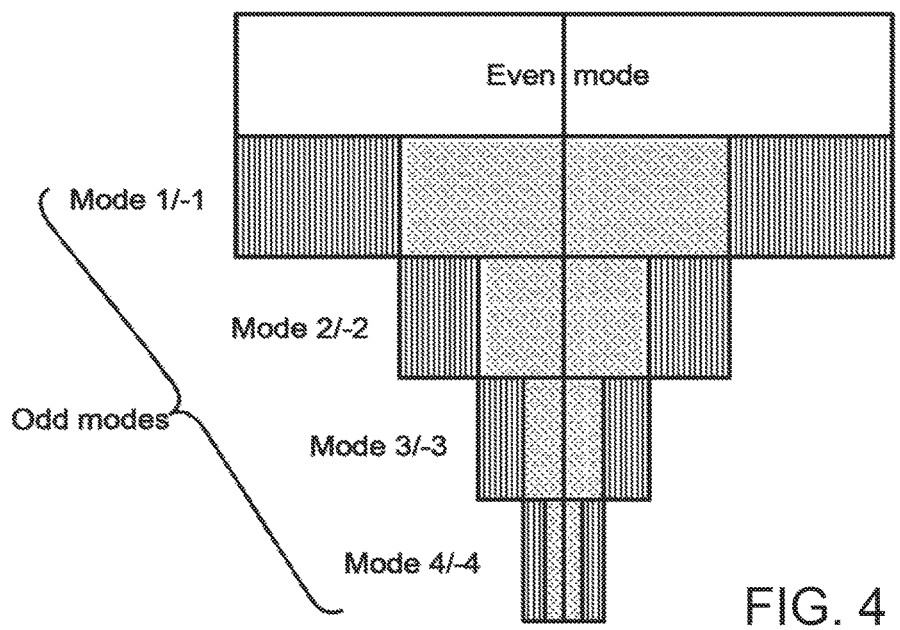
FIG. 4 schematically illustrates an example of time twisted mode frequency reference layout.

In this respect, reference is made to FIG. 4, which schematically shows an example of time twisted mode frequency reference layout wherein mode spectra have the aforesaid even/odd symmetry with respect to a reference frequency.

By using a time frame according to the foregoing, the symbols associated with (i.e., carried by) the different modes can be represented on a two-dimensional plane with the sampling time as abscissa and the frequency band (or the phase) as ordinate, i.e., on a time-band plane. In this respect, reference is made to FIG. 5, which schematically shows multidimensional time frame representation on time-band plane wherein even and odd properties of said multidimensional time frame are outlined.

In particular, the signal generation resulting from the example shown in FIG. 5 has the following features:
- as for main mode n=0, conventional symbol generation is performed with symbol rate 1/T and sampling at kT (with k equal to 0, 1, 2, 3, . . . , 8); in particular, the main mode n=0 carries 9 symbol complex values (real and imaginary components for any kind of digital modulation);
- as for modes n=±1, a two-complex-symbol generation is performed for each mode with symbol rate 1/(4T) and sampling at (2k'−1)T/2 (with k' equal to 1, 2, 3, . . . , 8); in particular, a total of 4 symbol complex values is carried by modes n=±1; and
- as for modes n=±2, one-complex-symbol generation is performed for each mode with symbol rate 1/(16T) and sampling at (2k'−1)T/2, as disclosed in WO 2015/067987 A1, or at (4k'−3)T/4, as disclosed in WO 2015/068036 A1.

In particular, a total of 2 symbol complex values is carried by modes n=±2.

Thence, from reception perspective, 9+4+2=15 complex unknowns are to be determined for each received time frame.

As for sample shape for a time frame/sequence, one and the same filter can be used for the symbols associated with all the modes. Each mode is approximated by a sequence of repetition of one and the same symbol value properly phase-shifted the number of times necessary to complete a full 2π period.

Due to the mix of the real and imaginary signals in one and the same frequency band, it is necessary to receive a full time frame before determining the symbol values. This feature can be regarded as equivalent to interferometry techniques which take simultaneously into account a set of different directions in physical space.

Let us consider having the same energy per symbol for all the modes, then a generic pulse sequence can be conveniently rearranged considering that the maximum amplitude associated with the even samples (i.e., at kT) is associated with the full energy, while the maximum amplitude associated with the odd samples (i.e., at (2k'−1)T/2 and/or at (4k'−3)T/4)) is divided, for each mode n, by a respective factor that is $$2^{\frac{n+2}{2}}.$$

More in general, let us consider using up to mode ±N. Then, the number of symbols carried by the main mode n=0 every time frame is $P=2^{N+1}+1$, the number of symbols carried by the modes n=±1 every time frame is $2^N$, the number of symbols carried by the modes n=±2 every time frame is $2^{N-1}$, the number of symbols carried by the generic modes n=±i every time frame is $2^{N-i+1}$, and the number of symbols carried by the modes n=±N every time frame is $2^{N-N+1}=2$.

Therefore, the overall number S of symbols carried by all the modes every time frame is:

$$S=2^{N+2}-1.$$

Moreover, the size of the time frame is $(2^{N+1}+1)T$, and $(2^{N+2}+1)$ represents the minimum number of independent equations necessary, at reception side, to compute the complex values of the S symbols carried by the time frame under processing.

Anyway, in order to sample the twisted modes (i.e., the modes with n≠0) at their maxima, the number of equations increases according to the following relation:

$$(2^{N+2}+1) \rightarrow \left[\left(1+\frac{N(N+1)}{2}\right)2^{N+1}+1\right].$$

Taking into consideration an approximation of the double-bandwidth Hilbert transform based on twisted modes n=0, ±1,±2, there results that, at reception side, the number of complex unknowns to be computed (i.e., the number S of the symbol complex values carried by the time frame under processing) is 9+4+2=15, and the number of complex equations to be solved is 33.

In consideration of the use of time frames, it is convenient to adopt a signal organization architecture, i.e., a reference system, useful to detect the signal structure at the reception side. In fact, as previously explained, each time frame has a time length of $(2^{N+1}+1)T$ (where N identifies the highest twisted modes used, or, equivalently, is the topological charge of the highest twisted modes used), and is to be identified at reception side.

Figure 6:
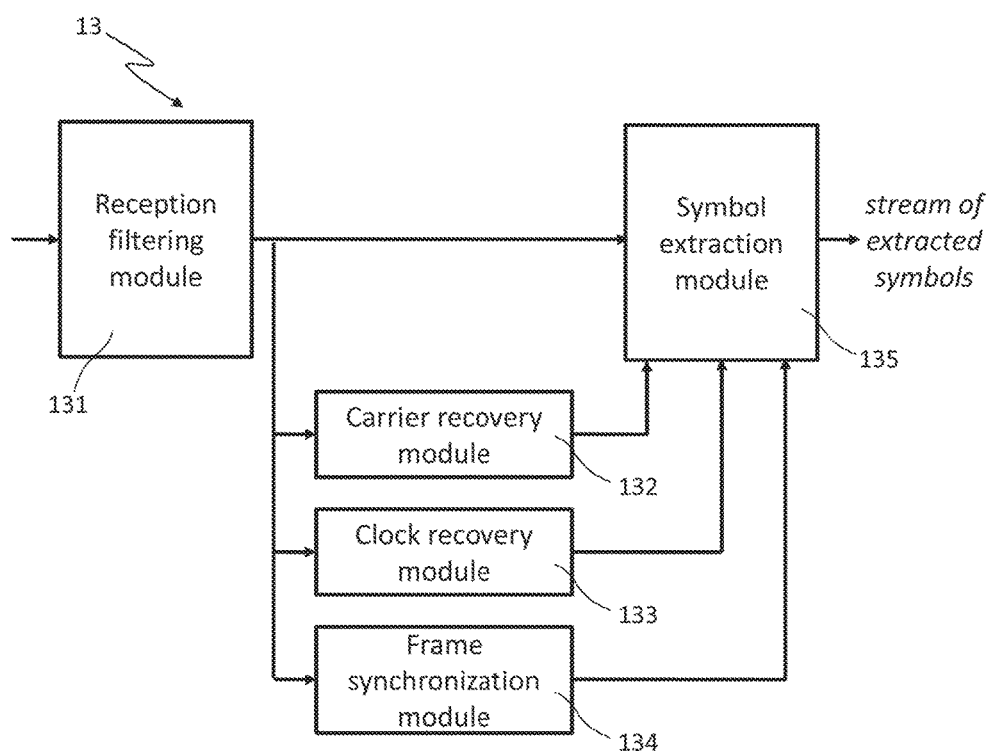
FIG. 6 schematically illustrates a symbol extraction device according to WO 2015/068036 A1 intended to be used by a system/device configured to receive time twisted waves.

In order for reception of time twisted waves to be better understood, reference is made to FIG. 6, which shows a functional block diagram of a symbol extraction device 13 described in WO 2015/068036 A1 and intended to be used by a system/device configured to receive time twisted waves.

In particular, as shown in FIG. 6, the symbol extraction device 13 comprises:

a reception filtering module 131, which is designed to receive an incoming digital time signal, and which is configured to digitally filter the incoming digital time signal by means of a predefined reception filter, preferably a predefined Gaussian filter;

a carrier recovery module 132 which is coupled with the reception filtering module 131 to receive therefrom the filtered incoming digital time signal, and which is configured to recover, on the basis of the filtered incoming digital time signal, the carrier of the transmitted signal carrying symbols via main and time twisted modes, and output signals/data indicating the carrier;

a clock recovery module 133 which is coupled with the reception filtering module 131 to receive therefrom the filtered incoming digital time signal, and which is configured to recover, on the basis of the filtered incoming digital time signal, the symbol clock of the transmitted signal carrying symbols via main and time twisted modes, and output signals/data indicating the symbol clock; and a frame synchronization module 134 which is coupled with the reception filtering module 131 to receive therefrom the filtered incoming digital time signal, and which is configured to detect, on the basis of the filtered incoming digital time signal, the time frame structure of the transmitted signal carrying symbols via main and time twisted modes, and output signals/data indicating the time frame structure.

In this respect, it is worth noting again that the use of a Gaussian filter enables only one time reference to be used, namely the symbol clock, or rate, 1/T (or, equivalently the symbol period T), which, as previously explained, substantially coincides with the sampling rate (while the use of a Gaussian filter enables, nevertheless, a bandwidth slightly larger than the minimum one defined by Nyquist to be obtained). This fact implies a reduced complexity of the receiver, which need to recover, by means of the clock recovery module 133, only one time reference (i.e., the symbol clock), instead of two different time references (i.e., symbol clock plus sampling clock).

Preferably, the carrier recovery module 132 is configured to recover the carrier by means of a Phased-Locked Loop (PLL), in particular a Costas Loop, and the clock recovery module 133 is configured to recover the symbol clock by implementing an early-late synchronization; instead, the frame synchronization module 134 is configured to detect the time frame structure by detecting, through a digital filtering, the Hilbert channel generated by the signal architecture. In fact, the transmitted signal carrying symbols via main and time twisted modes carries information on frame synchronization in addition to the symbol clock.

Moreover, as shown in FIG. 6, the symbol extraction device 13 further comprises a symbol extraction module 135, which is coupled with:

the reception filtering module 131 to receive therefrom the filtered incoming digital time signal;

the carrier recovery module 132 to receive therefrom the signals/data indicating the carrier;

the clock recovery module 133 to receive therefrom the signals/data indicating the symbol clock; and the frame synchronization module 134 to receive therefrom the signals/data indicating the time frame structure.

The symbol extraction module 135 is configured to process, on the basis of the signals/data received from the carrier recovery module 132, the clock recovery module 133 and the frame synchronization module 134, successive, non-overlapped time frames of the filtered incoming digital time signal by determining, from each time frame processed, the S complex symbols respectively carried and by using a predefined reception matrix which is derived from the transmission matrix used in transmission.

In particular, the symbol extraction module 135 can be regarded as a generalized matched filter based on a reception matrix which is derived from the transmission matrix through a generalized inversion technique, such as the pseudo-inverse technique.

Instead, as for frequency twisted waves, PCT/FR2014/051394 teaches, by exploiting duality between time and frequency, to use a twisted-wave-based approximation of the Hilbert transform in frequency domain, in order to increase, in general, transmission capacity at RF (including frequencies from a few kHz to hundreds of GHz) and, in particular, RF spectrum reuse.

In fact, thanks to duality principle between time and frequency it is possible to exploit twisted wave functions also in frequency domain. The results are very interesting and promising with features which are, on the one hand, similar to time domain case, but, on the other hand, rather different, for practical applications, from time domain case.

In particular, "frequency twist" can be seen as a generalization of the well-known OFDM approach, introducing an absolute novelty in the analysis and design of OFDM signals.

In detail, PCT/FR2014/051394 describes a radio communications method, which comprises carrying out, by a transmitter, the following steps:

a) providing a digital time signal carrying digital symbols to be transmitted; and b) transmitting a radio frequency signal carrying said digital time signal.

Moreover, the method according to PCT/FR2014/051394 further comprises carrying out, by a receiver, the following steps:

c) receiving the radio frequency signal transmitted by the transmitter;

d) processing the received radio frequency signal so as to obtain a corresponding incoming digital signal; and e) extracting, from the incoming digital signal, the digital symbols carried by said incoming digital signal.

The method according to PCT/FR2014/051394 is characterized in that said digital time signal carrying the digital symbols to be transmitted results from an approximation of the Hilbert transform in frequency domain, which approximation is based on a frequency main mode and one or more frequency twisted modes, wherein said frequency main and twisted modes carry, each, respective digital symbols to be transmitted.

Conveniently, according to PCT/FR2014/051394, the digital time signal is time-limited, carries a limited sequence of digital symbols to be transmitted, and results from:

main mode frequency samples carrying respective digital symbols of said limited sequence via a frequency main mode; and twisted mode frequency samples carrying the other digital symbols of said limited sequence via one or more frequency twisted modes, wherein each frequency twisted mode is a complex harmonic mode (in particular an OAM mode) that is orthogonal to the frequency main mode and to any other frequency twisted mode used.

More conveniently, according to PCT/FR2014/051394, the main mode frequency samples are at main mode frequencies spaced apart by a predetermined frequency spacing, and the twisted mode frequency samples comprise, for a frequency twisted mode, respective twisted mode frequency samples at corresponding twisted mode frequencies that:

are related to said frequency twisted mode;
are spaced apart by said predetermined frequency spacing; and
are different from the main mode frequencies.

More and more conveniently, according to PCT/FR2014/051394, the one or more frequency twisted modes comprise 2N frequency twisted modes each identified by a respective integer index n that is comprised between −N and +N and is different from zero, N denoting an integer higher than zero; the limited sequence of digital symbols to be transmitted comprises $S_{TOT}$ digital symbols, $S_{TOT}$ being equal to $2^{N+2}-1$; the frequency main mode carries $M_{MFS}$ of said $S_{TOT}$ digital symbols by means of $M_{MFS}$ main mode frequency samples at corresponding main mode frequencies, that are spaced apart by said predetermined frequency spacing and that range from $B_S$ to $M_{MFS}$ times $B_S$, $B_S$ denoting said predetermined frequency spacing and $M_{MFS}$ being equal to $2^{N+1}+1$; said 2N frequency twisted modes carry the $S_{TOT}-M_{MFS}$ digital symbols not carried by the frequency main mode; and each frequency twisted mode n carries $2^{N-|n|}$ respective digital symbol(s) by means of $2^{N+1}$ respective twisted mode frequency samples at corresponding twisted mode frequencies, that are spaced apart by said predetermined frequency spacing and that are located, in frequency domain, at $$B_S\left(\frac{2^{|n|}-1}{2^{|n|}}+k\right),$$

where k denotes an integer ranging from zero to $2^{N+1}-1$, or from one to $2^{N+1}$.

Very conveniently, according to PCT/FR2014/051394, each of said $S_{TOT}$ digital symbols to be transmitted is represented by a respective symbol complex value; and, for each frequency twisted mode n, the $2^{N+1}$ respective twisted mode frequency samples comprise, for each of the $2^{N-|n|}$ respective digital symbol(s), $2^{|n|+1}$ frequency samples, that:

carry said digital symbol;
are at frequencies that are located, in frequency domain, at $$B_S\left[\frac{2^{|n|}-1}{2^{|n|}}+(k^*+i\cdot 2^{|n|+1})\right],$$

where k* denotes an integer ranging from zero to $2^{|n|+1}-1$, or from one to $2^{|n|+1}$, and where i is an index that identifies said digital symbol and is comprised between zero and $2^{N-|n|}-1$; and have, each, a respective complex value obtained by multiplying the symbol complex value representing said digital symbol by a respective complex factor related to said frequency twisted mode n and to the frequency of said frequency sample.

Again very conveniently, according to PCT/FR2014/051394, for each frequency twisted mode n and for each of the $2^{N-|n|}$ respective digital symbol(s), the $2^{|n|+1}$ respective frequency samples carrying said digital symbol have, each, a respective complex value obtained by multiplying the symbol complex value representing said digital symbol by a respective complex factor which:

if n is higher than zero, is equal to $$\frac{e^{+jk^*\frac{\pi}{2^{|n|}}}}{2^{\frac{|n|+1}{2}}}$$

or, if n is lower than zero, is equal to $$\frac{e^{-jk^*\frac{\pi}{2^{|n|}}}}{2^{\frac{|n|+1}{2}}}$$

where j denotes the imaginary unit.

Preferably, according to PCT/FR2014/051394, said step a) includes providing the digital time signal by using a predefined transmission matrix that relates the $S_{TOT}$ digital symbols to be transmitted
to time samples of the digital time signal
through coefficients related to a transform from frequency domain to time domain of the main mode frequency samples and the twisted mode frequency samples;

and said step e) includes extracting the digital symbols carried by the incoming digital signal by using a reception matrix derived from the predefined transmission matrix (conveniently, through a pseudo-inverse technique).

More preferably, according to PCT/FR2014/051394, the reception matrix is computed on the basis of the following formula:

$$[[GFFT]]=([[GIFFT]]^T[[GIFFT]])^{-1}[[GIFFT]]^T,$$

where [[GFFT]] denotes the reception matrix, [[GIFFT]] denotes the predefined transmission matrix, [[GIFFT]]$^T$ denotes the transpose of the predefined transmission matrix, and $([[GIFFT]]^T [[GIFFT]])^{-1}$ denotes the operation of inversion of the matrix resulting from the multiplication of the transpose of the predefined transmission matrix and the predefined transmission matrix.

Conveniently, according to PCT/FR2014/051394, the main mode frequency samples are frequency samples of OFDM type, or of OFDMA type.

Preferably, according to PCT/FR2014/051394, said step a) includes:
providing a first digital time signal resulting from the main mode frequency samples and the twisted mode frequency samples; and
providing a second digital time signal which includes a cyclic prefix followed by the first digital time signal, wherein the cyclic prefix is a replica of an end portion of said first digital time signal;
and said step b) includes transmitting a radio frequency signal carrying the second digital time signal.

For a better understanding of frequency twisted waves, in the following some aspects of PCT/FR2014/051394 will be presented in greater detail.

Generation of frequency twist, in analogy with time twist generation, is organized by associating the complex symbol value $a_k e^{j\varphi_k}$ to a set of frequency pulses, properly phase-shifted and properly arranged in frequency domain.

For the sake of simplicity, it is considered to operate in an OFDM signal structure, where the main signal is represented by the Inverse Fast Fourier Transform (IFFT) of the symbol time flow.

In addition to this frequency symbol set, it is added, for each mode, a set of frequency samples.

Modes ±1 are generated repeating the same symbol at 4 different frequencies $$\frac{1}{T}\left(\frac{1}{2}+k\right),$$

changing each time their phases according to $$e^{\pm jk\frac{\pi}{2}},$$

with k=0, 1, 2, 3. This means that the associated IFFT is the sum of 4 decimated IFFT, having only 1 row for each sample and each one is weighted by $$0.5 e^{\pm jk\frac{\pi}{2}}.$$

Modes ±2 are generated repeating the same symbol at 8 different frequencies $$\frac{1}{T}\left(\frac{3}{4}+k\right),$$

changing each time their phases according to $$e^{\pm jk\frac{\pi}{4}},$$

with k=0, 1, ..., 7. This means that the associated IFFT is the sum of 8 decimated IFFT, having only 1 row for each sample and each one is weighted by $$\frac{1}{\sqrt{8}} e^{\pm jk\frac{\pi}{4}}.$$

In general, modes ±N are generated repeating the same symbol at $2^{N+1}$ different frequencies $$\frac{1}{T}\left(\frac{2^N-1}{2^N}+k\right),$$

changing each time their phases according to $$e^{+jk\frac{\pi}{2^N}},$$

with k=0, 1, ..., $2^{N+1}-1$. This means that the associated IFFT is the sum of 4N decimated IFFT, having only 1 row for each sample and each one is weighted as $$\frac{1}{2^{\frac{N+1}{2}}} e^{+jk\frac{\pi}{2^N}}.$$

In practical terms, phases can be simplified (in terms of implementation) assuming the same value each π/2, in this way the rotation can be represented by a smaller number of bits.

Figure 7:
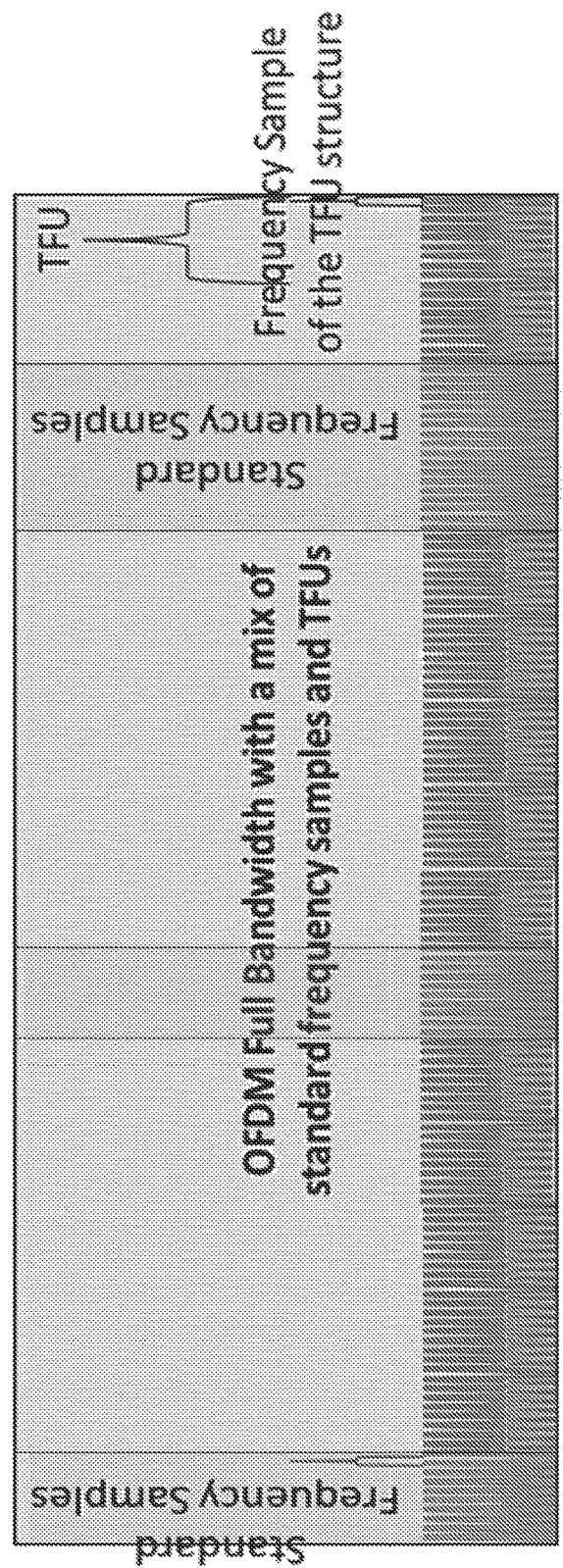
FIG. 7 schematically illustrates an OFDM super frame with additional Twisted frame Frequency Units (TFUs)

Then, let us take into consideration an OFDM signal architecture, which can be considered a sequence of frequency pulses having the shape of a sinc. In the same frequency band frequency twisted waves can be added and these additional elements in the following will be called Twisted Frequency frame Units (TFUs). In this respect, FIG. 7 shows an OFDM super frame with additional TFUs.

The structure of a TFU is given by the superposition of the OFDM structure and of the structure of the twisted frequency modes previously defined.

The minimum length of a TFU bandwidth, where modes up to ±N are used, is given by:

$$\frac{2^{N+1}+1}{T},$$

where T is the time interval duration which is the inverse of the frequency pulse symbol bandwidth $B_S$ (i.e., $T=1/B_S$).

Figure 8:
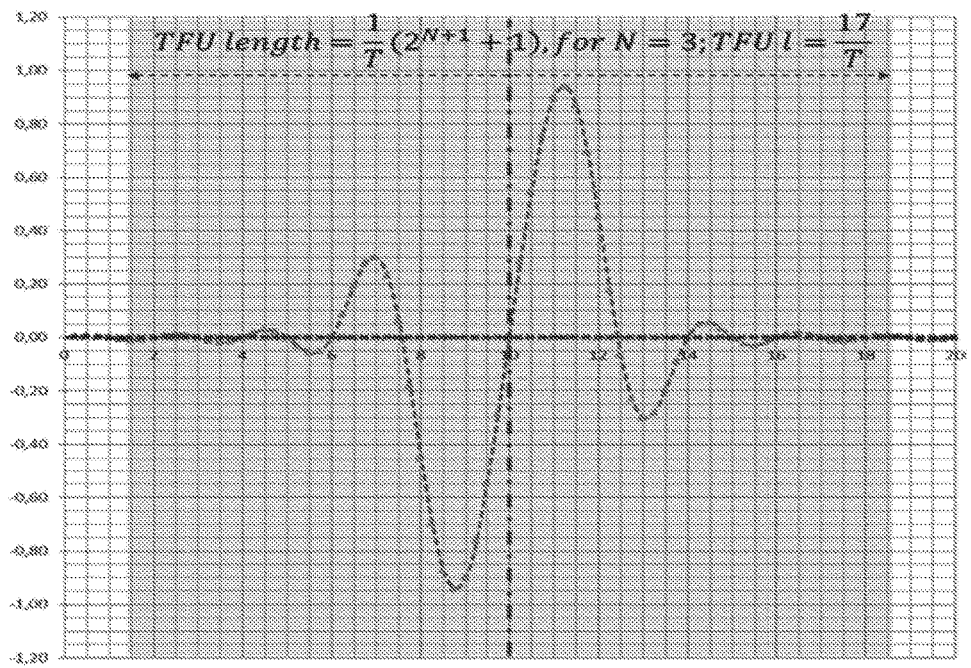
FIG. 8 schematically illustrates an approximation of the impulse response of the frequency Hilbert transform using three twisted modes.

In this respect, FIG. 8 show an approximation of the impulse response of the frequency Hilbert transform, which approximation uses three modes.

The mode structure in the TFU frame takes into account the length of each mode; therefore, using up to mode ±N, the number $M_{MFS}$ of the frequency samples of the main mode is:

$$M_{MFS}=2^{N+1}+1.$$

It is worth recalling that, assuming $B_S=1/T$, the frequency samples of generic frequency twisted mode ±N are at frequencies $$\frac{1}{T}\left(\frac{2^N-1}{2^N}+k\right).$$

Moreover, the number of complex symbol values (or, at reception side, of complex unknowns) of the main mode n=0 is $M_{MFS}=2^{N+1}+1$, the number of complex symbol values (or, at reception side, of complex unknowns) of the modes +1 and −1 is 2N, the number of complex symbol values (or, at reception side, of complex unknowns) of the modes +2 and −2 is $2^{N-1}$, the number of complex symbol values (or, at reception side, of complex unknowns) of the modes +i and −i is $2^{N-i+1}$, and the number of complex symbol values (or, at reception side, of complex unknowns) of the modes +N and −N is $2^{N-N+1}=2$.

Therefore, the overall number $S_{TOT}$ of complex symbol values (or of complex unknowns) is given by:

$$S_{TOT} = (2^{N+1} + 1) + \sum_{i=1}^{N} 2^{N-i+1},$$

wherein the first addend represents the number $M_{MFS}$ of symbols (or, at reception side, of complex unknowns) of the main mode n=0, while the second addend (i.e., the summation) represents the number $S_{TOT}-M_{MFS}$ of symbols (or, at reception side, of complex unknowns) of all the other modes with n≠0.

The foregoing mathematical formula can be rewritten as:

$$S_{TOT} = 1 + \sum_{i=0}^{N} 2^{N-i+1} = 1 + 2^{N+1} \cdot \sum_{i=0}^{N} \left(\frac{1}{2}\right)^i.$$

Thence, since it is known that $$\sum_{i=0}^{N} x^i = \frac{x^{N+1} - 1}{x - 1} \text{ if } x \neq 1,$$

then it results that:

$$S_{TOT} = 2^{N+2} - 1.$$

The overlapping of frequency pulses associated with different symbols creates a special form of orthogonality, which depends on the structure of the TFUs. In this sense the TFUs represent a "frequency space" and the different signals are orthogonal in this space according to symmetry and antisymmetry features of the signal structure. This property can be seen as equivalent to the interferometry in the traditional geometrical space.

Anyway, even if the present invention deals with "frequency space", the procedure for determining the transmitted signals is performed in the time domain and not in the frequency domain.

Figure 9:
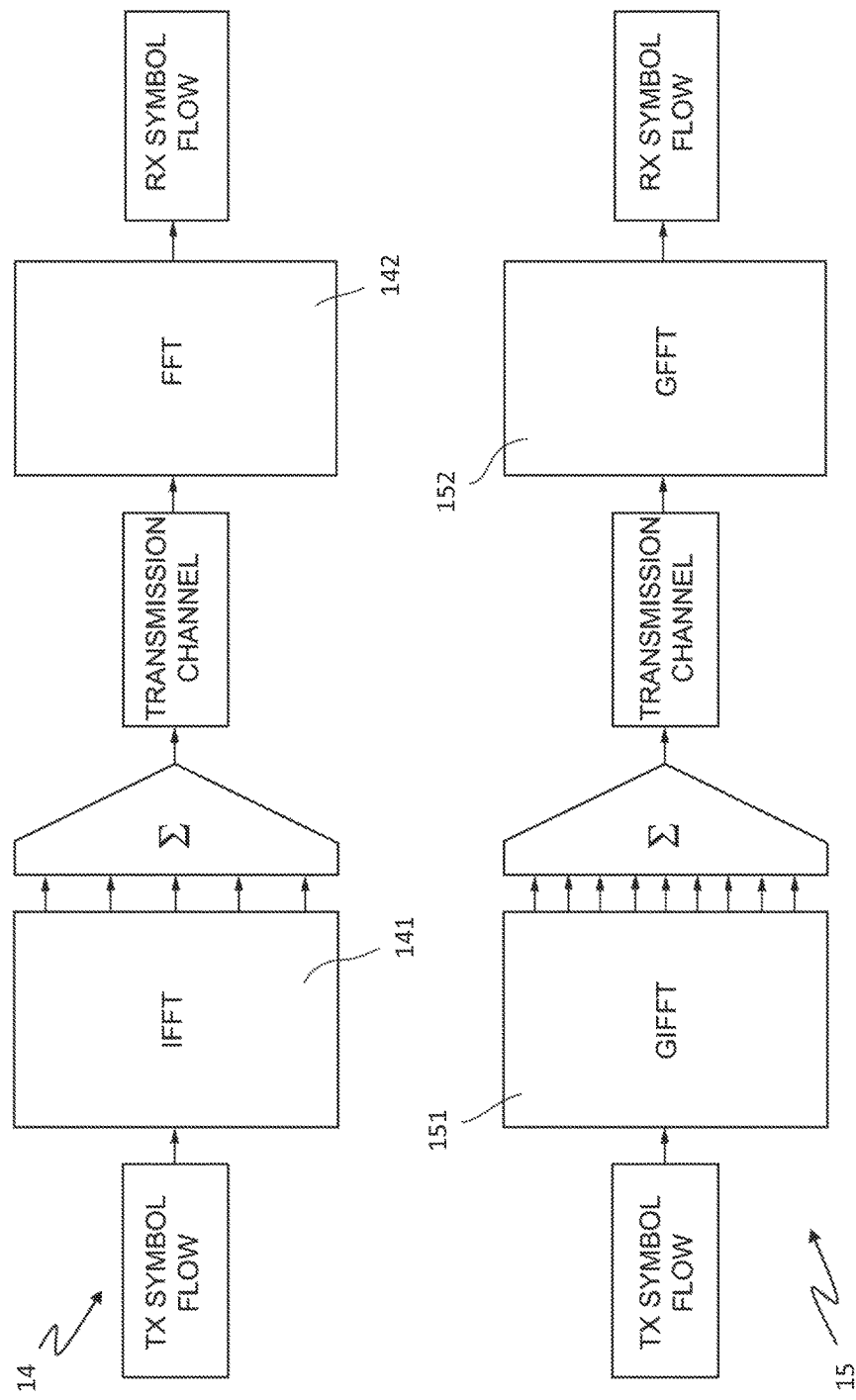
FIG. 9 schematically represents a radio communications method according to PCT/FR2014/051394 as a generalization of the traditional OFDM (or OFDMA) technique.

In particular, as shown in FIG. 9 which schematically represents the radio communications method according to PCT/FR2014/051394 (denoted as a whole by 15) as a generalization of the traditional OFDM (or OFDMA) technique (denoted as a whole by 14), the radio communications method 15 can be considered similar to the traditional OFDM (or OFDMA) technique 14, which, as is broadly known, comprises:
at the transmission side, the conversion of a symbol serial time stream into a parallel independent frequency stream via an Inverse Fast Fourier Transform (IFFT) (block 141); and,
at the reception side, the back-transformation into the original symbol serial time stream via a Fast Fourier Transform (FFT) (block 142).

Similarly, the radio communications method 15 according to PCT/FR2014/051394 exploits:
at the transmission side, a "Generalized Inverse Fast Fourier Transform" (GIFFT) (block 151) which includes the implementation of the previously described frequency Hilbert transform approximation based on frequency twisted modes; and,
at the reception side, a "Generalized Fast Fourier Transform" (GFFT) (block 152) which includes the extraction of the symbols carried by the main and frequency twisted modes.

Let us now consider the structure of the twisted signals in time domain and in frequency domain (on the assumption that for both the domains the first mode ±1 is used):
a time twisted mode ±1 signal can be expressed as
a)

$$x_{T\pm 1}(t) = a_k e^{j\varphi_k} \left\{ \frac{1}{2}\left[rect\left(t - \frac{T}{2}\right) - rect\left(t - \frac{3T}{2}\right)\right] \pm \frac{j}{2}\left[rect(t - T) - rect\left(t - \frac{5T}{2}\right)\right] \right\};$$

and
a frequency twisted mode ±1 signal can be expressed as $$X_{F\pm 1}(f) = a_k e^{j\varphi_k} \left\{ \frac{1}{2}\left[rect\left(f - \frac{B}{2}\right) - rect\left(f - \frac{3B}{2}\right)\right] \pm \frac{j}{2}\left[rect(f - B) - rect\left(f - \frac{5B}{2}\right)\right] \right\}.$$

The frequency twisted mode ±1 signal is analyzed in time domain thereby resulting that:
b)

$$x_{F\pm 1}(t) = \frac{a_k e^{j\varphi_k}}{2} \left\{ \left[e^{-j2\pi(f\frac{B}{2})t} - e^{-j2\pi(f\frac{3B}{2})t}\right] \pm j\left[e^{-j2\pi(f-B)t} - e^{-j2\pi(f\frac{5B}{2})t}\right] \right\} \text{ for } |t| < \frac{T}{2}.$$

Figure 10:
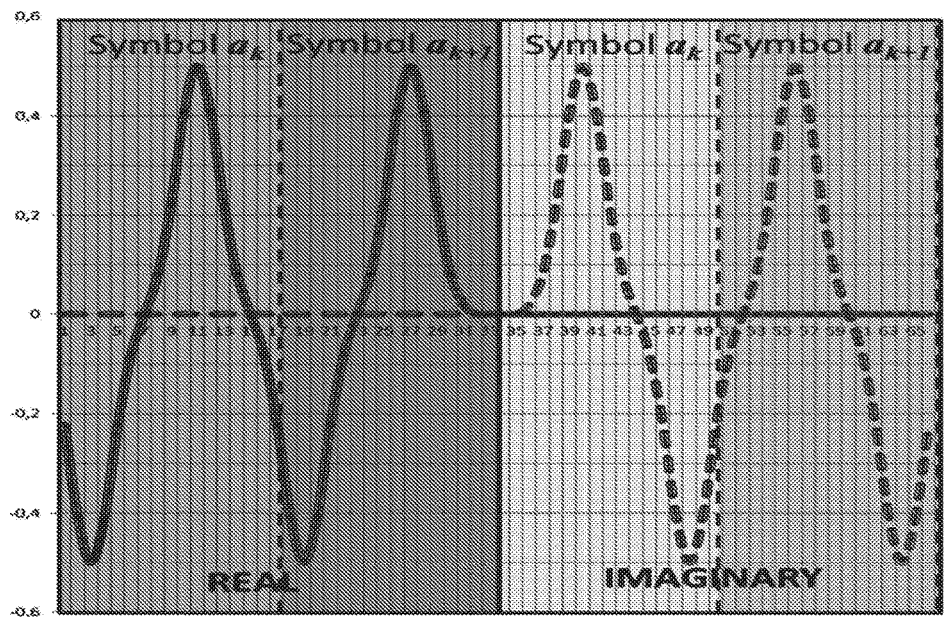
FIGS. 10 and 11 schematically illustrate time behavior of a time twisted mode +1 complex signal and of a frequency twisted mode +1 complex signal, respectively.
Figure 11:
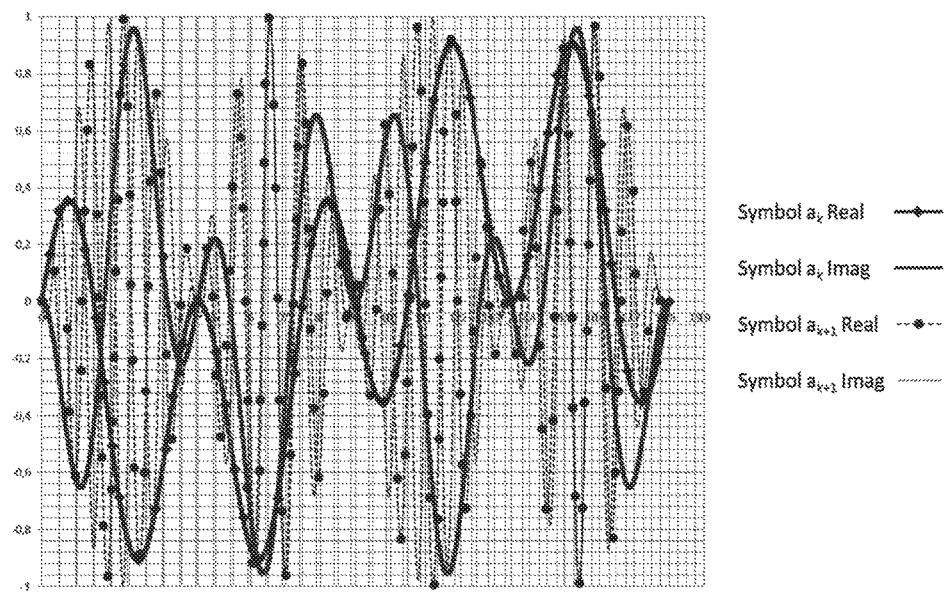

From a comparison of the signals a) and b) it is evident that the frequency twist is more robust in keeping the independence of the signal equation system. These feature is evident also from the time behavior of the twisted signals, as shown in FIGS. 10 and 11 which illustrate the time behavior of a time twisted mode +1 signal and of a frequency twisted mode +1 signal, respectively.

From an ideal point of view, the frequency Hilbert transform is applicable to a time-limited signal. Therefore, in order for the frequency Hilbert transform to be applicable to a continuous time symbol flow, it is necessary to apply said transform to successive time windows of said continuous time symbol flow and to identify the beginning and the end of each time window. This implies that the time window length is increased of a proper portion so as to render each time window detectable. This feature is similar to the bandwidth increase necessary in the case of time twisted waves.

Figure 12:
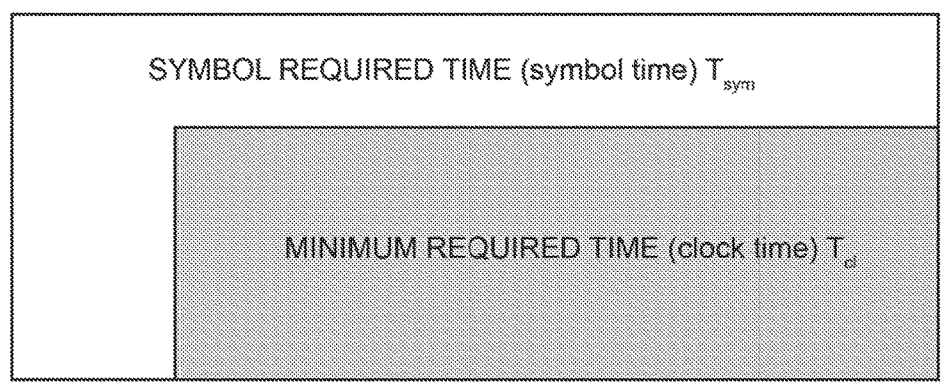
FIG. 12 schematically illustrates symbol and clock time relation according to an aspect of PCT/FR2014/051394.

Therefore, the frequency twist requires a time interval slightly larger than the minimum one required by the sampling theorem. This condition is equivalent to consider a symbol duration $T_{sym}$ longer than the system clock duration $T_{cl}$, as schematically illustrated in FIG. 12.

The above condition implies that, for instance, every 18 frequency bands an additional one is necessary and that, as a consequence, the bandwidth efficiency is given by $$\frac{18}{19} \cong 0.95.$$

An interesting aspect of this condition applied to the frequency twisted waves is that it can be interpreted as equivalent to the well-known cyclic prefix already used with the OFDM technique.

For multiple path transmission the delay spread is generated by the set of different paths between the transmitter and the receiver when those paths have different delays.

As an example, a signal following a direct line-of-sight path would arrive before a different version of the same signal which is reflected by a distant building.

Time domain receivers typically synchronize with each delay spread component and adjust their individual timings before combining the received signals.

When using a rake receiver, each finger belonging to the rake receiver synchronizes itself with a specific delay spread component. The number of delay spread components which can be combined is, thence, limited to the number of rake fingers. Any delay spread component which is not combined appears as interference.

LTE receivers do not need to synchronize themselves with individual delay spread components, i.e., it is not necessary to adjust the timing of delay spread components, nor it is necessary to do any combining of delay spread components. An LTE receiver can operate directly on the aggregate received signal without considering delay spread components.

The cyclic prefix represents a guard period at the start of each OFDMA symbol which provides protection against multi-path delay spread. The cyclic prefix also represents an overhead which should be minimized.

The duration of the cyclic prefix should be greater than the duration of the multi-path delay spread.

Figure 13:
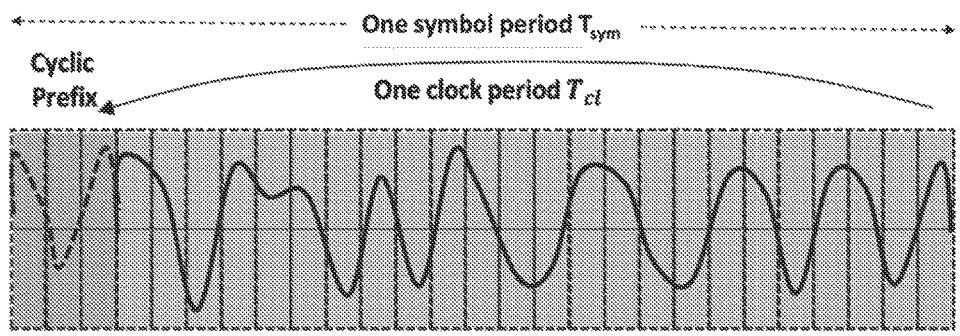
FIG. 13 schematically illustrates a traditional scheme of cyclic prefix for OFDM-OFDMA.

LTE standard specifies both normal and extended cyclic prefix lengths. The normal cyclic prefix is intended to be sufficient for the majority of scenarios, while the extended cyclic prefix is intended for scenarios with particularly high delay spread. Durations for the normal and extended cyclic prefix vary from 7% in the standard case up to 25% in the extended case. The cyclic prefix is generated by copying the end of the main body of the OFDMA symbol at the beginning, as shown in FIG. 13 which illustrates the traditional scheme of cyclic prefix for OFDM-OFDMA.

The signal is always continuous at the interface between the cyclic prefix and the main body of the symbol. This results from the main body of the symbol always including an integer number of sub-carrier cycles.

Figure 14:
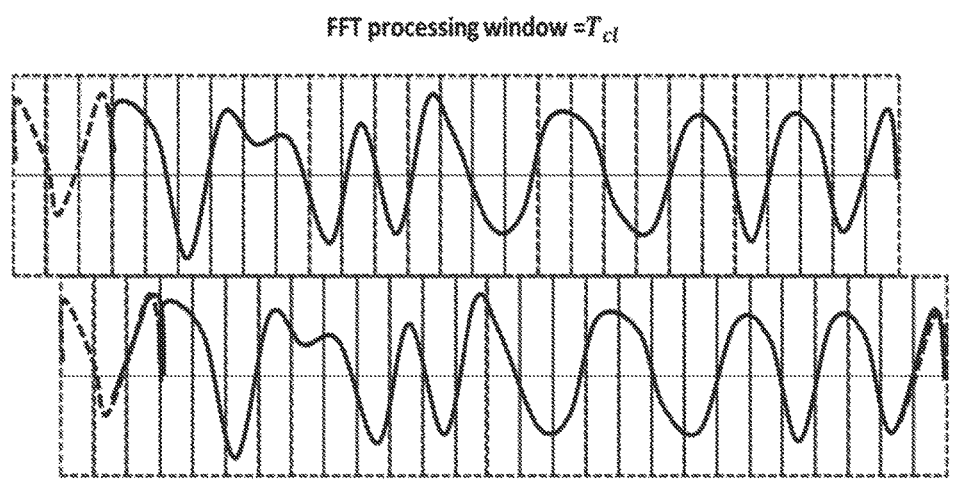
FIG. 14 schematically illustrates an example of two delay spread components with cyclic prefix.

FIG. 14 shows an example of 2 delay spread components. The second delay spread component is received later than the first delay spread component. An FFT processing window is defined at the receiver:
  the processing window captures the main body of the OFDMA symbol belonging to the first delay spread component; the cyclic prefix belonging to the first delay spread component is discarded;
  the processing window captures part of the cyclic prefix and the majority of the main body of the OFDMA symbol belonging to the second delay spread component; sections of the cyclic prefix and main body of the OFDMA symbol which fall outside the processing window are discarded; and,
  in the extreme case, where the delay spread is equal to the duration of the cyclic prefix, the FFT processing window fully captures the cyclic prefix belonging to the delay spread component and discards a section of the main body of the ODFMA symbol which has a duration equal to the cyclic prefix.

The time domain representation of each delay spread component within the processing window is different, however, the frequency domain representation of each delay spread component within the processing window is identical.

Figure 15:
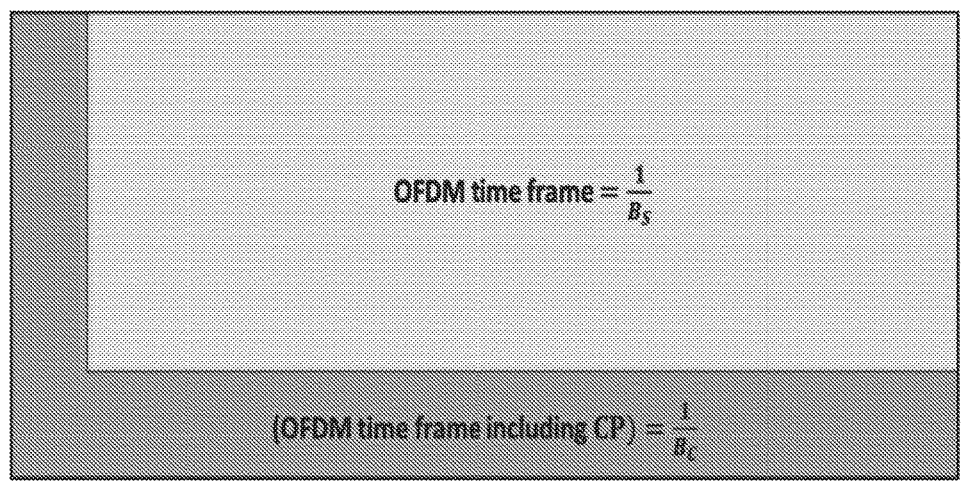
FIG. 15 schematically illustrates time frame duration increase due to cyclic prefix.

Let us now assume that modes up to $N=\pm 2$ are used, then the band occupied by the TFU configuration is given by $(2^{2+1}+1)=9$ frequency slots. To this TFU corresponds a Twisted Time frame Unit (TTU), which is increased to avoid time duration ambiguities. If one half slot is considered, the TTU increases of $1/(2B_{sym})$ and the total length of the TTU is $9.5/B_{sym}$. In this respect, FIG. 15 shows time frame duration increase due to cyclic prefix (CP).

This increase is much lower than the one required by OFDMA. This implies that in practical system there is no additional loss for including frequency twisted waves in the OFDM (or OFDMA) super frame.

The increase in time interval duration creates automatically a replica of the signal at the beginning of the time interval itself, without any change in the occupied frequency bandwidth.

This approach is, thence, much more interesting for understanding the physical meaning of the cyclic prefix, than the ordinary explanation about its use.

Figure 16:
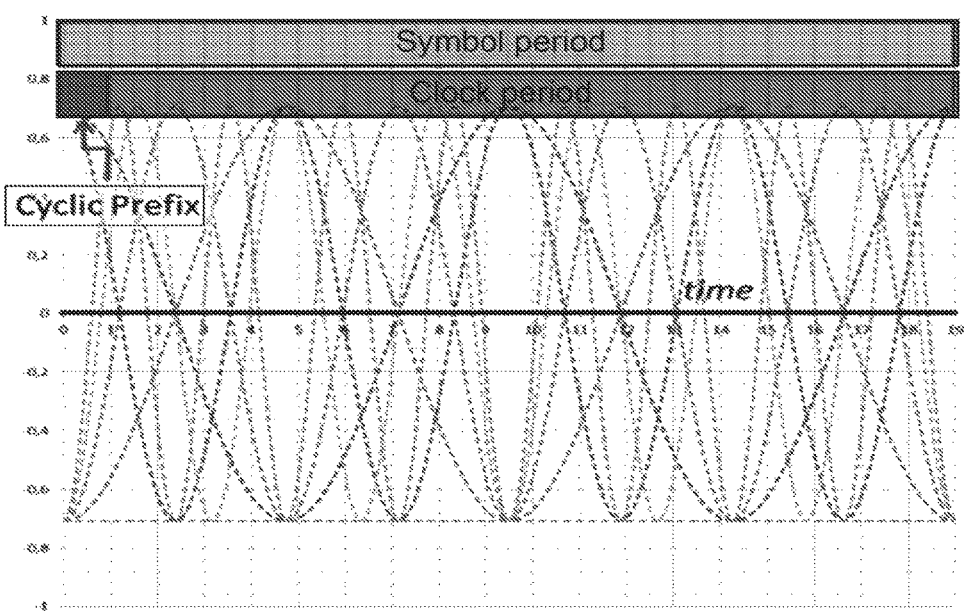
FIGS. 16 and 17 schematically illustrate time behavior of main mode and frequency twisted modes, respectively, when a cyclic prefix is used.

Considering sampling in frequency domain at a symbol rate slightly smaller than the clock rate, the signal in time domain, on the assumption that only the main mode is used, has the time behavior shown in FIG. 16, where the sinusoid are not exactly a multiple of the symbol period: i.e., what the cyclic prefix is performing.

Figure 17:
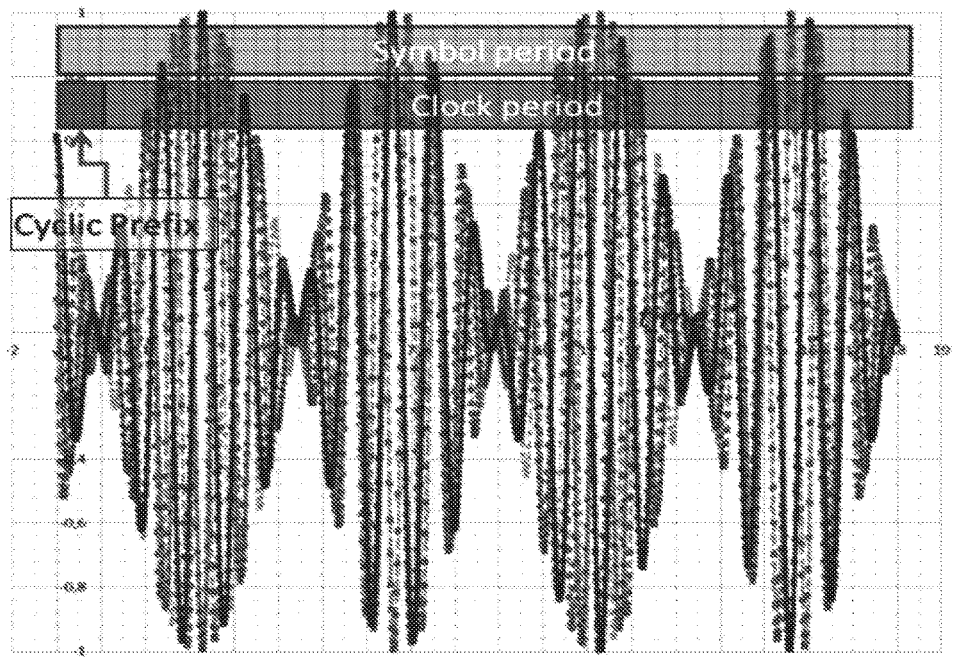

Adding the FTUs, the twisted mode signals present the same behavior of the main mode signal, as shown in FIG. 17.

Increasing the number of TTUs, the number of sinusoidal signals increases, but the ratio between $T_{cl}$ and $T_{sym}$ remains unchanged.

The OFDM-twisted frequency has two hierarchical levels:
  the former is related to the TTUs structure; and
  the latter is related to the assembly of the TFUs constituting the OFDM structure.

Both the levels have the same time duration and the difference is given by the component frequency blocks:
  each TFU corresponds to a number of samples defined by the twisted frequency structure, which introduces additional frequency samples located between the main frequency samples;
  the super frame structure is a set of TTUs, centered at the proper frequency, and a set of traditional OFDM frequency samples, if wished;
  the standard frequency samples can simplify the process of synchronization and phasing.

The performances of time twist and frequency twist are similar, with some interesting differences.

The overall bandwidth is not increased by the time twist, but it is convenient to introduce the Gaussian shaping (BW≥1.33) to render the generalized matched filter derivable from an invertible matrix. This implies that the bandwidth used is larger, by about 30%, than the minimum one defined by Nyquist.

The frequency twist is based on the application of the sampling theorem to the Fourier transform of the used signal; this implies that, with respect to the single frequency pulse, the frequency twist entails a bandwidth increase. Considering the full frequency signal (as in the case of OFDM), the introduction of twisted signals does not increase the total bandwidth, but limits frequency slot modularity for the twisted wave signals, which requires an increased bandwidth for representing the transmitted symbols.

The behavior of time twisted signals with respect to noise is very peculiar. In particular, the noise level for the time twisted waves can be represented as divided into two parts:
- a first part related to the symbol rate bandwidth; and
- a second part related to the difference between the symbol rate and the clock bandwidth.

Figure 18:
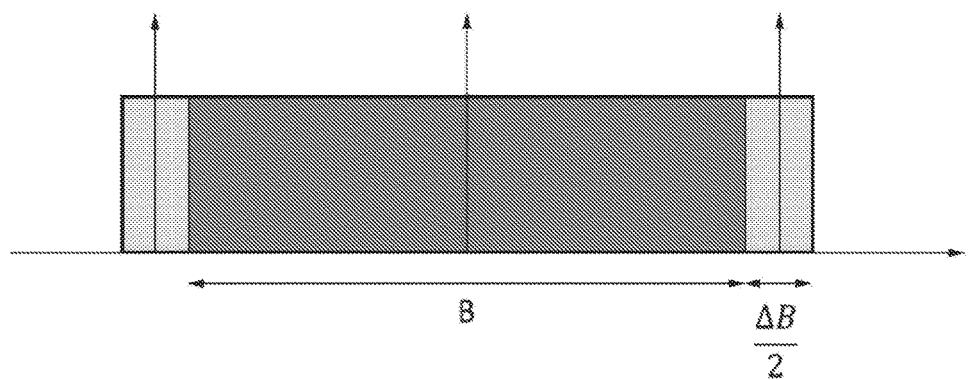
FIG. 18 schematically illustrates noise bandwidths for time twisted waves.

In this respect, FIG. 18 schematically illustrates noise bandwidths for time twisted waves: one defined according to minimum Nyquist bandwidth, the other related to the bandwidth increase for solving ambiguity aspects.

The above noise structure can be written as:

$$n_t(t)e^{j2\pi f_0 t} = n_{int\,B}(t)e^{j2\pi f_0 t} + \frac{1}{\sqrt{2}}n_{ext}(t)\left[e^{j2\pi(f_0+\frac{B+\Delta B/2}{2})t} + e^{j2\pi(f_0+\frac{B+\Delta B/2}{2})t}\right],$$

where $n_{int\,B}(t)$ denotes the noise part related to the symbol rate bandwidth, and $n_{ext}(t)=n_{ext\Delta B}(t)e^{j\varphi_{\Delta B}(t)}$ denotes the additional noise part due to the need of avoiding ambiguities on the symbol rate phasing.

$n_{int\,B}(t)$, when sampled at the symbol rate, is an even function (no information on the odd sampling).

Moreover, $$\sqrt{2}\,n_{ext\Delta B}(t)e^{j2\pi f_0 t}\cos\left[2\pi\left(\frac{B+\Delta B/2}{2}\right)t + \varphi_{\Delta B}(t)\right]$$

causes an additional contribution on the even and odd components.

With reference to FIG. 18, the noise in the Nyquist band can be represented by a sinc time pulse, which is an even function, while the two sidebands can be represented by an even and an odd component.

In terms of relation between the noise components, it can be written:

$$\frac{\text{noise}_{even}}{\text{noise}_{odd}} \cong \frac{B+\Delta B}{\Delta B} = 1 + \frac{B}{\Delta B}.$$

Considering the above for a simplified rect filter, the odd modes can be presented as:

$$\text{POWER MODES}_N = 2\sum_{k=1}^{N}\left(\frac{2}{k\pi}\right)^2,$$

for the first modes ±1 there results $$\frac{8}{\pi^2} \cong 0.81;$$

$$\left(\frac{C}{N}\right)_{odd} = \frac{0.81\Delta B}{B+\Delta B}\sigma_t,$$

for a bandwidth increase of 1 over 18 there results $$\left(\frac{C}{N}\right)_{odd} = -11.8 + \sigma_{tdB}\text{dB} = -11.8 + \left(\frac{C}{N}\right)_{even}\text{dB};$$

the 11.8 dB term can be considered as the minimum gain against unwished interferences.

Actually, there is a reduction of this advantage, due to the fact that the channel filter is typically divided into two parts, namely the transmission filter and the reception filter; therefore the noise is filtered lesser than the signal, thereby causing an increase of some dBs in the above reduction factor.

Instead, as for the case of frequency twisted waves, there is no need of filters, and the signal can be considered a rect signal in time domain. As previously explained, a cyclic prefix is used, which reduces interference between time frames (and allows to properly combine multipath signals), but there is no noise advantage for frequency twisted signals, due to the statistical nature of the frequency analysis.

Figure 19:
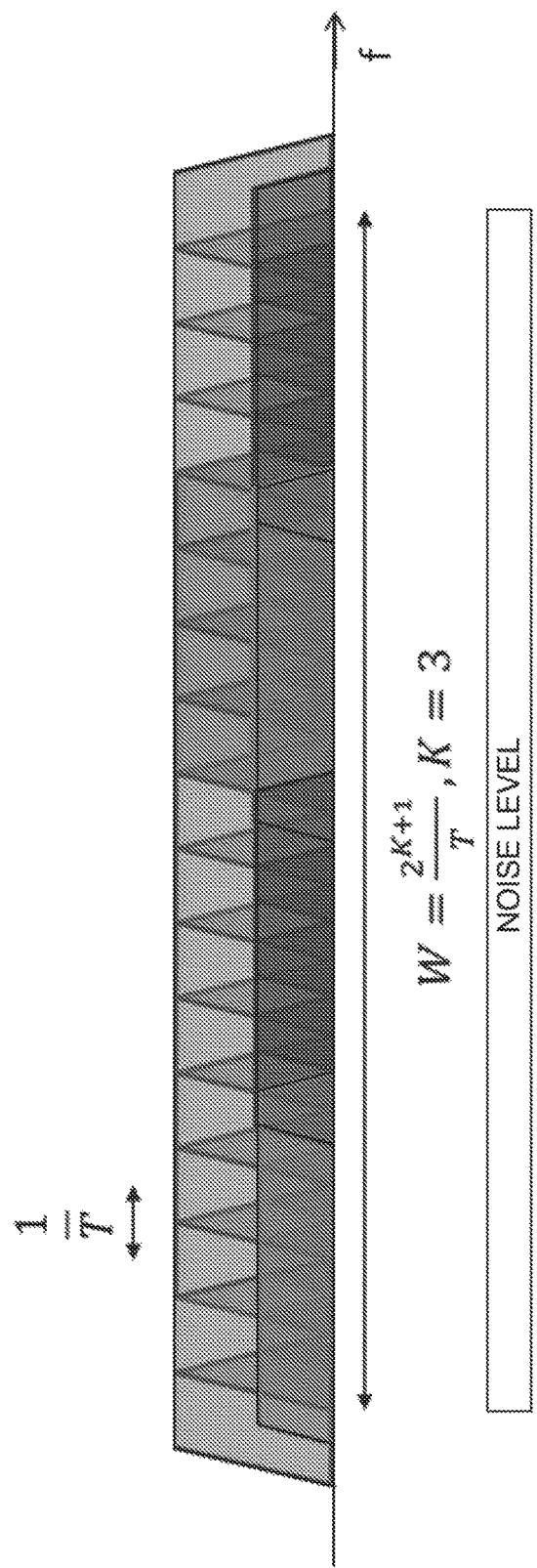
FIG. 19 schematically illustrates noise impact in the case of frequency twisted waves.

In particular, as for the case of frequency twisted waves, the noise spectrum occupies the bandwidth W and there is not any possibility of separating, in the time domain, its even and odd components for a single frequency pulse, as shown in FIG. 19 (which schematically illustrates noise impact in the case of frequency twisted waves).

In fact, in the time domain the noise signal samples are not associated with the main signal samples, but they are distributed all along the time interval, which is utilized for reconstructing the frequency sampling value (FFT). Therefore it is not possible to associate the main contribution of the noise to the main samples and there is no additional advantage for higher modes, as in the case of time twist.

From a formal point of view, the application of frequency twist can be regarded as the application of the twist methodology to the conjugated variable of the time.

The main differences between time and frequency twist are related to:
- the behavior of twisted modes with respect to noise, wherein, as previously explained, time twisted modes have an advantage over frequency twisted modes; and
- the bandwidth increase with respect to the Nyquist limit, wherein frequency twisted modes have an advantage over time twisted modes (as explained in WO 2015/067987 A1 and WO 2015/068036 A1, with the use of time twist a bandwidth increase is necessary, otherwise the pseudo-inverse matrix determinant would be equal to zero).

For time twist the bandwidth is as close as possible to the Nyquist bandwidth. For frequency twist the bandwidth is limited to the inverse of the time signal duration, leaving to the frequency pulse the possibility to be not limited to the main pulse.

The above implies a very different behavior for twisted modes, when folded into the information bandwidth. This feature is strongly related to the value of the pseudo-inverse matrix. In fact, the bandwidth of the time twisted signal is limited to the Nyquist band increased by a percentage necessary for keeping the information on the residual carrier, or (the same phenomenon looking at a different property) for causing the pseudo-inverse matrix determinant to be different than zero. Considering that the information flow is defined by the sampling rate, in practical terms the additional bandwidth required is folded into the Nyquist bandwidth, thereby determining, on the one hand, a residual small inter-frame interference (being the interference inside the frame taken into account by the generalized matched filter matrix) and, on the other hand, a residual power density at the Nyquist boundary necessary for keeping information on the residual carrier of higher order modes and for maintaining the pseudo-inverse matrix determinant different from zero.

In the following the present invention will be described in detail. To this end, a brief overview of mobile communication systems and a more detailed overview of LTE standard will be at first presented.

The evolution of mobile systems has boosted communication technologies, systems and networks and has contributed to a dramatic innovation era moving, in less than 35 years, from analogical systems dedicated to thousands of users for phone conversation to multimedia high-throughput networks for billions of users.

Mobile systems have developed in these years two complementary features: high mobility and high throughput, in combination with a strong simplification of the user mobile hardware.

It is important to outline the changes in approaching the signal architecture, passing from a narrow band time signal structure (in the case of GSM standard) to a broadband time signal structure (in the case of UMTS standard) up to a broadband frequency signal structure (in the case of LTE standard and future 5G mobile networks based on OFDM, OFDMA and SC-FDMA).

In November 2004 the 3GPP (i.e., 3rd Generation Partnership Project) started a project intended to define the Long-Term Evolution (LTE) of Universal Mobile Telecommunications System (UMTS) cellular technology in order to get:

higher performance;
backward compatibility; and
wide application.

As is known, LTE employs OFDMA for downlink data transmission and SC-FDMA for uplink transmission.

The use of OFDMA for downlink allows to improve the spectral efficiency, reduce Inter-Symbol Interference (ISI) effect due to multipath, and simplify the measures against frequency selective fading. Instead, for uplink transmission SC-FDMA was selected because it represents a single-carrier multiple access technique which has structure and performance similar to OFDMA, but with a salient advantage over OFDM (OFDMA), namely a low Peak-to-Average Power Ratio (PAPR) (typically an advantage of 6 dB). Therefore the main advantage of such a configuration is that power consumption of mobile terminals is reduced, thereby increasing the battery life.

Figure 20:
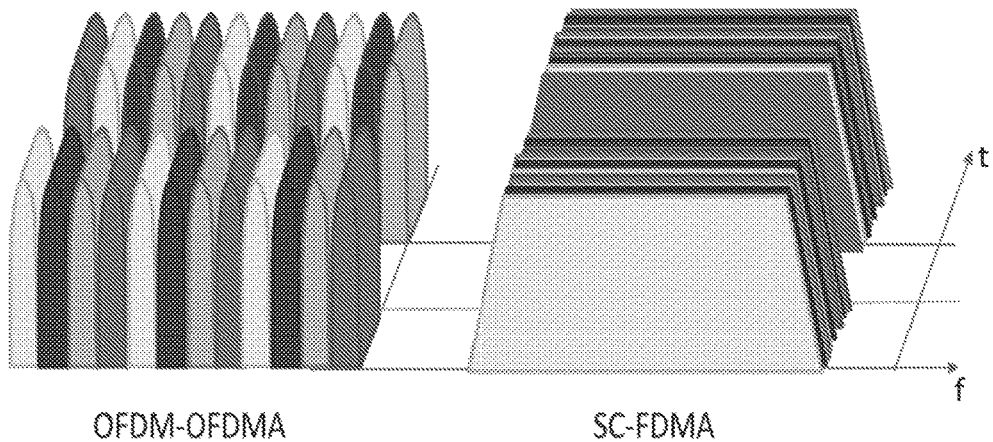
FIG. 20 schematically illustrates a comparison between frequency slot allocations in OFDM-OFDMA and SC-FDMA.

As is known, in OFDM-OFDMA one symbol is associated with one sub-carrier, in particular each symbol occupies a respective sub-carrier (with bandwidth of 15 kHz) for one OFDMA symbol period, while in SC-FDMA a symbol is associated, in a respective time slot, with a plurality of sub-carriers, in particular each symbol occupies a plurality of sub-carriers (for example twelve sub-carriers) for a fraction of the SC-FDMA symbol period. In this connection, FIG. 20 schematically illustrates a comparison between frequency slot allocations in OFDM-OFDMA and SC-FDMA.

In an extreme synthesis, the main reasons for the introduction of a new standard of the radio interface were:
significantly increased peak data rates;
increased cell edge bit rates;
improved spectrum efficiency (no roll-off is needed);
improved latency;
scalable bandwidth;
reduced CAPEX (CAPital EXpenditure) and OPEX (OPerating EXpenditure);
acceptable system and terminal complexity, cost and power consumption;
compatibility with earlier releases and with other systems; and
optimization for low mobile speed with support for high mobile speed.

In particular, the goal of significantly increased peak data rates, linearly scaled according to spectrum allocation, implies the following targets:
instantaneous downlink peak data rate of 100 Mbps in a 20 MHz downlink spectrum (i.e., 5 bit/s/Hz); and
instantaneous uplink peak data rate of 50 Mbps in a 20 MHz uplink spectrum (i.e., 2.5 bit/s/Hz).

The mobility enhancement defined by the transition from the existing UTRAN (Universal Terrestrial Radio Access Network) to the Evolved UTRAN (E-UTRAN) implies that the mobile channel:
is optimised for mobile speeds from 0 to 15 km/h;
supports, with high performance, speeds between 15 and 120 km/h;
maintains mobility at speeds between 120 and 350 km/h and even up to 500 km/h depending on the frequency band; and
supports voice and real-time services over the entire speed range with quality at least as good as UTRAN.

Another important reason to change from time to frequency is the spectrum flexibility. In fact, the new E-UTRA (Evolved Universal Terrestrial Radio Access) is capable of:
operating in 1.25, 1.6, 2.5, 5, 10, 15 and 20 MHz allocation, allowing different possibilities for re-using uplink and downlink spectrum already in use, paired and unpaired;
coexisting with GERAN/3G (GSM EDGE Radio Access Network/3G) on adjacent channels with other operators on adjacent channels, with overlapping or adjacent spectrum at country border; and
enabling handover with UTRAN and GERAN and also with other non-3GPP technologies (such as CDMA 2000, WiFi, WiMAX).

In LTE the access network is simplified with respect to previous cellular standards and just comprises the evolved base stations, wherein in LTE the base station is called Evolved Node B (abbreviated as eNodeB or eNB). In this connection, FIG. 21 schematically illustrates LTE radio protocol stack architecture of an eNB, which, as is broadly known, includes (from top to bottom):
an Inter-Cell Radio Resource Management (RRM) layer;
a Radio Bearer (RB) Control layer;
a Connection Mobility Control layer;
an eNB Measurement Configuration and Provision layer;
a Dynamic Resource Allocation (Scheduler) layer;

a Radio Resource Control (RRC) and Packet Data Convergence Protocol (PDCP) layer;
a Radio Link Control (RLC) layer;
a Media Access Control (MAC) layer; and
a Physical Layer (which, as previously explained, is based on SC-FDMA for the uplink and OFDMA for the downlink; two modes being considered, namely Frequency-Division Duplexing (FDD) and Time-Division Duplexing (TDD)).

LTE shall include also a new form of Multimedia Broadcast Multicast Services (MBMS) called eMBMS (i.e., evolved MBMS), compatible with LTE physical Layer.

Figure 21:
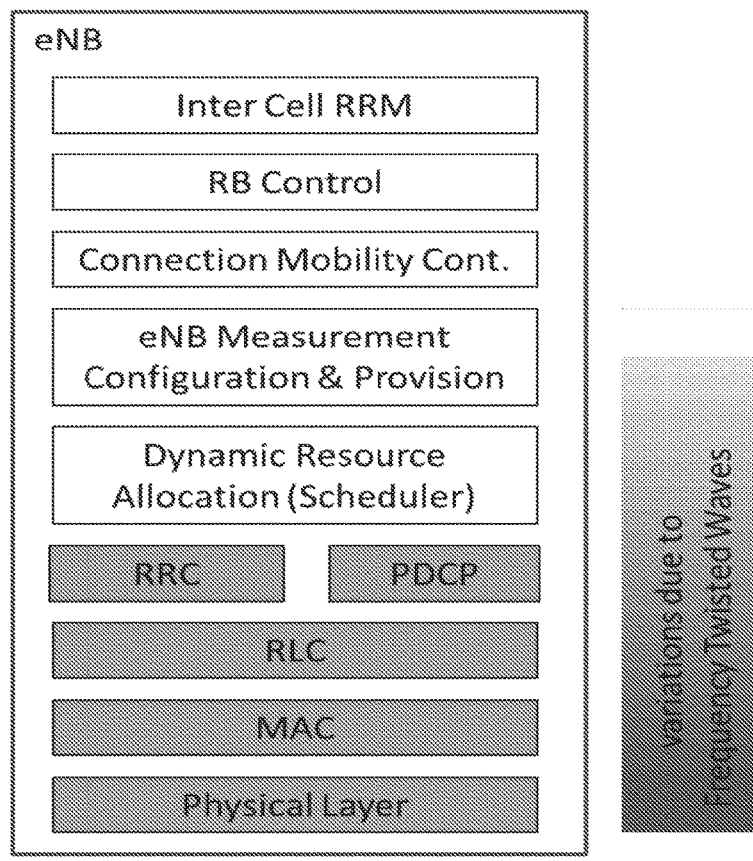
FIG. 21 schematically illustrates LTE radio protocol stack architecture of an Evolved Node B along with layers involved by the introduction of frequency twisted waves.
Figure 22:
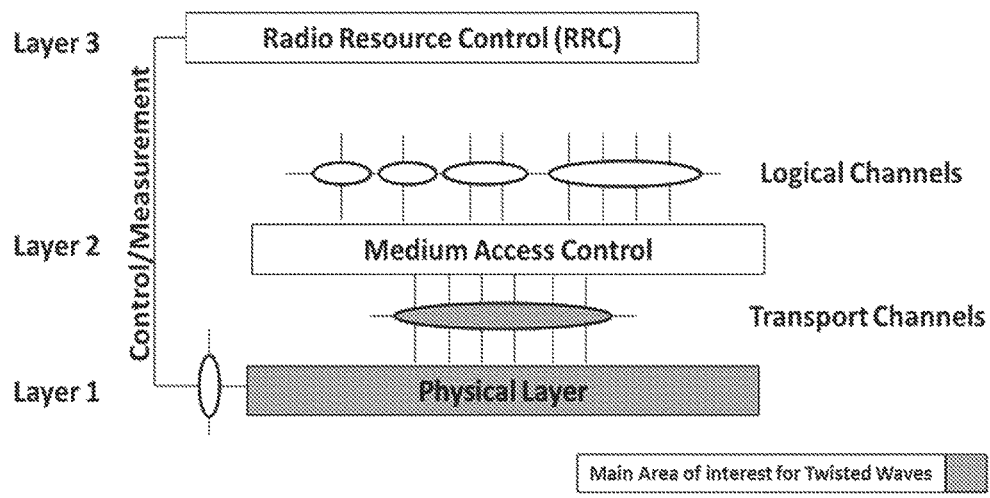
FIGS. 22 and 23 shows, respectively, LTE main radio access layers along with the area mainly involved by the integration of the frequency twisted waves, and main 3GPP Technical Specifications to be modified to include frequency twisted waves.
Figure 23:
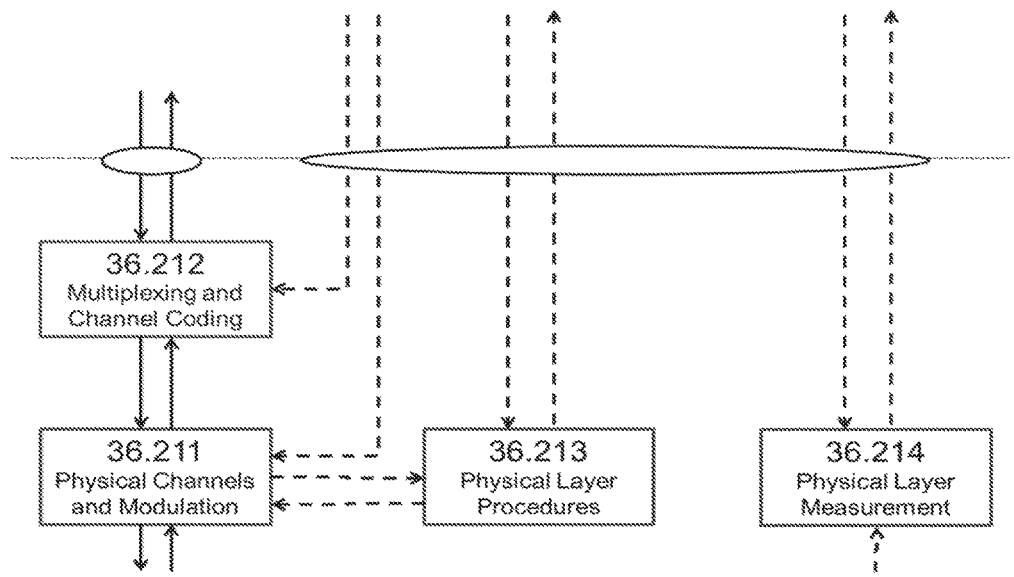

As shown in FIG. 21, the introduction of frequency twisted waves has a limited impact on eNBs. In principle, it changes only the Physical Layer by adding the additional channels generated by the frequency twist technique with a full compatibility with OFDM-OFDMA and SC-FDMA. In practical terms, some modifications could be required also to the RLC layer, the MAC layer up to the Scheduler and the eNB Measurement Configuration and Provision layers. These modifications are related, on the one hand, to management of the additional transmission capacity created by the use of frequency twisted waves, and, on the other hand, to the management of the different behavior of the frequency twisted waves in multipath environment. In this connection, FIGS. 22 and 23 shows respectively:

LTE main radio access layers (i.e., RRC, MAC and Physical layers) along with the area mainly involved by the integration of the frequency twisted waves (which area, as illustrated in FIG. 22, is mainly related to the Physical Layer below the MAC layer); and main 3GPP Technical Specifications concerning the Physical Layer to be modified to include frequency twisted waves.

LTE Physical Layer is defined in a "bandwidth-agnostic" way thereby being adaptable to various spectrum allocations.

Figure 24:
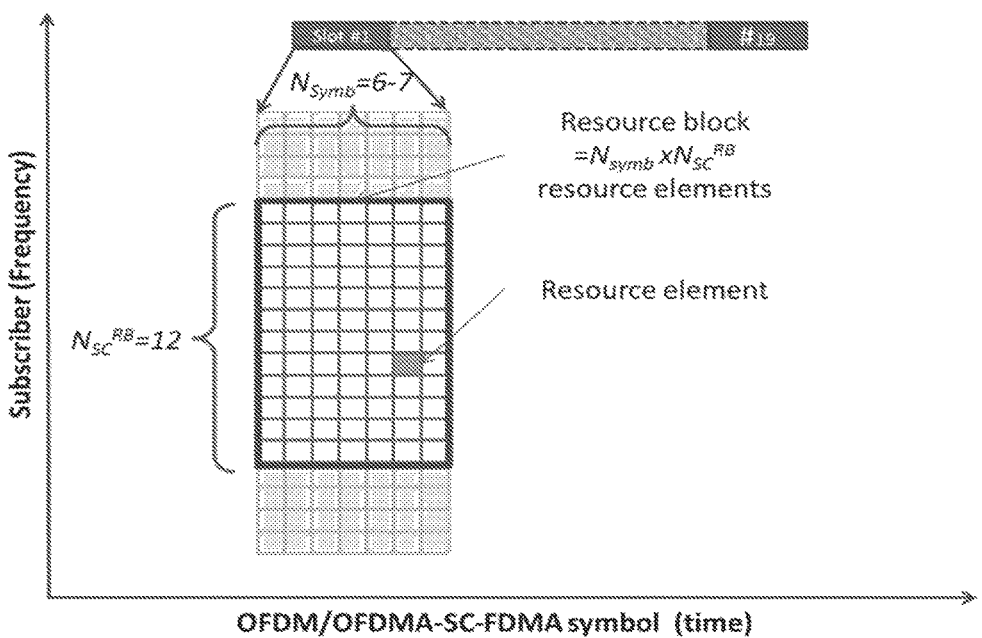
FIG. 24 schematically illustrates a traditional LTE physical resource block.

The traditional LTE radio frame for both FDD and TDD has a duration of 10 ms and consists of 20 time slots each with a duration of 0.5 ms. Two adjacent time slots form one sub-frame of length 1 ms. A physical resource block (PRB) spans either 12 sub-carriers with a sub-carrier bandwidth of 15 kHz, or 24 sub-carriers with a sub-carrier bandwidth of 7.5 kHz, each over a time slot duration of 0.5 ms. In this respect, FIG. 24 schematically shows a traditional LTE physical resource block, wherein:
one frame is 10 ms and contains 10 sub-frames;
one sub-frame is 1 ms and contains 2 time slots;
one time slot is 0.5 ms and involves N physical resource blocks (with 6<N<110); and
one physical resource block is 0.5 ms and contains 12 sub-carriers.

An additional framing is defined for TDD owing to backward compatibility with Time Division Synchronous Code Division Multiple Access (TD-SCDMA).

The physical channels defined in downlink are the Physical Downlink Shared Channel (PDSCH), the Physical Downlink Control Channel (PDCCH) and the Common Control Physical Channel (CCPCH). The physical channels defined in uplink are the Physical Uplink Shared Channel (PUSCH) and the Physical Uplink Control Channel (PUCCH).

In addition, signals are defined as reference signals, primary and secondary synchronization signals or random access preambles.

The modulation schemes supported in downlink and uplink are QPSK, 8-PSK, 16-QAM, 32-QAM and 64-QAM. The Broadcast channel use only QPSK.

The channel coding scheme for transport blocks in LTE is Turbo Coding with a coding rate of R=⅓, two 8-state constituent encoders and a contention-free Quadratic Permutation Polynomial (QPP) turbo code internal interleave. Trellis termination is used for the turbo coding. Before the turbo coding, transport blocks are segmented into byte aligned segments with a maximum information block size of 6144 bits. Error detection is supported by the use of 24 bit Cyclic Redundancy Check (CRC).

The generic frame structure is applicable to both FDD and TDD. Each radio frame is long and consists of 20 time slots of length $T_{slot}$=15360×Ti=0.5 ms, numbered from 0 to 19. The structure of each half-frame in a radio frame is identical. A sub-frame is defined as two consecutive time slots.

As previously explained, LTE employs OFDMA for downlink data transmission and SC-FDMA for uplink transmission. The main reasons for changing with respect to the former cellular standards are based on the need to increase the available bandwidth, taking into account the channel fading, and, at the same time, on the system flexibility for low, medium and high communication throughputs.

In particular, the use of OFDM allows, on the one hand, to limit the effects due to frequency selective fading and, on the other hand, to constructively combine two or more RF paths at the receiver.

In fact, the coherence bandwidth of the channel is often smaller than the bandwidth of the signal. The use of OFDM and its exploitation of independent orthogonal partially overlapped frequency slots offers the possibility of managing, in an optimum way, the presence of frequency slots damaged by frequency selective fading, thereby limiting only their transmission characteristics, without sensitive impacts on the remaining slots. Therefore, the transmission capability can be optimized by properly managing the channels, without an expensive and complex equalization system.

Figure 25:
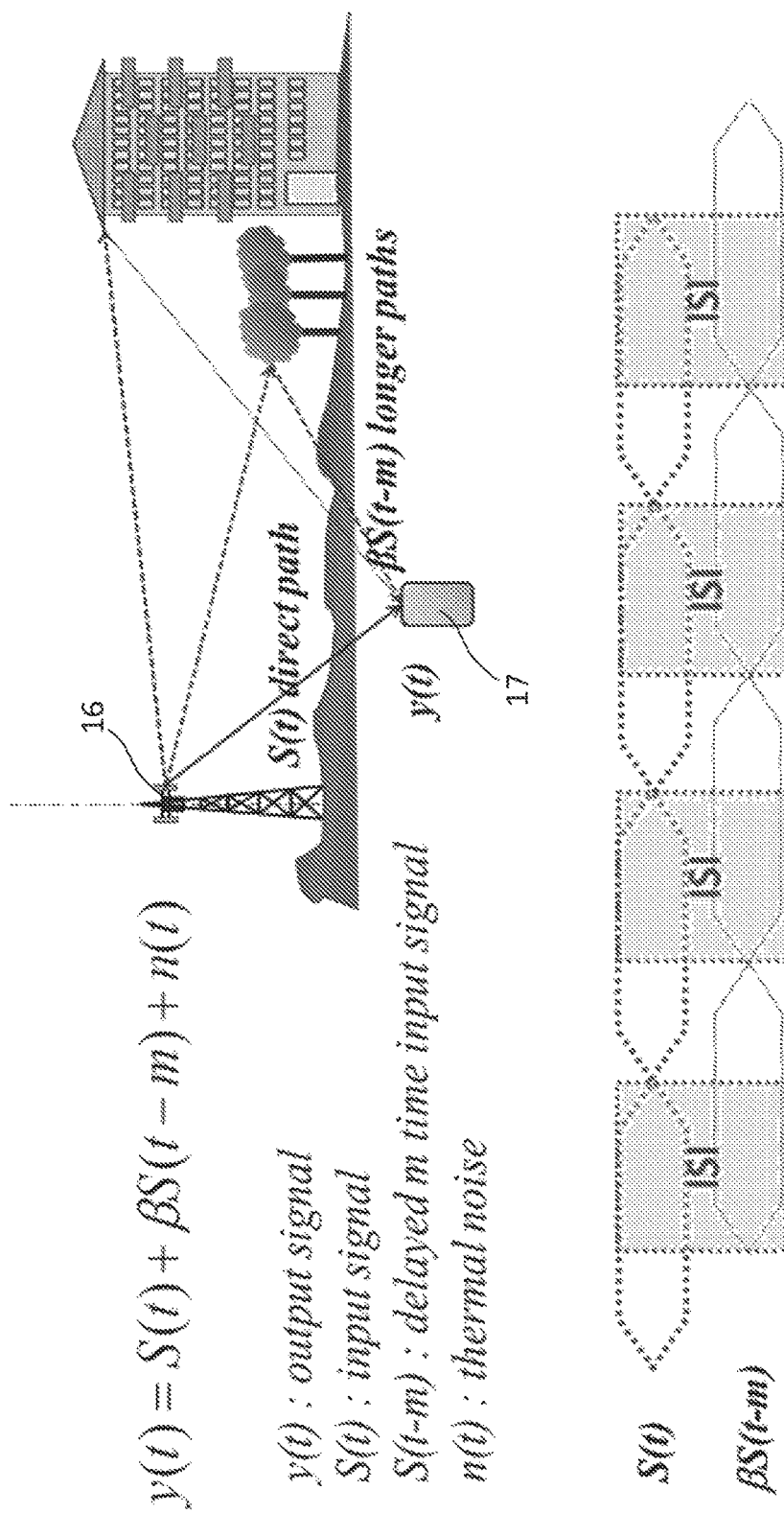
FIG. 25 schematically illustrates an example of multipath scenario.

In order to combine more paths at the receiver the cyclic prefix is used, which has a key importance also for reducing ISI. In this respect, FIG. 25 schematically illustrates an example of multipath scenario, wherein radio signals transmitted by an eNB 16 reach a user terminal 17 along different paths and, thence, with different propagation delays, thereby giving rise to frequency selective fading and ISI. ISI can be limited by rendering the baud rate of each symbol small. This is one of the main reasons for introducing OFDM. Moreover, as previously explained, the use of the cyclic prefix allows the coherent combination of multiple paths when the signal delay is lesser than the cyclic prefix itself.

As previously stated, twisted waves can be applied in both time and frequency domains. Both technologies may be applied to mobile communication systems, in particular time twisted waves are applicable to mobile technologies up to 3G, while frequency twisted waves are applicable to OFDM, OFDMA and also to SC-FDMA, as explained in the following.

Figure 26:
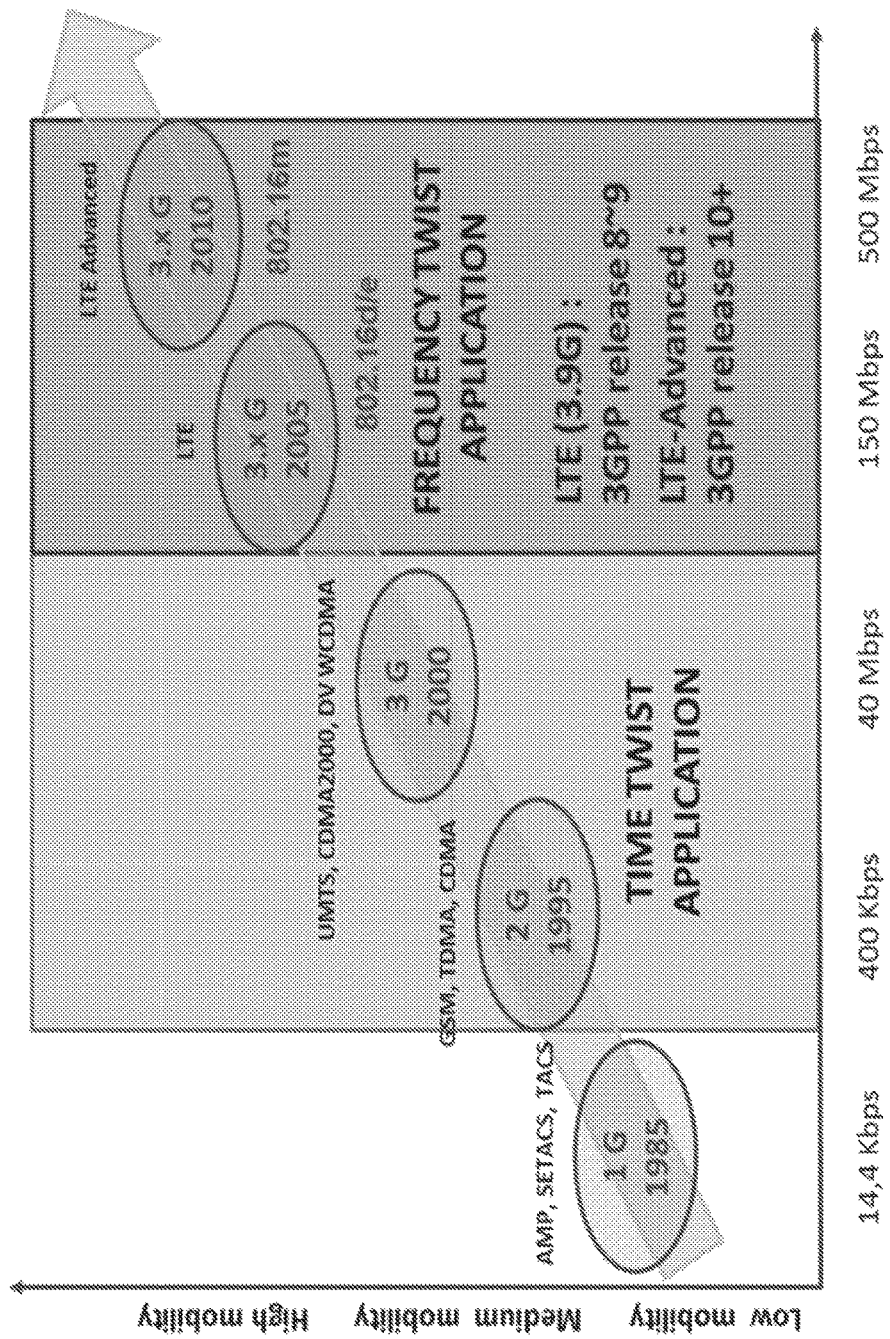
FIG. 26 schematically illustrates evolution of mobile communication technologies along with the potential introduction of time and frequency twisted waves.

In particular, the application of time twisted waves to older mobile technologies and of frequency twisted waves to newer mobile technologies is due to the sampling domain choice: time for technologies up to 3G and frequency for 4G and following. In this respect, FIG. 26 schematically illustrates evolution of mobile communication technologies along with the potential introduction of time and frequency twisted waves. In particular, twisted waves can be seen as an additional layer, which can be introduced without major changes in the mobile access hierarchy. The way to generate time and frequency twisted waves is described in detail in WO 2015/067987 A1, WO 2015/068036 A1 and PCT/FR2014/051394 and has been also conceptually summarized in the foregoing.

Synthetically, the generation of time twisted modes is accomplished by considering the signal development in a time frame and by introducing a transmission matrix and a reception matrix capable of, respectively, generating at the transmission side and elaborating at the reception side the signal stream on the basis of its property of symmetry and antisymmetry with respect to the defined time frame. Moreover, as for frequency twist, the situation is slightly different. In fact, the transmission and reception matrices are already used for OFDMA and SC-FDMA and, thence, they need only to be enriched with additional columns and rows such that to allow the introduction of the additional equations required by the frequency twisted wave modes. It has to be noted that in a digital environment all the operations are performed in time domain; consequently OFDM and OFDMA generate frequency characteristics based on signal time statistics (i.e., frequency behavior). Therefore the introduction of frequency twisted waves is largely softer in the case of OFDM-OFDMA rather than in the case of time access methods.

In the following an evaluation of the system performance in a mobile environment using twisted waves will be provided.

The main characteristics of a mobile channel are synthesized in the following:
  power limitation for both downlink (i.e., from the base station to the mobile terminal) and uplink (i.e., from the mobile terminal to the base station); in particular the mobile terminals generally require a low Output Back-Off (OBO) in order to optimize power consumption;
  interference from other service areas (spots); in particular, the situation can be very different according to the access system used for the mobile systems (from GSM-PCS, where essentially the frequency reuse scheme is, with a good approximation, fixed, up to UMTS based on CDMA and characterized by a large variability of the interference level due to the traffic conditions, and to LTE based on OFDM-OFDMA, where the available bandwidth is adaptive according to the multipath conditions (fading and frequency selective interference));
  variability of the channel impairment during service;
  environmental and thermal noises (multipath, fading and classical thermal noise).

The introduction of LTE has allowed to design and define a standard such that to optimize the overall spectral efficiency (bit/Hz/s) as a function of the signal-to-noise ratio (S/N or SNR).

In particular, three cell sizes have been defined for LTE:
  5 km optimal performance;
  30 km acceptable performance;
  extended cell up to 100 km.

These performances are roughly based on the capability of combining the cell diameters with the OFDM frequency slots.

From a system perspective, frequency twisted waves introduce a relation among a group of frequency slots. This condition reduces the cell diameter, considering the same environmental conditions and in agreement with the number of frequencies belonging to the frequency group.

In particular, using frequency twisted modes ±1, the frequency twisted wave group is extended over 5 plane wave frequency slots; adding modes ±2 the group is extended over 9 plane wave frequency slots. This grouping increases the OFDM-OFDMA frequency granularity by a factor of 5 or 9; therefore this grouping reduces the diameter of the cell, where the maximum performances are guaranteed.

The above implies that users in one and the same cell could have the possibility of either using or not the additional frequency twist layer according to their distance from the base station.

Figure 27:
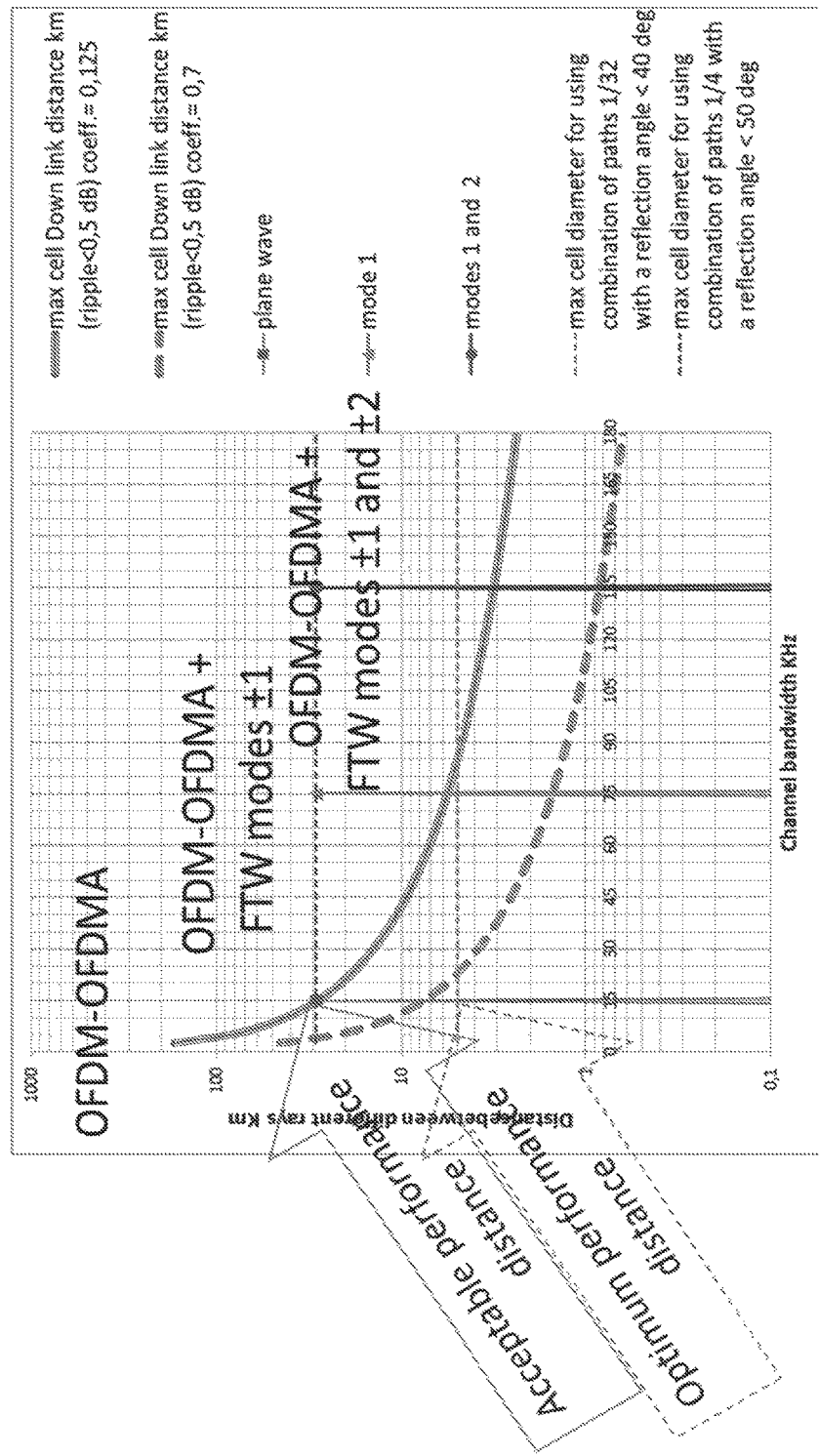
FIG. 27 schematically illustrates relation between the use of frequency twisted waves and the distance from a base station of an LTE network.

In this respect FIG. 27 schematically shows relation between the use of frequency twisted waves and the distance from the base station (i.e., eNB) of an LTE network. In particular, FIG. 27 schematically illustrates a principle: on the assumption of a given operative distance for OFDM-OFDMA, frequency twisted waves can be used up to a maximum distance that is five times smaller than said given operative distance in case of frequency twisted modes ±1, and nine times smaller if also modes ±2 are used.

As previously described with reference to FIG. 24, a traditional LTE physical resource block generally contains sub-carriers, or frequency slots. Therefore, frequency twisted waves are introduced so as to meet this OFDM/OFDMA physical resource block hierarchy and organization. In particular, with physical resource blocks of 12 frequency slots it is possible to use either two sets of frequency twisted modes ±1, or two sets of frequency twisted modes ±1 plus one set of frequency twisted modes ±2.

A preferred embodiment of the present invention involves only the use of frequency twisted modes ±1, which imply a higher flexibility and a lower hardware complexity than higher-order modes. Moreover, for frequency twisted modes ±1 the efficiency is equal to $10/12$ (in fact, ten frequencies are used for twisted modes ±1), while for modes ±2 nine frequencies are necessary and, thence, the efficiency is $9/12$. If also modes ±3 are used, the 12 frequency block is not sufficient and, thence, it is necessary to consider two blocks so as to include the 17 frequencies necessary for frequency twisted modes ±3.

Figure 28:
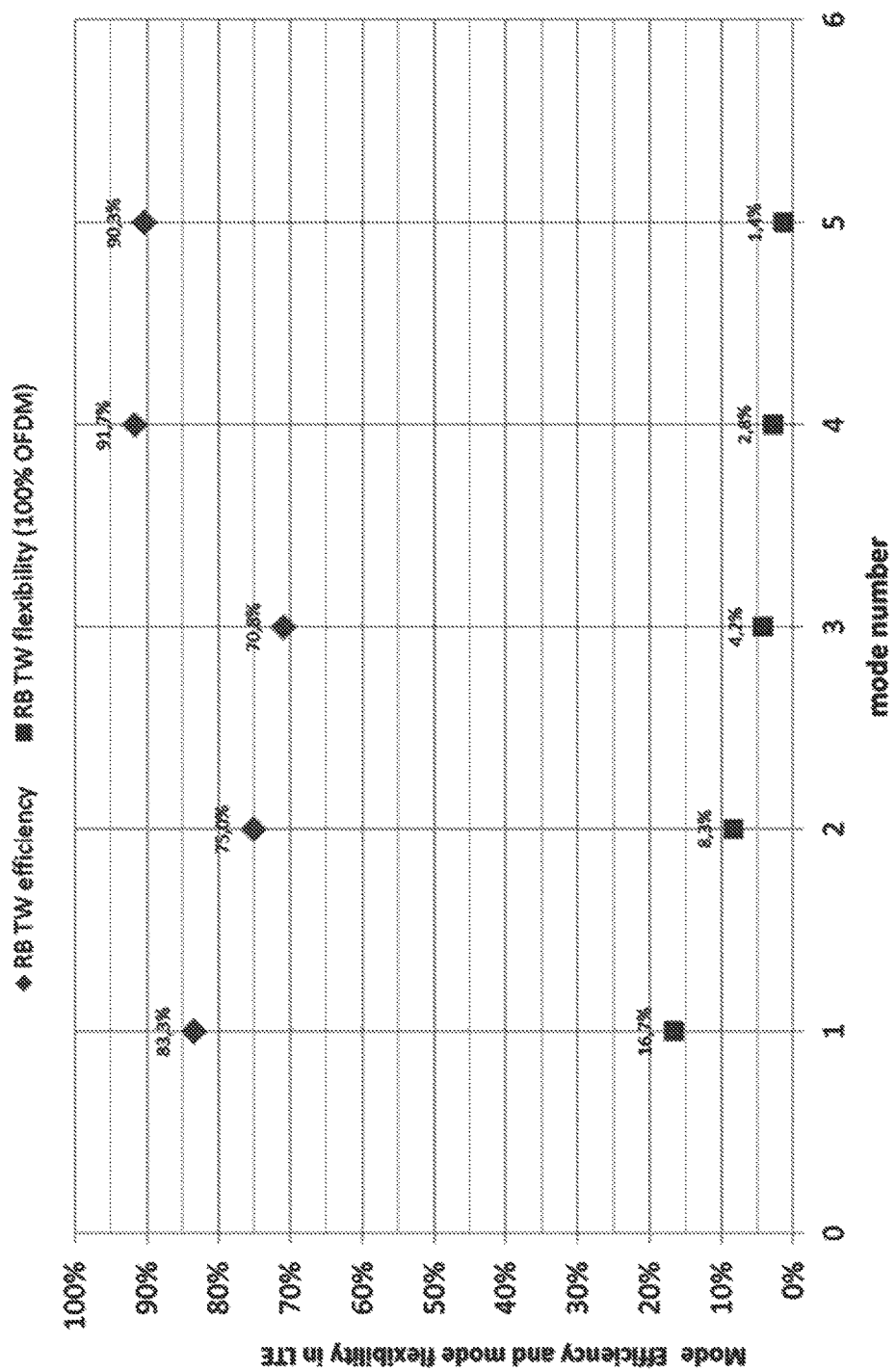
FIG. 28 schematically illustrates frequency twisted mode efficiency and flexibility in LTE as a function of the topological charge of the highest twisted modes used.

In this respect, FIG. 28 schematically shows frequency twisted mode efficiency and flexibility in LTE as a function of the topological charge of the highest twisted modes used. It is clear that the best selection is a compromise between flexibility, efficiency and hardware/software complexity. FIG. 28 confirms that a preferred solution involves only the use of the first modes ±1, which represent the best choice according to the three above criteria when frequency twisted modes up to ±3 are considered. Instead, from modes ±4 onwards the efficiency grows, but flexibility reduces and hardware/software complexity rises quickly, and consequently the use of these higher-order modes proves to be poorly practical.

Figure 29:
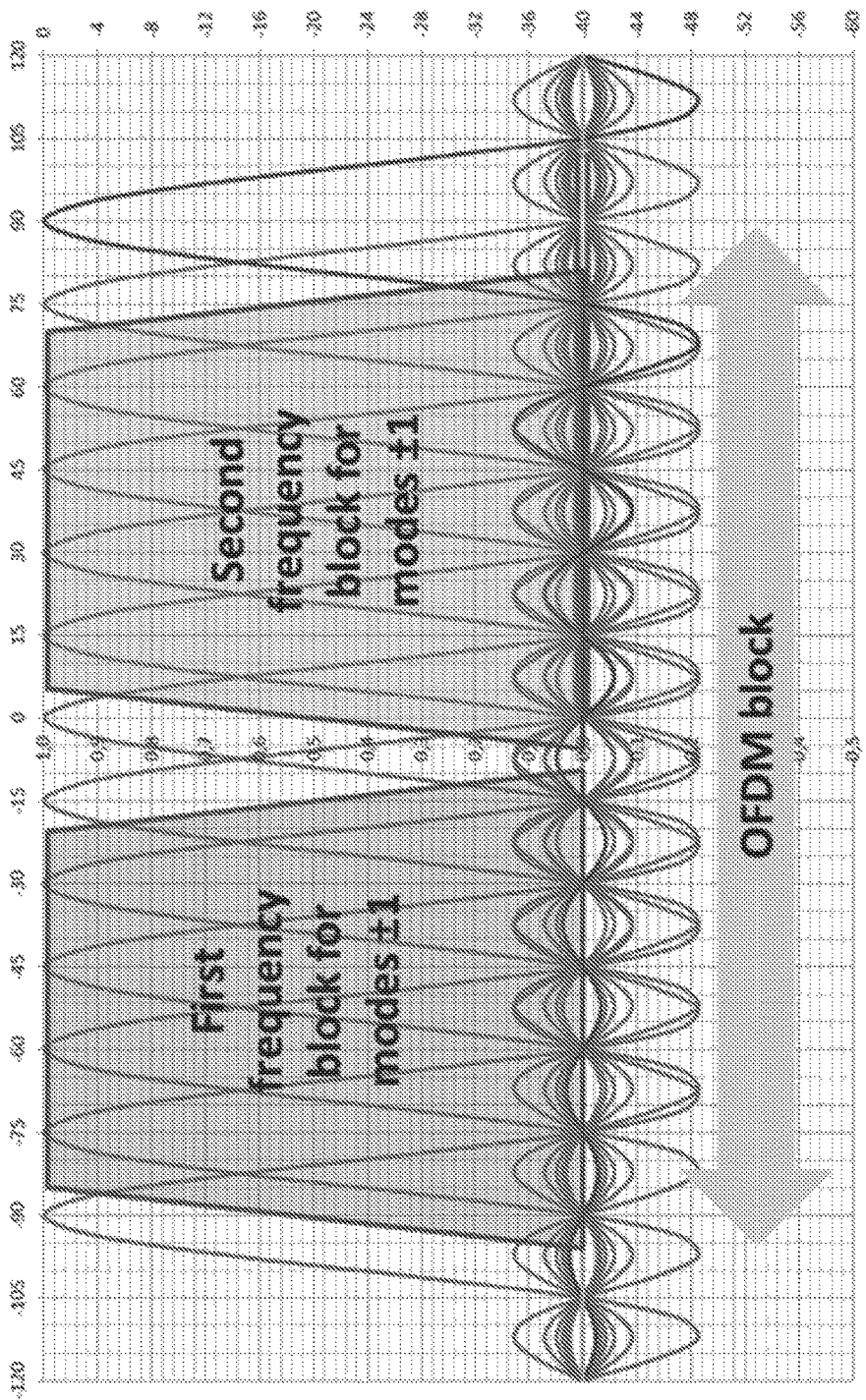
FIGS. 29 and 30 schematically illustrate an example of introduction of two sets of frequency twisted modes ±1 into an LTE physical resource block according to a preferred embodiment of the present invention.
Figure 30:
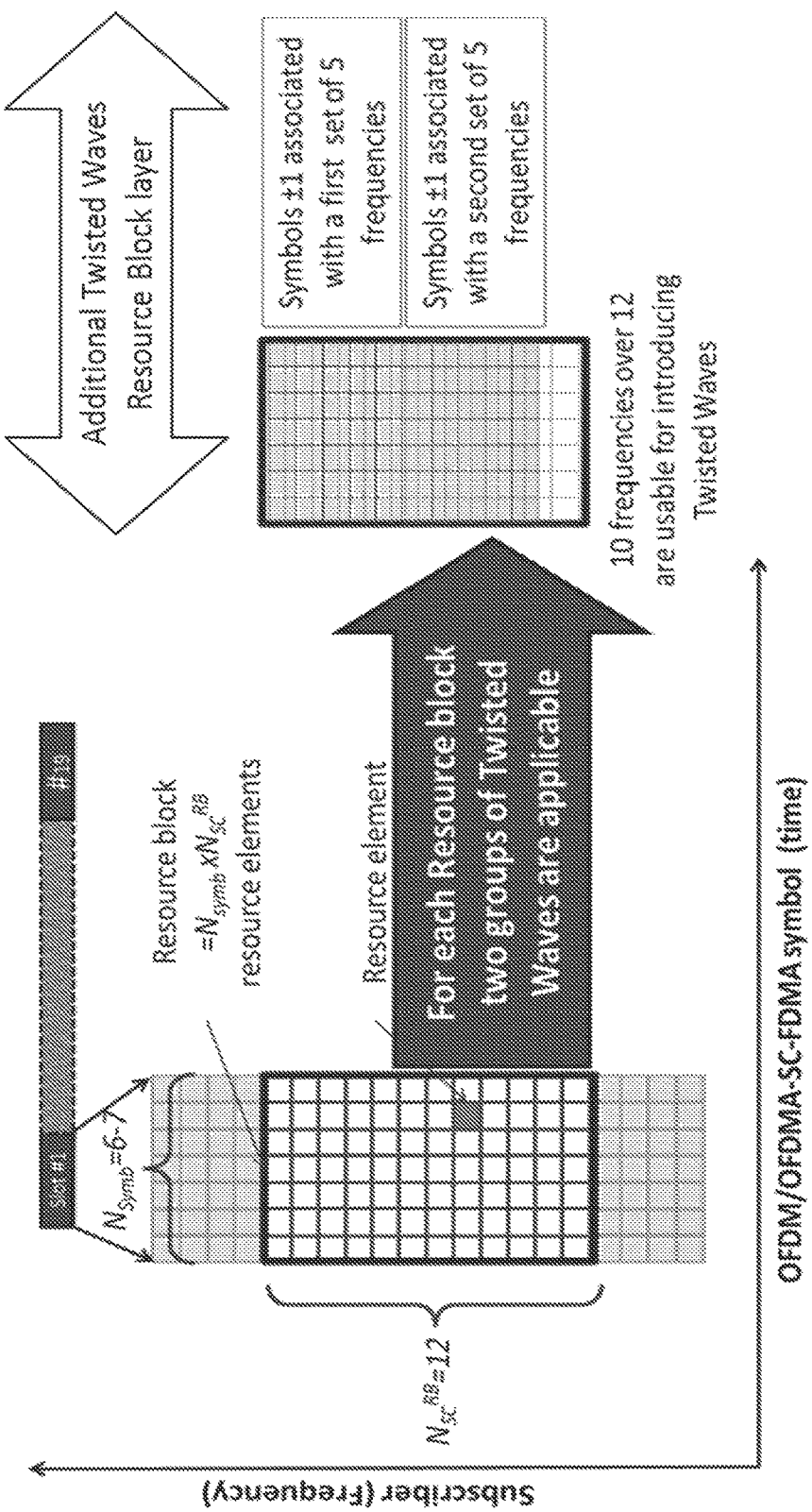

In this respect, FIGS. 29 and 30 schematically illustrate an example of introduction of two sets of frequency twisted modes ±1 into an LTE physical resource block of twelve sub-carriers according to a preferred embodiment of the present invention, wherein:
  a first mode +1 and a first mode −1 carry, each, a respective additional symbol by means of five respective additional frequency samples, each of which is positioned between two adjacent (or consecutive) LTE sub-carriers belonging to a first set of six consecutive LTE sub-carriers; and
  a second mode +1 and a second mode −1 carry, each, a respective additional symbol by means of five respective additional frequency samples, each of which is positioned between two adjacent (or consecutive) LTE sub-carriers belonging to a second set of six consecutive LTE sub-carriers.

In particular, FIG. 29 schematically illustrates positioning of the additional frequency samples of the two sets of frequency twisted modes ±1 in the LTE physical resource block, and FIG. 30 schematically illustrates the additional layer related to the two sets of frequency twisted modes ±1 inserted in said LTE physical resource block.

As shown in FIG. 30, the introduction of the two sets of frequency twisted modes ±1 into the LTE physical resource block of twelve sub-carriers allows the definition of an additional layer in the physical resource block, which additional layer has a limited impact on the overall OFDM-OFDMA LTE architectural organization.

It is worth noting that OFDM/OFDMA can integrate frequency twisted waves in a much simpler way than time twisted waves due to the fact that OFDM/OFDMA already exploits:

matrices at both transmission and reception sides for generating, respectively, the IFFT and FFT coefficients;
a cyclic prefix to limit the ISI level and to allow the multipath optimization (wherein this element can be considered equivalent to a bandwidth reduction of the frequency samples);
a processing of a full complex signal which carries additional information on the signal itself (thereby improving also the efficiency of the frequency twisted modes); and
a large bandwidth for the frequency pulses (in particular, a much larger bandwidth than that of the time pulses for time twisted waves).

Figure 31:
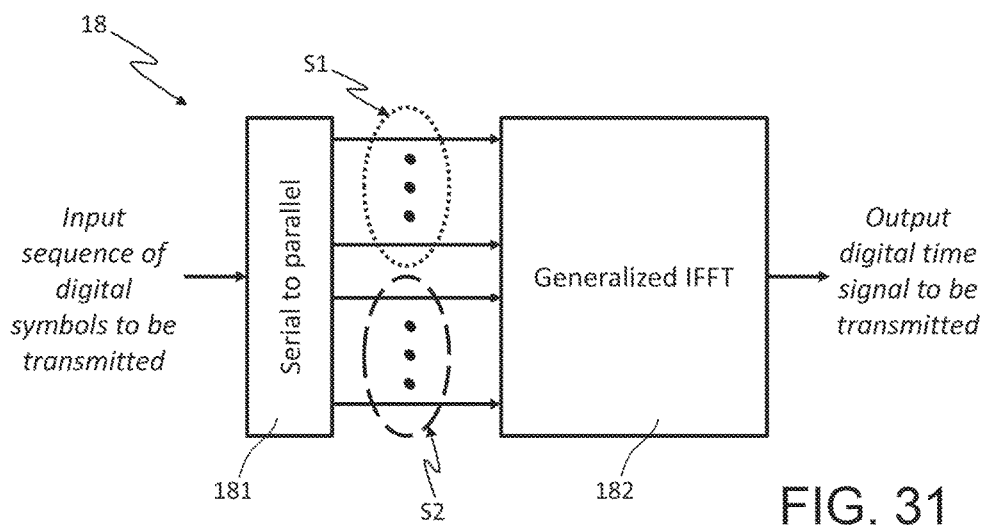
FIGS. 31 and 32 schematically illustrate working principle of, respectively, a transmitter and a receiver according to a preferred embodiment of the present invention related to the combined use of OFDMA with frequency twisted waves.
Figure 32:
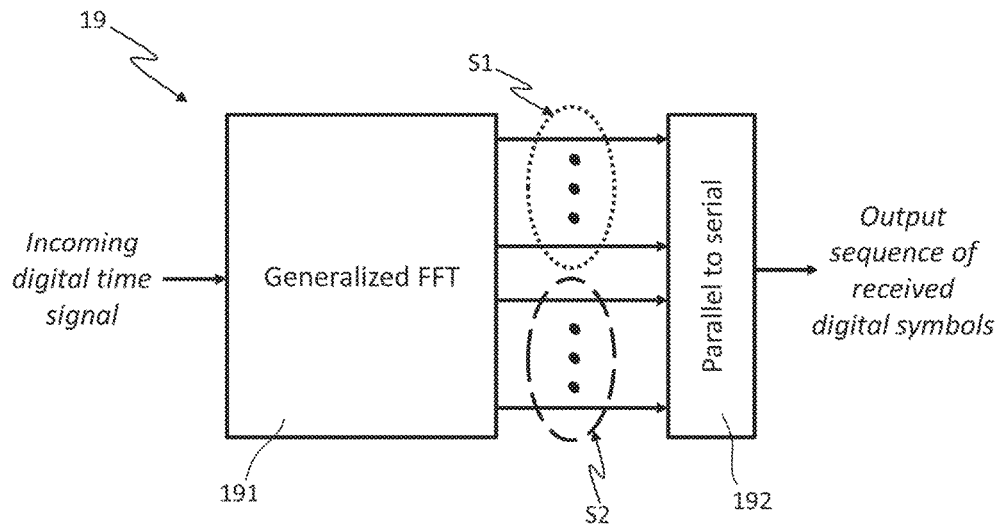

FIGS. 31 and 32 schematically illustrate working principle of, respectively, a transmitter (denoted as whole by 18) and a receiver (denoted as a whole by 19) according to a preferred embodiment of the present invention related to the combined use of OFDMA with frequency twisted waves (and, thence, suitable, for example, for LTE downlink transmissions).

In particular, as shown in FIG. 31, the transmitter receives (or generates) an input sequence of digital symbols to be transmitted. A serial-to-parallel conversion is applied to said sequence of digital symbols (block 181), thereby obtaining a first set of parallelized digital symbols S1 to be transmitted via traditional OFDMA, and a second set of parallelized digital symbols S2 to be transmitted via frequency twisted modes.

Then, a Generalized IFFT (i.e., Inverse Fast Fourier Transform) is applied to the parallelized digital symbols S1 and S2 (block 182) so as to generate an output digital time signal to be transmitted, which output digital time signal results from:

(traditional) OFDMA frequency samples carrying the digital symbols S1, wherein said OFDMA frequency samples are positioned at OFDMA frequencies spaced apart by a predetermined frequency spacing (i.e., at traditional OFDMA sub-carriers with a sub-carrier bandwidth of, for example, 7.5 or 15 kHz); and
additional twisted mode frequency samples carrying the digital symbols S2, wherein said twisted mode frequency samples are positioned at respective twisted mode frequencies that are shifted with respect to the OFDMA frequencies.

In practical terms, the Generalized IFFT (hereinafter also referred to as GIFFT) can be applied to the parallelized digital symbols S1 and S2 by conveniently using a transmission matrix [[GIFFT]], that is designed to implement, automatically and in a combined way, the following operations:

mapping the digital symbols S1 to the OFDMA frequencies and computing the corresponding OFDMA frequency samples;
allocating the digital symbols S2 to one or more frequency twisted modes and computing the corresponding twisted mode frequency samples; and
transforming, from frequency domain to time domain, the OFDMA and twisted mode frequency samples, thereby computing the time samples of the output digital time signal.

In other words, when the transmission matrix [[GIFFT]] is applied to the parallelized digital symbols S1 and S2, the time samples of the output digital time signal are automatically computed.

Preferably, the transmission matrix [[GIFFT]] is designed to implement also cyclic prefix generation so that, when applied to the parallelized digital symbols S1 and S2, a corresponding output digital time signal is automatically generated, which already includes, at the beginning, a respective cyclic prefix.

In the following a practical example is provided on the assumption that the LTE physical resource block previously described with reference to FIG. 24 (namely a physical resource block containing twelve sub-carriers) is used in combination with frequency twisted modes +1 and −1 according to the preferred embodiment of the present invention previously described with reference to FIGS. 29 and 30.

In particular, in this example, it is preferably assumed that the second set of parallelized digital symbols S2 includes four symbols.

Moreover, in this example, the application of the GIFFT to the parallelized digital symbols S1 and S2 (block 182) conveniently results in the generation of an output digital time signal obtained, via frequency-to-time transform, of:

twelve OFDMA frequency samples at OFDMA frequencies $p \cdot B_S$ (with p=1, 2, . . . , 12, and where $B_S$ denotes OFDMA frequency spacing) carrying the first set of parallelized digital symbols S1; and
twisted mode frequency samples carrying the second set of parallelized digital symbols S2 via frequency twisted modes +1 and −1, wherein said twisted mode frequency samples include
ten frequency samples which are related to frequency twisted mode +1 and which carry two respective symbols of said second set S2 via the frequency twisted mode +1, and
ten frequency samples which are related to frequency twisted mode −1 and which carry the other two symbols of said second set S2 via the frequency twisted mode −1.

In detail, the application of the GIFFT to the parallelized digital symbols S1 and S2 (block 182) conveniently results in that:

the symbols of said first set S1 are mapped to the twelve OFDMA sub-carriers and the corresponding OFDMA frequency samples are computed according to standard OFDMA;
a first symbol $a_1 e^{j\varphi_1}$ of said second set S2 is allocated to five respective frequencies $$B_S\left(\frac{3}{2}+k\right)$$

(with k=0, 1, 2, 3, 4) changing, for each frequency sample, the respective phase according to $$e^{+j\frac{2k\pi}{5}}$$

and weighting each frequency sample by ½ (i.e., multiplying, for each of the five respective frequencies, the first symbol $a_1 e^{j\varphi_1}$ by a respective complex coefficient $$\frac{e^{+j\frac{2k\pi}{5}}}{2}),$$

thereby obtaining five frequency samples which are related to the frequency twisted mode +1 and which carry said first symbol $a_1 e^{j\varphi_1}$ of said second set S2 via the frequency twisted mode +1;

a second symbol $a_2 e^{j\varphi_2}$ of said second set S2 is allocated to five respective frequencies $$B_S\left(\frac{3}{2}+k\right)$$

(with k=6, 7, 8, 9, 10) changing, for each frequency sample, the respective phase according to $$e^{+j\frac{2(k-6)\pi}{5}}$$

and weighting each frequency sample by ½ (i.e., multiplying, for each of the five respective frequencies, the second symbol $a_2 e^{j\varphi_2}$ by a respective complex coefficient $$\frac{e^{+j\frac{2(k-6)\pi}{5}}}{2}),$$

thereby obtaining five frequency samples which are related to the frequency twisted mode +1 and which carry said second symbol $a_2 e^{j\varphi_2}$ of said second set S2 via the frequency twisted mode +1;

a third symbol $a_3 e^{j\varphi_3}$ of said second set S2 is allocated to five respective frequencies $$B_S\left(\frac{3}{2}+k\right)$$

(with k=0, 1, 2, 3, 4) changing, for each frequency sample, the respective phase according to $$e^{-j\frac{2k\pi}{5}}$$

and weighting each frequency sample by ½ (i.e., multiplying, for each of the five respective frequencies, the third symbol $a_3 e^{j\varphi_3}$ by a respective complex coefficient $$\frac{e^{-j\frac{2k\pi}{5}}}{2}),$$

thereby obtaining five frequency samples which are related to the frequency twisted mode −1 and which carry said third symbol $a_3 e^{j\varphi_3}$ of said second set S2 via the frequency twisted mode −1; and a fourth symbol $a_4 e^{j\varphi_4}$ of said second set S2 is allocated to five respective frequencies $$B_S\left(\frac{3}{2}+k\right)$$

(with k=6, 7, 8, 9, 10) changing, for each frequency sample, the respective phase according to $$e^{-j\frac{2(k-6)\pi}{5}}$$

and weighting each frequency sample by ½ (i.e., multiplying, for each of the five respective frequencies, the fourth symbol $a_4 e^{j\varphi_4}$ by a respective complex coefficient $$\frac{e^{-j\frac{2(k-6)\pi}{5}}}{2}),$$

thereby obtaining five frequency samples which are related to the frequency twisted mode −1 and which carry said fourth symbol $a_4 e^{j\varphi_4}$ of said second set S2 via the frequency twisted mode −1.

If also frequency twisted modes +2 and −2 are used, the second set of parallelized digital symbols S2 includes six symbols, i.e., the four symbols carried via the frequency twisted modes +1 and −1 plus two additional symbols that are carried via:

nine frequency samples which are related to the frequency twisted mode +2 and which carry a first symbol of said two additional symbols via the frequency twisted mode +2; and nine frequency samples which are related to the frequency twisted mode −2 and which carry the second symbol of said two additional symbols via the frequency twisted mode −2.

In detail, if also frequency twisted modes +2 and −2 are used, the application of the GIFFT to the parallelized digital symbols S1 and S2 (block 182) further results in that:

a fifth symbol $a_5 e^{j\varphi_5}$ of said second set S2 is allocated to nine respective frequencies $$B_S\left(\frac{7}{4}+k\right)$$

(with k=0, 1, 2, 3, 4, 5, 6, 7, 8) changing, for each frequency sample, the respective phase according to $$e^{+j\frac{2k\pi}{9}}$$

and weighting each frequency sample by $$\frac{1}{\sqrt{8}}$$

(i.e., multiplying, for each of the nine respective frequencies, the fifth symbol $a_5 e^{j\varphi_5}$ by a respective complex coefficient $$\frac{e^{+j\frac{2k\pi}{9}}}{\sqrt{8}}),$$

thereby obtaining nine frequency samples which are related to the frequency twisted mode +2 and which carry said fifth symbol $a_5 e^{j\varphi_5}$ of said second set S2 via the frequency twisted mode +2; and a sixth symbol $a_6 e^{j\varphi_6}$ of said second set S2 is allocated to nine respective frequencies $$B_S\left(\frac{7}{4}+k\right)$$

(with k=0, 1, 2, 3, 4, 5, 6, 7, 8) changing, for each frequency sample, the respective phase according to $$e^{-j\frac{2k\pi}{9}}$$

and weighting each frequency sample by $$\frac{1}{\sqrt{8}}$$

(i.e., multiplying, for each of the nine respective frequencies, the sixth symbol $a_6 e^{j\varphi_6}$ by a respective complex coefficient $$\frac{e^{-j\frac{2k\pi}{9}}}{\sqrt{8}}),$$

thereby obtaining nine frequency samples which are related to the frequency twisted mode −2 and which carry said sixth symbol $a_6 e^{j\varphi_6}$ of said second set S2 via the frequency twisted mode −2.

As previously explained, if also frequency twisted modes +3 and −3 are used, two LTE physical resource blocks have to be considered so as to have at disposal the seventeen frequencies necessary for generating these modes. However, the generation of the frequency twisted modes +3 and −3 operates, mutatis mutandis, correspondingly to the generation of the frequency twisted modes ±1 and ±2 previously described.

Instead, as explained in the foregoing, the use of modes ±4 and subsequent higher-order ones has proven to be poorly practical.

With reference to FIG. 32, the receiver 19 applies, to an incoming digital time signal (which derives from a radio signal transmitted by the transmitter 18, received by the receiver 19, and carrying the aforesaid output digital time signal), a Generalized FFT (i.e., Fast Fourier Transform) (block 191) so as to extract the digital symbols S1 and S2 transmitted by the transmitter 18.

Then, a parallel-to-serial conversion is applied to the extracted digital symbols S1 and S2 (block 192), thereby obtaining an output sequence of the digital symbols received from the transmitter 18.

Conveniently, the receiver 19 extracts the digital symbols S1 and S2 from the incoming digital time signal by using a reception matrix [[GFFT]], as in the case of traditional OFDMA.

The main difference with respect to the standard OFDMA is that the latter generally exploits Hermitian matrices, while in the case of frequency twisted waves the transmission matrix [[GIFFT]] is rectangular and, thence, in order for the reception matrix [[GFFT]] to be obtained, pseudo-inverse approach is exploited.

More in detail, in order to solve the equation system at the reception side, a reception matrix [[GFFT]] is used by the receiver 19, which reception matrix [[GFFT]] is derived from the transmission matrix [[GIFFT]] through a generalized inversion technique, such as the pseudo-inverse technique.

In mathematical terms, given the transmission matrix [[GIFFT]] with $M_{TS} \times S_{TOT}$ complex coefficients, and given also the vector [S] of the $S_{TOT}$=S1+S2 symbol complex values to be transmitted, at transmission side there results that:

$$[[GIFFT]][S]=[TTU],$$

where [TTU] denote the vector of the $M_{TS}$ complex values of the time samples of the output digital time signal generated by the transmitter 18.

Let us now consider the reception side, where it is useful to use a generalized inversion technique, such as the pseudo-inverse technique, to invert the foregoing matrix equation:

$$[[GIFFT]]^T[[GIFFT]][S]=[[GIFFT]]^T[TTU],$$

and thence $$[S]=([[GIFFT]]^T[[GIFFT]])^{-1}[[GIFFT]]^T[TTU], \quad (1)$$

where $[[GIFFT]]^T$ denotes the transpose of the matrix [[GIFFT]], and $([[GIFFT]]^T [[GIFFT]])^{-1}$ denotes the operation of inversion of the square matrix resulting from the multiplication $[[GIFFT]]^T [[GIFFT]]$.

In particular, at reception side [S] becomes the vector of the $S_{TOT}$=S1+S2 unknown symbol complex values to be determined by the receiver 19, and [TTU] becomes the vector of the $M_{TS}$ complex values of the time samples of the incoming digital time signal.

Condition for the existence of a set of solutions for the unknown vector [S] is that the square matrix resulting from the multiplication $[[GIFFT]]^T [[GIFFT]]$ has a determinant different than zero, i.e., in mathematical terms:

$$det([[GIFFT]]^T[[GIFFT]]) \neq 0. \quad (2)$$

Therefore, if the transmission matrix [[GIFFT]] is designed so as to satisfy the condition (2), then the $S_{TOT}$ unknown symbol complex values can be determined by the receiver 19 by solving the equation system resulting from the matrix equation (1).

Thence, the reception matrix [[GFFT]], which is a non-Hermitian matrix, can be defined as:

$$[[GFFT]]=([[GIFFT]]^T[[GIFFT]])^{-1}[[GIFFT]]^T.$$

Figure 33:
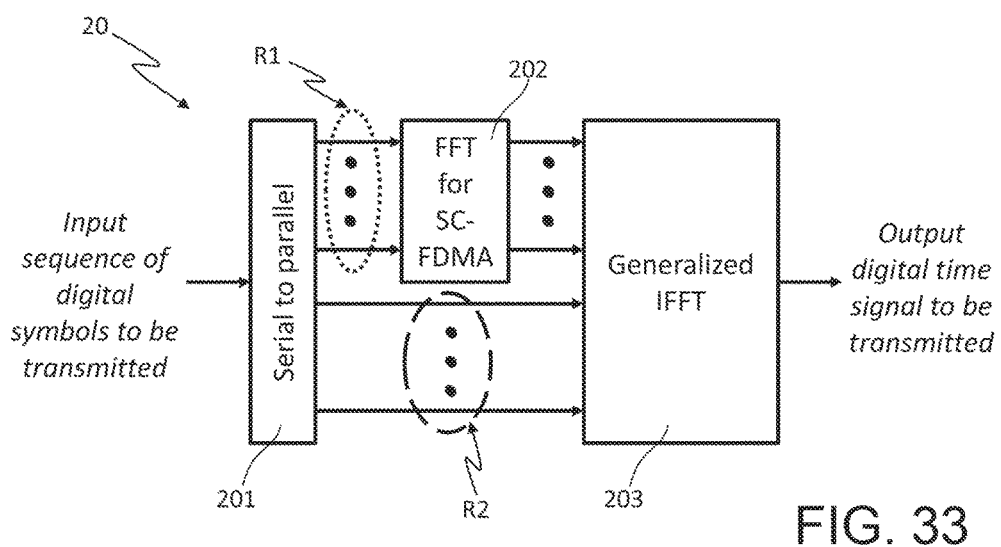
FIGS. 33 and 34 schematically illustrate working principle of, respectively, a transmitter and a receiver according to a preferred embodiment of the present invention related to the combined use of SC-FDMA with frequency twisted waves.
Figure 34:
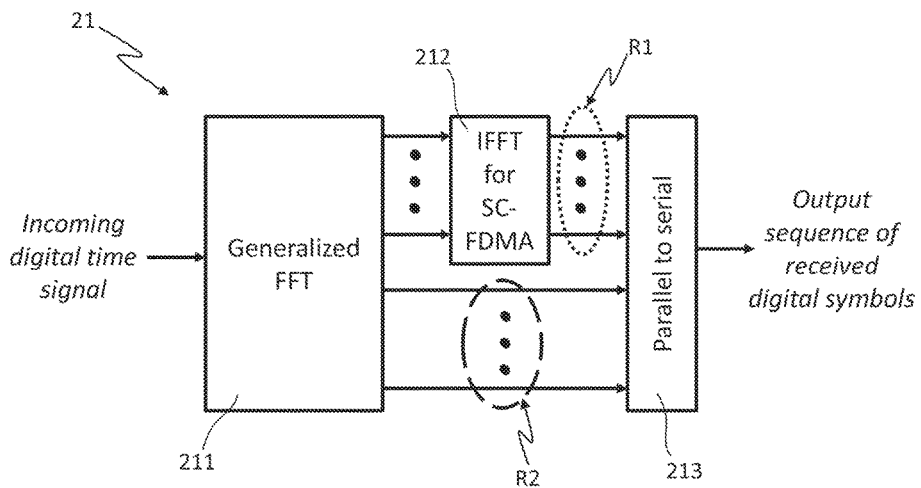

Moreover, FIGS. 33 and 34 schematically illustrate working principle of, respectively, a transmitter (denoted as whole by 20) and a receiver (denoted as a whole by 21) according to a preferred embodiment of the present invention related to the combined use of SC-FDMA with frequency twisted waves (and, thence, suitable, for example, for LTE uplink transmissions).

In particular, as shown in FIG. 33, the transmitter receives (or generates) an input sequence of digital symbols to be transmitted. A serial-to-parallel conversion is applied to said sequence of digital symbols (block 201), thereby obtaining a first set of parallelized digital symbols R1 to be transmitted via traditional SC-FDMA, and a second set of parallelized digital symbols R2 to be transmitted via frequency twisted modes.

Then, an FFT is applied to the first set of symbols R1 (as requested by SC-FDMA in order to obtain symbol spreading and, thence, a low PAPR) (block 202), and a Generalized IFFT is applied to the outputs of the FFT and to the second set of symbols R2 (block 203) so as to generate an output digital time signal to be transmitted.

It is worth noting that the transmitter 20, except for the pre-processing via FFT of the first set of symbols R1 to be transmitted via traditional SC-FDMA (block 202), operates in the same way as the transmitter 18 shown in FIG. 31 and previously described. In particular, the application of the Generalized IFFT performed by the transmitter 20 (block 203 in FIG. 33) occurs substantially in the same way as the application of the GIFFT to the digital symbols S1 and S2 performed by the transmitter 18 (block 182 in FIG. 31). Therefore the generation of the output digital time signal performed by the transmitter 20 will not be described in further detail, remaining valid what described in the foregoing about the transmitter 18.

With reference to FIG. 34, the receiver 21 applies, to an incoming digital time signal (which derives from a radio signal transmitted by the transmitter 20, received by the receiver 21, and carrying the aforesaid output digital time signal), a Generalized FFT (block 211) so as to extract:

the digital symbols R2 transmitted by the transmitter 20 via frequency twisted modes; and the digital symbols R1 transmitted by the transmitter 20 via SC-FDMA, wherein said symbols R1 are obtained, as in standard SC-FDMA, via a post-processing based on IFFT (block 212) (namely, by applying an IFFT to the outputs of the Generalized FFT related to SC-FDMA).

Finally, a parallel-to-serial conversion is applied to the extracted digital symbols R1 and R2 (block 213), thereby obtaining an output sequence of the digital symbols received from the transmitter 20.

It is worth noting that the receiver 21, except for the post-processing via IFFT related to SC-FDMA (block 212), operates in the same way as the receiver 19 shown in FIG. 32 and previously described. In particular, the application of the Generalized FFT performed by the receiver 21 (block 211 in FIG. 34) occurs substantially in the same way as the application of the Generalized FFT performed by the receiver 19 (block 191 in FIG. 32). Therefore the operation of the receiver 21 will not be described in further detail, remaining valid what described in the foregoing about the receiver 19.

As just described in connection with FIGS. 31-34, the OFDM-OFDMA symbols are directly associated with orthogonal frequency samples, while in the case of SC-FDMA the symbols are associated with orthogonal frequency samples after a pre-processing in which they are combined via FFT to limit PAPR. The introduction of frequency twisted waves without passing through this transformation makes the frequency twisted waves agnostic with respect to the types of transformations operated on the main flow, being the two flows orthogonal in the sense of the frequency Hilbert channel.

There is no need for introducing the spreading for frequency twisted waves, which are already spread on multiple frequencies with proper phases, and, on the other hand, it is not easy to further spread the higher-order modes. In any case, the increase of PAPR due to this flow is small.

The introduction of frequency twisted waves into the LTE physical resource block can be considered as a reduced capability of the system against the impairments due to selective fading. In practical terms, it can be considered as a reduced capability depending on the frequency grouping due to the way in which GIFFT and GFFT operate. In first approximation, using modes ±1 and a frequency granularity of 15 kHz, the frequency twisted waves requires to operate in conditions where channel variations across 75 kHz are negligible, similarly to the condition of 15 kHz applicable to OFDM-OFDMA.

Figure 35:
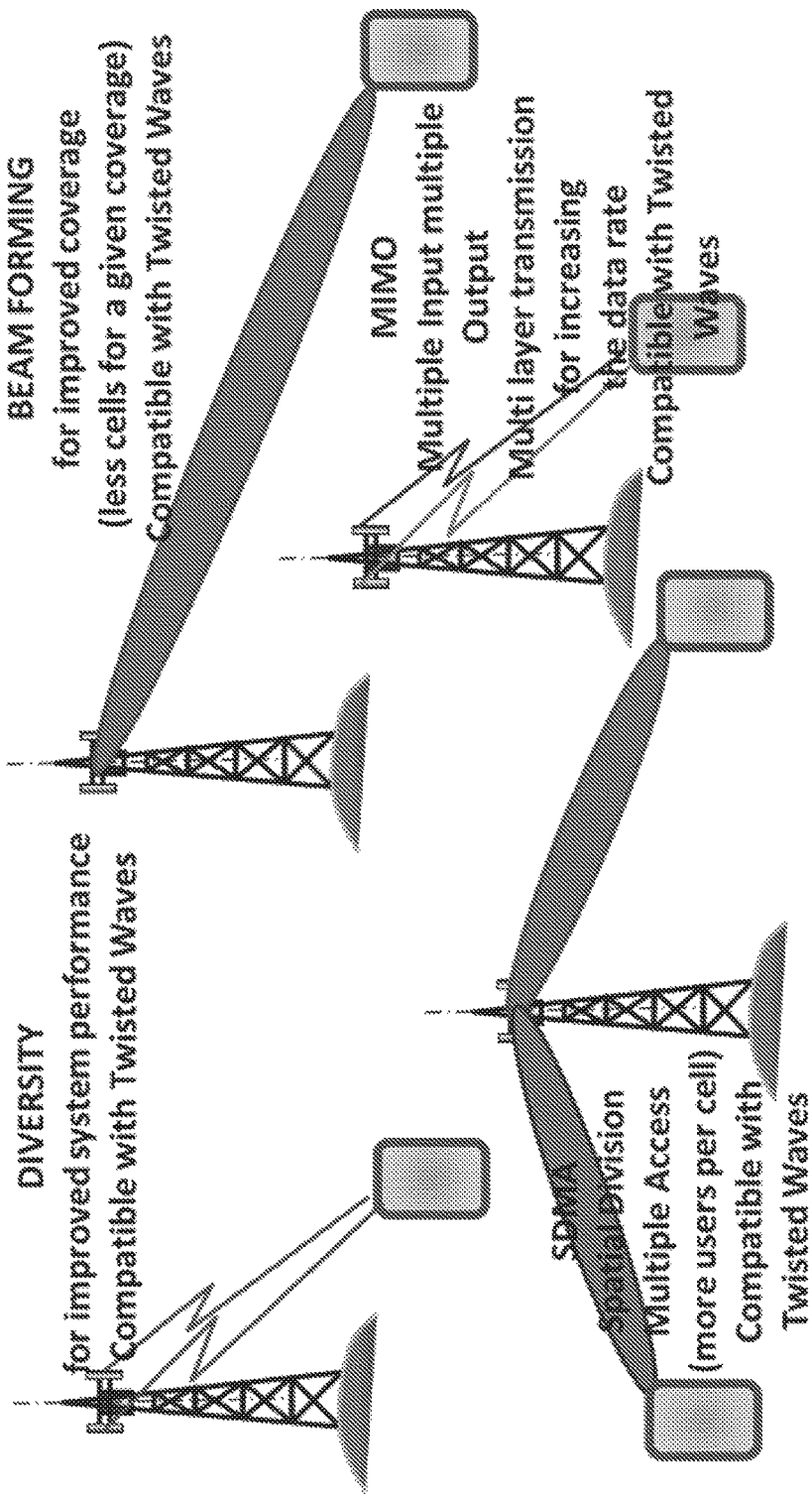
FIG. 35 schematically illustrates several typical operational modes for LTE.

It is worth noting that LTE can operate combining signals according to several operational modes (schematically illustrated in FIG. 35):

diversity;

beam-forming;

SDMA (Spatial Division Multiple Access); and

MIMO (Multiple Input Multiple Output).

These operational modes imply that their use and their combinations are possible only under certain operational conditions and, thence, not always.

The above operational modes are derived from propagation and smart antenna characteristics and are all compatible with frequency twisted wave technology. In fact, the optimization of the antennas is independent, in principle, from the characteristics of the frequency twisted waves, which are properties of the single RF channel before the antenna. The only dependence is thence related to the signal bandwidth used for said operational modes.

The Applicant has performed several in-depth tests of the present invention in order to assess performance thereof. In this respect, in the following some results of these tests will be provided.

The effects of non-linearity can be approximated in a meaningful region of OBO ratios as additional noise, assuming that the interference power depends on the power of the main signals.

In the following it is assumed that the total interference power can be approximated by Noise Power Ratio (NPR). The performance of high power amplifiers with many carriers (i.e., >10) is normally tested using an NPR measurement technique. In this test, white noise is used to simulate the presence of many carriers of random amplitude and phase.

NPR can be considered as a measure of multicarrier-to-intermodulation ratio (C/I). NPR differs from multicarrier-to-intermodulation ratio (C/I) in that it is the ratio of carrier plus intermodulation to intermodulation ratio (i.e., (C+I)/I). At high ratios (i.e., C/I>20 dB), the two measures will approach the same value.

NPR can be linked to OBO, assuming a typical relation between them given by:

$$OBO_{dB} = \frac{NPR_{dB} - 10}{2}.$$

In mobile communications the base station amplifier usually works with a reasonable NPR level, i.e. a high OBO, while the mobile equipment works close to the amplifier saturation level to improve the power consumption and the battery time.

For both OFDMA and SC-FDMA, NPR model can be used, being them multi-carrier channels. The main difference between the two access methodologies is on the OBO level used.

Figure 36:
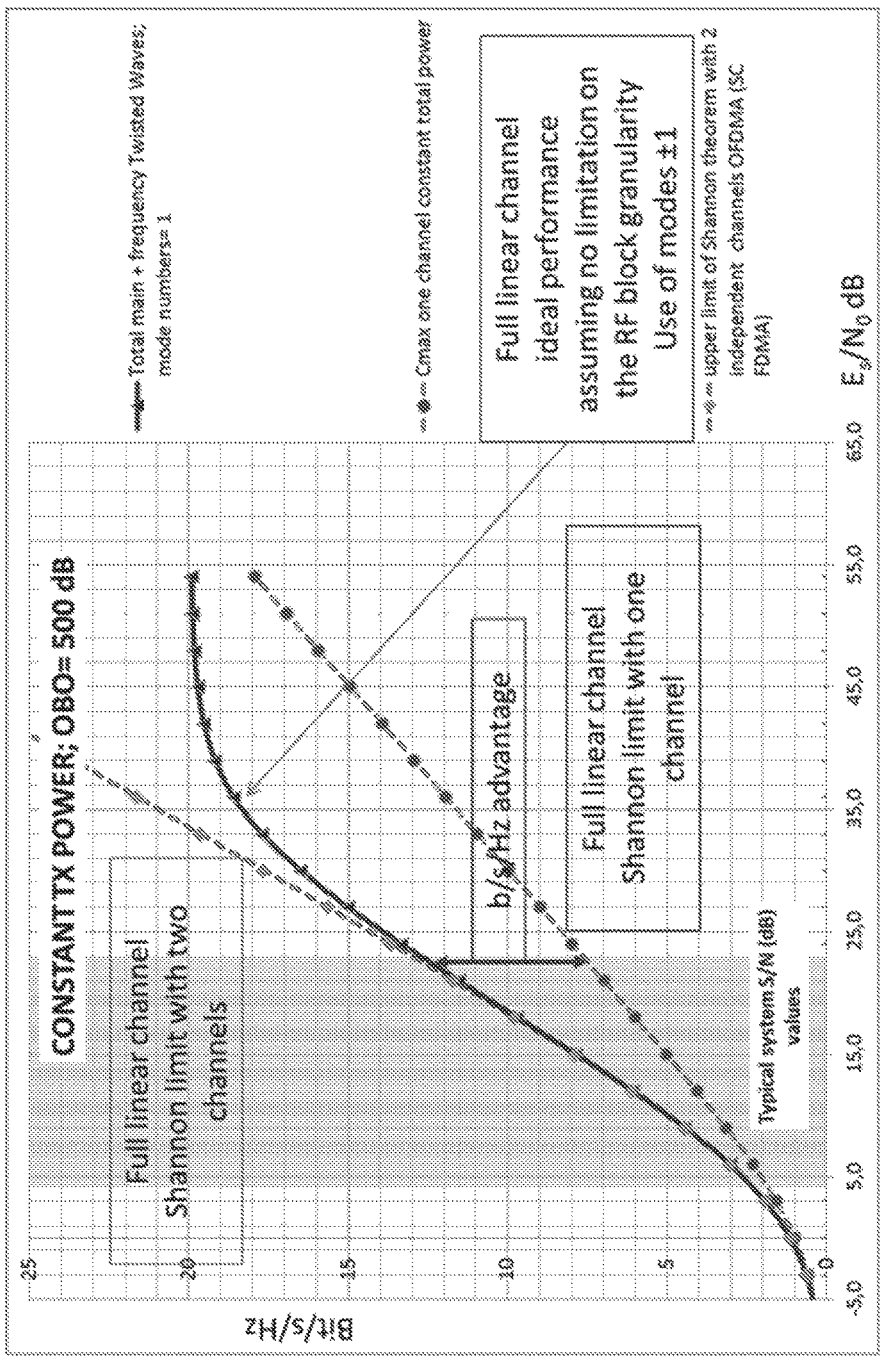
FIGS. 36-43 schematically illustrate spectral efficiency with respect to symbol energy to noise power spectral density ratio for different transmission scenarios, with and without the use of frequency twisted waves.

FIG. 36 shows spectral efficiency (bit/s/Hz) with respect to symbol energy to noise power spectral density ratio ($E_S/N_0$) of a RF channel with linear characteristics with and without the use of frequency twisted waves, in particular with and without the use of frequency twisted modes +1 and −1, assuming a constant transmitted power, an OBO equal to 500 dB and no limitation on the RF block granularity. In FIG. 36 the spectral efficiency of two independent channels (i.e., two separate RF channels with the same power distribution as the channel with twisted waves) is also shown as reference.

As shown in FIG. 36, the performance of the channel with modes ±1 is very close to the upper limit up to its bend due to the presence of a residual interference between modes. This saturation level is at about 20 bit/s/Hz, which is usually far away from the typical $E_S/N_0$ ratios of mobile communications.

Figure 37:
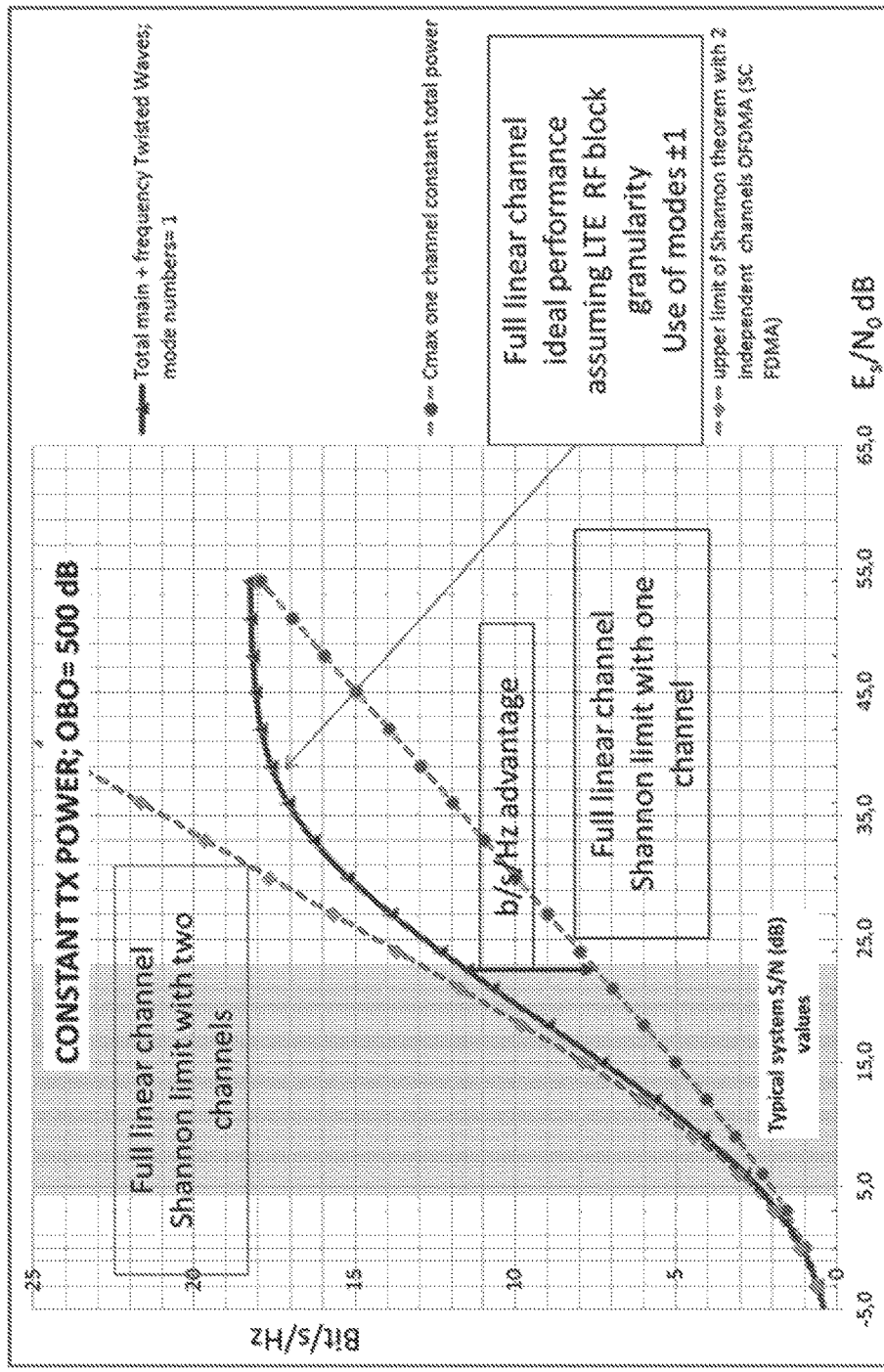

Introducing the limitation of the LTE physical resource block including 12 sub-carriers, there is a reduction in the performance of about 17%, as shown in FIG. 37.

Moreover, the introduction of non-linearities causes the presence of a saturation level in the maximum achievable $E_S/N_0$, since the interference depends on the signal itself.

Assuming, in first approximation, the statistical independence of the interference, the frequency twisted wave signal performs better than the conventional OFDMA and SC-FDMA transmissions, i.e., the twisted wave degradation is lesser than the conventional transmission systems. The reason is due to the fact that it is possible to use lesser complex modulation constellations to reach a defined bit/s/Hz value, sharing the power and information content between the main RF and the "Hilbert-approximated" channels.

Figure 38:
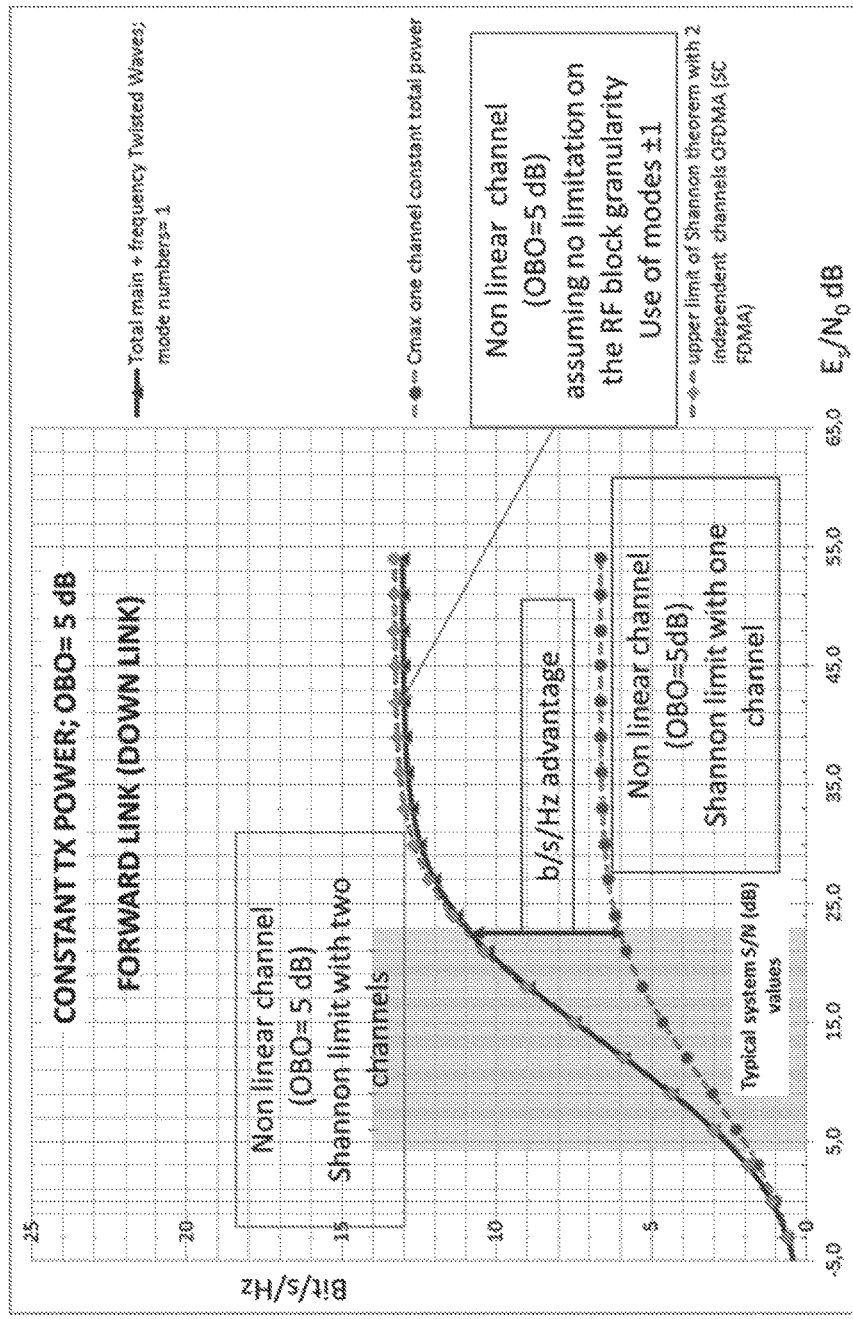
Figure 39:
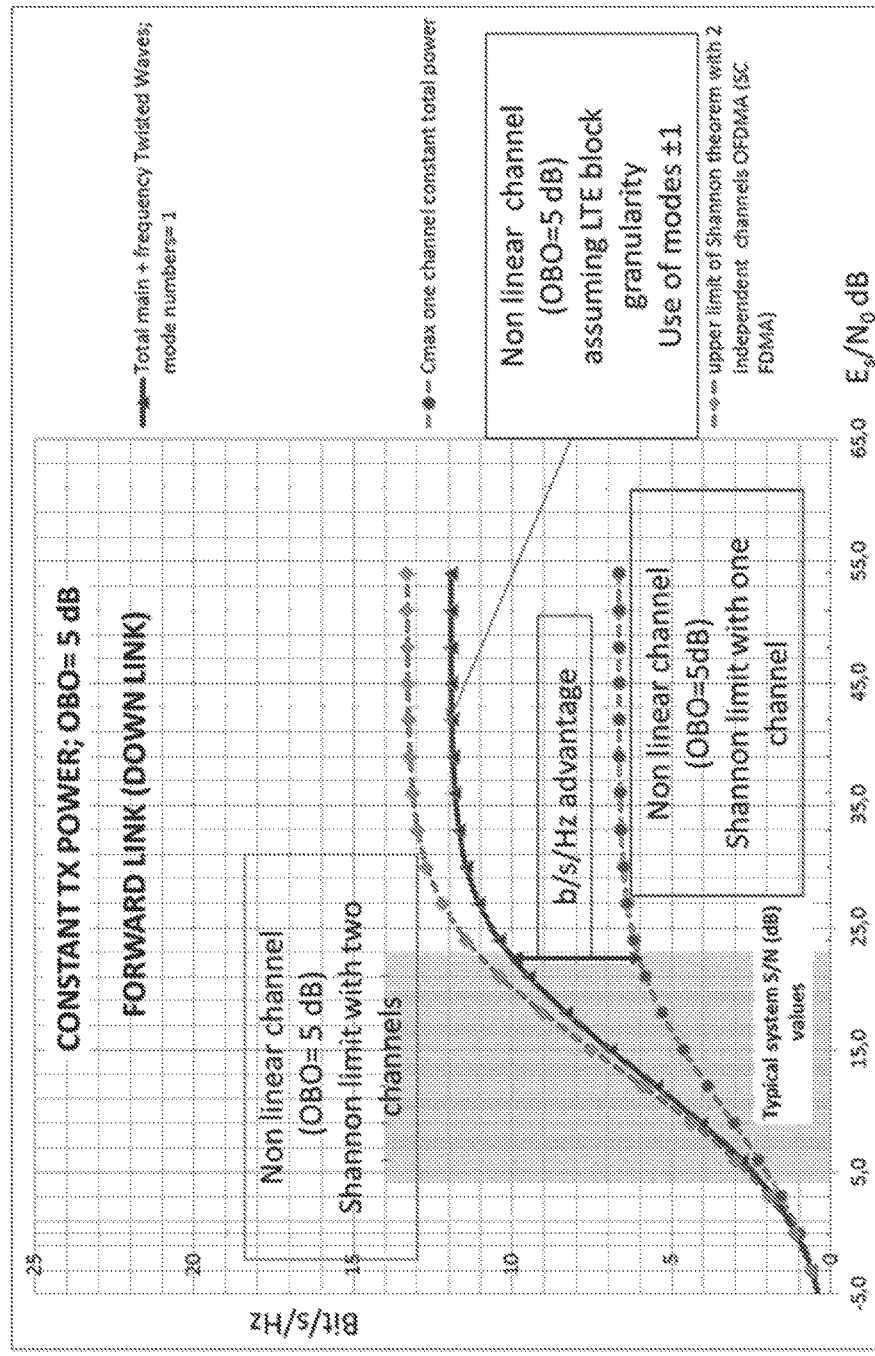

In this connection, FIGS. 38 and 39 show the effects of amplifier's non-linearity for a downlink channel from a base station to a mobile communication device. In particular, FIG. 38 shows the spectral efficiency (bit/s/Hz) with respect to the symbol energy to noise power spectral density ratio ($E_S/N_0$) of a non-linear downlink channel with and without the use of frequency twisted modes +1 and −1, assuming a constant transmitted power, an OBO equal to 5 dB and no limitation on the RF block granularity, while FIG. 39 shows the spectral efficiency (bit/s/Hz) with respect to the symbol energy to noise power spectral density ratio ($E_S/N_0$) of a non-linear downlink channel with and without the use of frequency twisted modes +1 and −1, assuming a constant transmitted power, an OBO equal to 5 dB and the use of the LTE physical resource block. The advantage in using frequency twisted waves for higher $E_S/N_0$ values is evident from FIGS. 38 and 39.

Of course, the presence of a non-linear amplifier causes a worse performance in term of bit/s/Hz, but the degradation of the OFDMA alone is worse than the one in presence of a frequency twisted wave signal. The main reason for this behavior, as noted above, is due to the independence between the main and the twisted wave channel, which allow to use lesser complex modulation constellations for the transmitted symbols.

Figure 40:
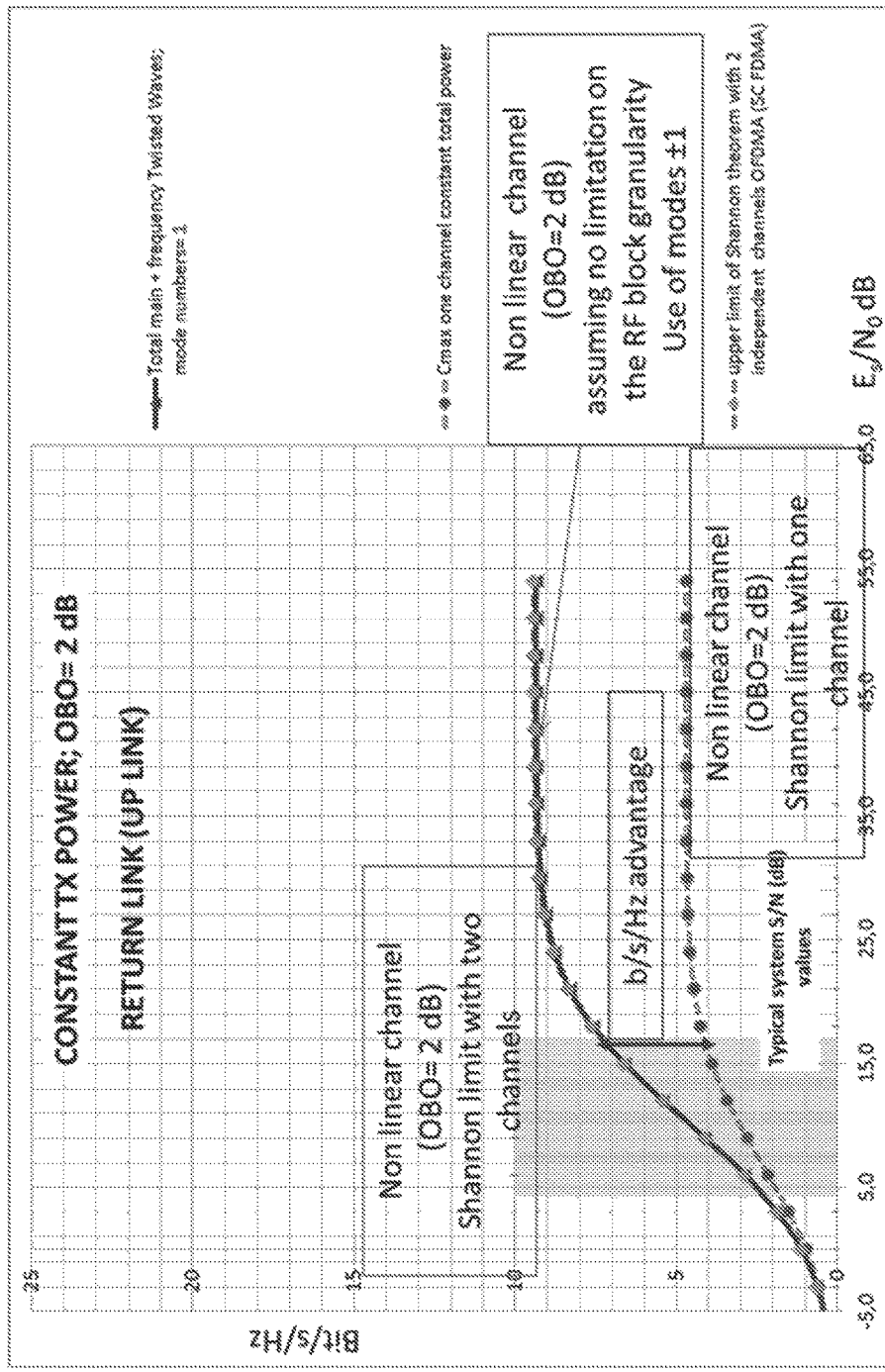
Figure 41:
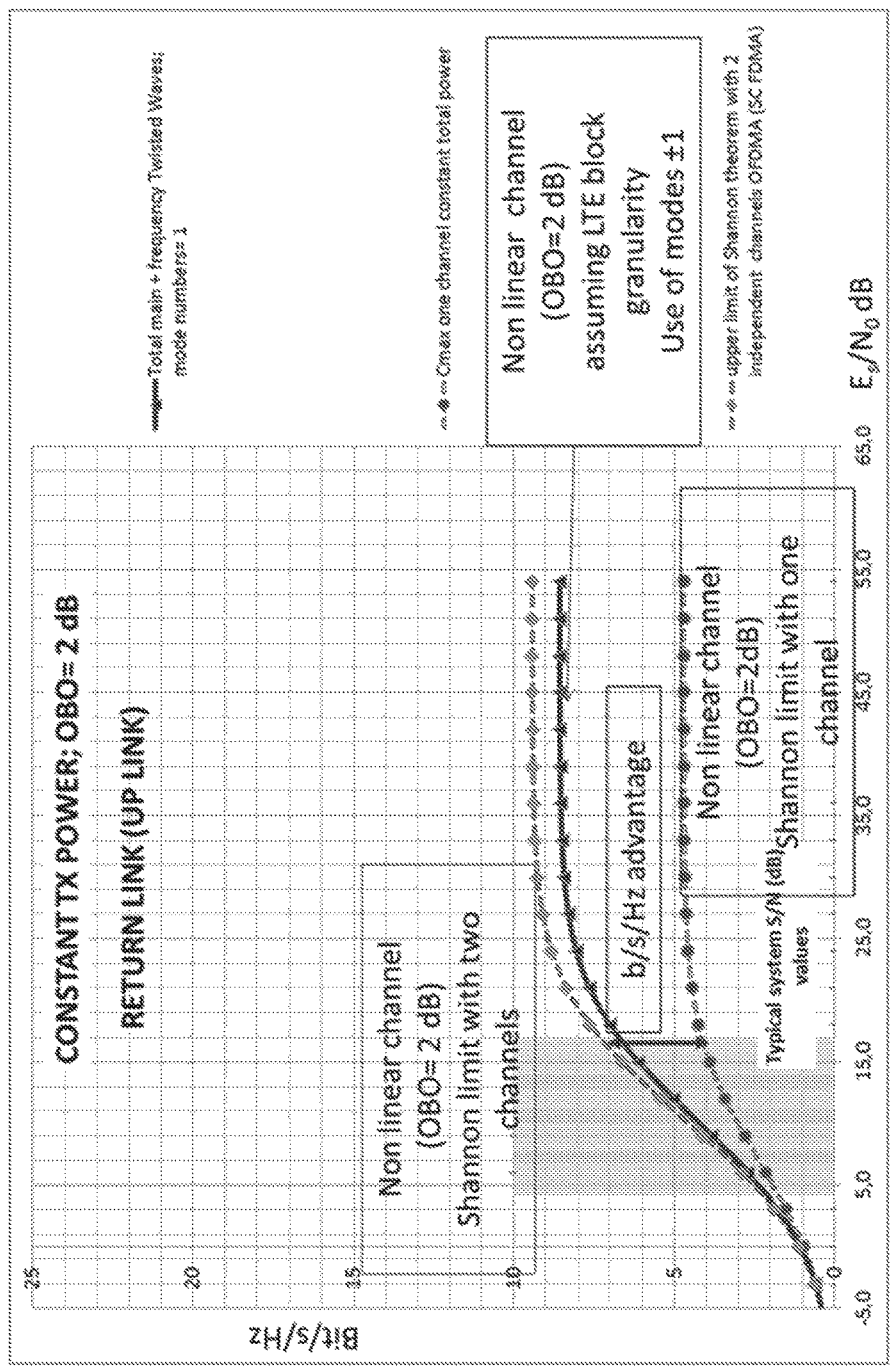

Uplink situation is similar, but amplifier's non-linearity has been considered worse than for downlink. In this respect, FIGS. 40 and 41 show the effects of amplifier's non-linearity for an uplink channel from a mobile communication device to a base station. In particular, FIG. 40 shows the spectral efficiency (bit/s/Hz) with respect to the symbol energy to noise power spectral density ratio ($E_S/N_0$) of a non-linear uplink channel with and without the use of frequency twisted modes +1 and −1, assuming a constant transmitted power, an OBO equal to 2 dB and no limitation on the RF block granularity, while FIG. 41 shows the spectral efficiency (bit/s/Hz) with respect to the symbol energy to noise power spectral density ratio ($E_S/N_0$) of a non-linear uplink channel with and without the use of frequency twisted modes +1 and −1, assuming a constant transmitted power, an OBO equal to 2 dB and the use of the LTE physical resource block.

From FIGS. 40 and 41 it can be noted that, except for the lower saturated bit/s/Hz level (about 9.5), the behavior in uplink is very similar to that in downlink shown in FIGS. 38 and 39.

Recently, MIMO technology has proven to be one of the most significant technical breakthrough in modern radio communications.

A key feature of MIMO technology is the ability to turn multi-path propagation, traditionally a pitfall of wireless transmission, into a benefit for the user. MIMO embraces a very wide set of wireless communication systems/methods, from single user to multiple users, open loop to close loop.

Open loop MIMO systems include Space Time Transmit Diversity (STTD) MIMO, Spatial Multiplexing (SM) MIMO and Uplink Collaborative MIMO.

In a very general way, MIMO is the use of multiple antennas at both the transmission and reception sides to improve communication performance and this is the main reason for which this technology is largely compatible with frequency twisted waves, which operate on the signal before splitting it into different antennas.

The wireless communication systems before MIMO were constrained by network capacity, which is related to channel quality and coverage of transmission on a multipath channel. In wireless communications the propagation channel is characterized by multipath propagation due to scattering on different obstacles. Multipath is a typical issue in communication systems, since it entails time variations and time spread. As for time variations, multipath causes channel fading and S/N variations. As for time spread, multipath becomes important for suitable frequency selectivity.

Smart antenna systems can positively react against the above problems and can be divided into the following types:
Single Input Single Output (SISO), wherein both the transmitter and the receiver have only one antenna;
Single Input Multiple Output (SIMO), wherein the transmitter has one antenna, while the receiver has multiple antennas;
Multiple Input Single Output (MISO), wherein the transmitter has multiple antennas, while the receiver has one antenna; and
MIMO, wherein, as previously explained and as broadly known, both the transmitter and the receiver have multiple antennas.

MIMO exploits the geometrical (physical) space dimension to improve wireless systems capacity, range and reliability. It offers significant increases in data throughput and link range without additional bandwidth or increased transmit power. MIMO achieves this goal by spreading the same total transmit power over the antennas to achieve an array gain that improves the spectral efficiency (more bit/s/Hz) or to achieve a diversity gain that improves the link reliability (reduced fading). The channel capacity increases according to the increase in the number of antenna elements. In particular, MIMO systems' capacity increases linearly with the number of antennas (or antenna elements), while the capacity of SIMO and MISO systems increases with the logarithm of the number of antennas (or antenna elements).

There are two major classifications related to MIMO, which are based on:
  type of MIMO control, which, in turn, includes two major categories, namely
    open loop MIMO, wherein the communication channel does not use explicit information regarding the propagation channel; common open loop MIMO techniques include Space Time Transmit Diversity (STTD) MIMO, Spatial Multiplexing (SM) MIMO, and Collaborative Uplink MIMO; and
    closed loop MIMO techniques (Transmitter Adaptive Antenna (TX-AA) techniques) are also known as beam-forming; and
  number of users, which, in turn, includes two major categories, namely
    Single User MIMO (SU-MIMO), wherein data rate is increased for a single user; and
    Multi-User MIMO (MU-MIMO) or collaborative MIMO, wherein individual streams are assigned to various users; this mode is particularly useful in uplink, since it keeps complexity at the user side at a minimum by using only one transmitting antenna.

As for MIMO, antenna technology is the key technology in increasing network capacity. Essentially, MIMO is an intelligent way to optimize the geometrical space to get from it the best performance.

For MIMO, the operations are, thence, based on RF propagation characteristics. On the other hand, the frequency twisted waves operate on the signal without any assumption on the propagation channel (except for the condition that it is reasonably flat for each twisted wave frequency slot). The use of the main mode (the "even" one) and the higher-order modes (the "odd" ones) is possible using the property of the approximated Hilbert transform applied to digital signals (in particular to OFDM-OFDMA and SC-FDMA signals) and the orthogonality is defined in terms of a full set of functions generated in the "frequency space".

Antenna technology improvement have allowed to fully utilize the space properties, passing from the pioneering GSM sectored antennas (in GSM the capacity can be tripled by 120 degree antennas that act as "space Filters") to adaptive antennas, which intensify spatial multiplexing using narrow beams, up to smart antennas, which are adaptive antenna arrays but differ in their smart direction of arrival (DoA) estimation. Smart antennas can form a user-specific beam.

The latest antennas are based on beam-forming; they can be considered time-varying space filters suitable for creating the radiation pattern of an antenna array. Beam-forming can be applied in all antenna arrays and MIMO systems.

MIMO systems use a number of functions to optimize space performance:
  pre-coding (a generalization of beam-forming to support multi-layer transmission in multi-antenna wireless communication environments);
  spatial multiplexing (using only MIMO antenna configuration; in spatial multiplexing, a high-rate signal is split into multiple lower-rate streams and each stream is transmitted from a different transmitting antenna in one and the same frequency channel; if these signals arrive at the receiver antenna array with sufficiently different spatial signatures, the receiver can separate these streams into (almost) parallel channels; spatial multiplexing is a very powerful technique for increasing channel capacity at higher signal-to-noise ratios); and
  diversity coding (used when there is no channel knowledge at the transmission side; in diversity methods, a single stream, unlike multiple streams in spatial multiplexing, is transmitted, but the signal is coded using techniques called space-time coding).

MIMO has been largely used in 3GPP systems and in LTE.

The increase in the number of frequency slots necessary for generating the frequency twisted waves results in the fact that the conventional OFDM/OFDMA and SC-FDMA can be used up to a distance R from the base station, while the frequency twisted waves can be used up to a distance R/5 from the base station (upon the assumption that only modes ±1 are used), but this is not an absolute limitation, since the actual scenario depends on the type of cell and environment. In fact, there could be a wide number of cases to which the aforesaid limitation does not apply (for instance, in the case of beam-forming and some MIMOs).

From cellular network operators' perspective, frequency twisted waves represent an additional system layer for LTE and LTE Advanced, which offers the capability, in many cases, to increase the channel capacity up to a factor of about 1.8.

Figure 42:
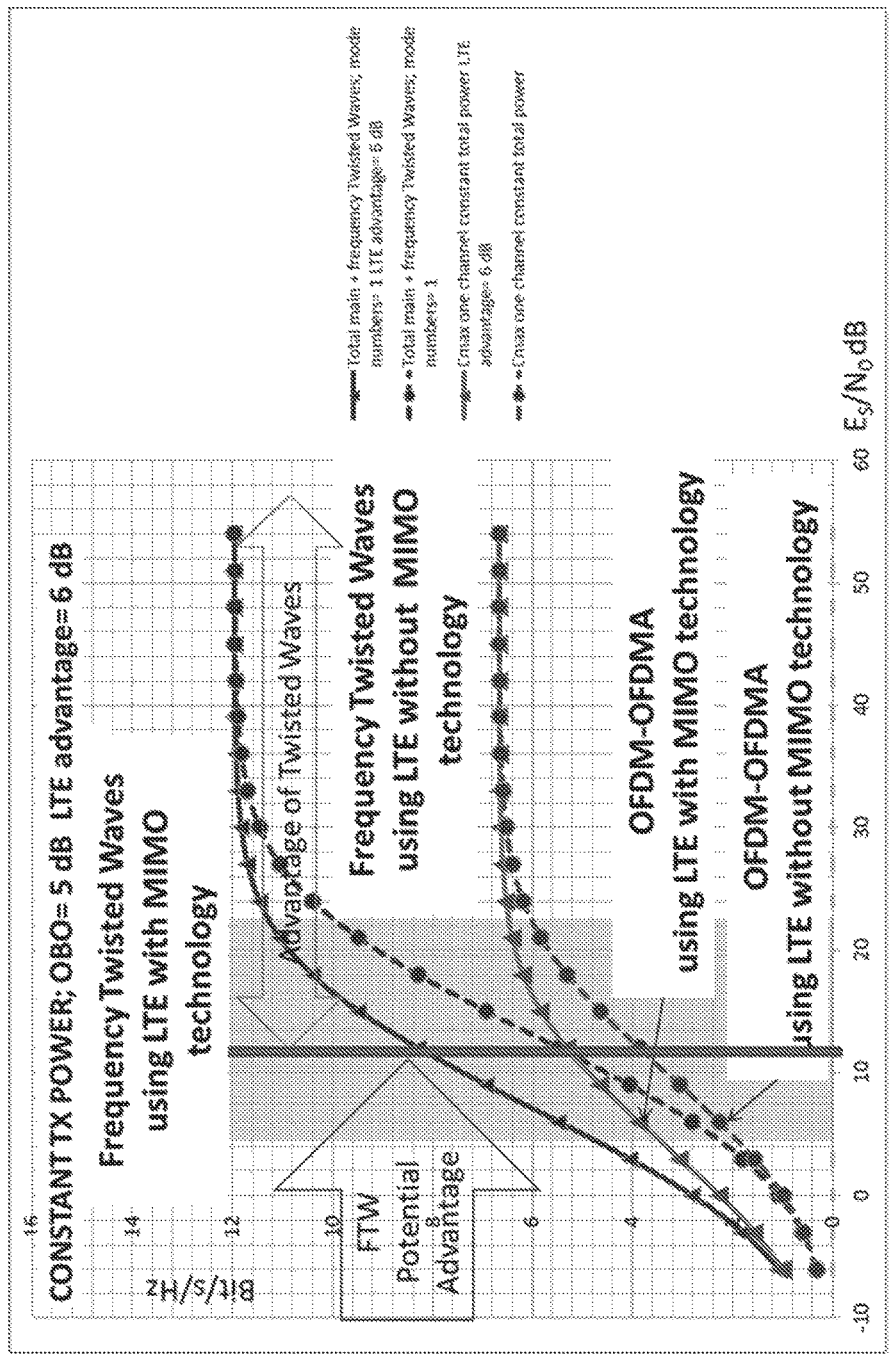
Figure 43:
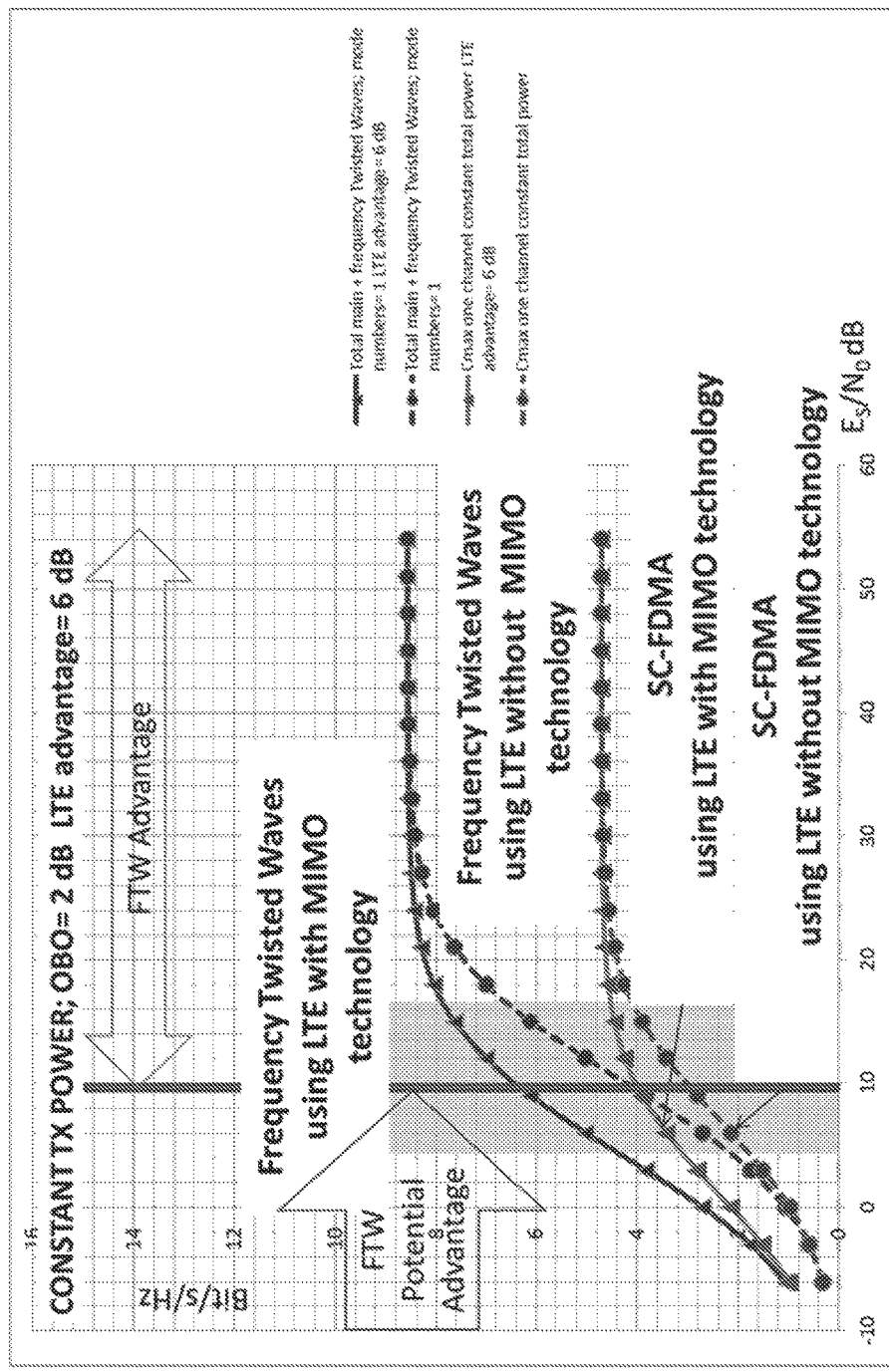

In this connection, FIGS. 42 and 43 show improvements due to the use of frequency twisted waves, respectively in downlink and uplink, with respect to the conventional LTE system, with and without MIMO gain. In particular, FIG. 42 shows the spectral efficiency (bit/s/Hz) with respect to the symbol energy to noise power spectral density ratio ($E_S/N_0$) of a non-linear downlink channel with and without the use of frequency twisted modes +1 and −1 and with and without the use of MIMO improvement, assuming a constant transmitted power, an OBO equal to 5 dB and the use of the LTE physical resource block. Instead, FIG. 43 shows the spectral efficiency (bit/s/Hz) with respect to the symbol energy to noise power spectral density ratio ($E_S/N_0$) of a non-linear uplink channel with and without the use of frequency twisted modes +1 and −1 and with and without the use of MIMO improvement, assuming a constant transmitted power, an OBO equal to 2 dB and the use of the LTE physical resource block.

From FIGS. 42 and 43 it is worth noting that frequency twisted waves produce a dramatic improvement when the $E_S/N_0$ grows above about 10 dB, which is, in the shown examples, the crossing value between MIMO technologies applied to LTE and twisted waves applied to LTE without MIMO. In case MIMO is applicable to twisted waves, the advantage is present also below 10 dB limit. This advantage increases also for non-linearities of the amplifier.

Figure 44:
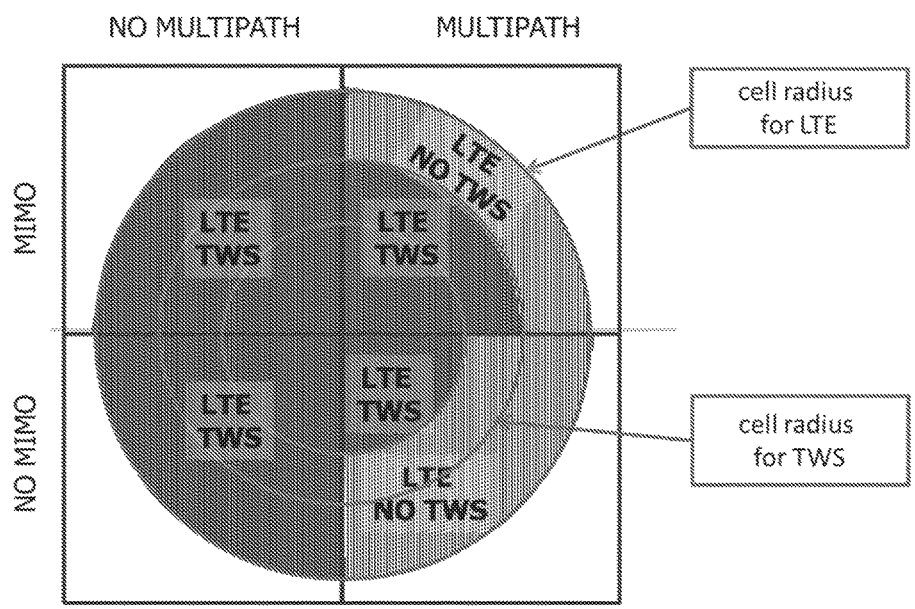
FIG. 44 schematically illustrates application to a generic LTE cell of frequency twisted waves and MIMO (Multiple Input Multiple Output) technology.

FIG. 44 schematically illustrates application to a generic LTE cell of MIMO and frequency twisted waves. As shown in FIG. 44, a generic LTE cell can be considered as divided into various zones of applications of MIMO and frequency twisted wave technologies, depending on the presence of multipath and on the distance from the base station (i.e., from the serving eNB).

In particular, if there is no multipath, frequency twisted waves can be used up to the boundary of the LTE cell (i.e., within an LTE service maximum radius from the eNB), with or without the use of MIMO. Instead, in a multipath scenario, frequency twisted waves can be applied:
- if MIMO is used, within a first radius from the eNB, wherein said first radius is smaller than the LTE service maximum radius; while,
- if MIMO is not used, within a second radius smaller than the aforesaid first radius.

This implies that the frequency twisted waves can be considered as an additional layer of the physical channel.

FIGS. 45 and 46 show two tables related, respectively, to a downlink scenario (with OBO equal to 5 dB) and an uplink scenario (with OBO equal to 2 dB), on the assumption that the radius of the LTE cell (i.e., the aforesaid LTE service maximum radius) is equal to 7 km and that the aforesaid first radius is equal to about 1.5 km.

As for the downlink scenario reported in FIG. 45, in the zone where the frequency twisted waves are applicable, they introduce a sensitive capacity growth with an upper limit of 300 Mbit/s on a bandwidth of 20 MHz, which implies an equivalent spectral efficiency of about 15 bit/s/Hz, against 10 bit/s/Hz of the conventional LTE performance.

As for the uplink scenario reported in FIG. 46, in the zone where the frequency twisted waves are applicable, they introduce a sensitive capacity growth with an upper limit of 200 Mbit/s on a bandwidth of 20 MHz, which implies an equivalent spectral efficiency of about 10 bit/s/Hz, against 6-7 bit/s/Hz of the conventional LTE performance.

Application of twisted waves to future, new-generation mobile communication systems will be briefly discussed in the following.

The new generation for mobile communications has recently started in late 2012. METIS 2020 project represents the European (and not only) effort for preparing the new mobile system generation, called 5G. Timing seems very compatible with the activity and results on twisted waves.

METIS 2020 project has defined five scenarios for the next incoming 5G mobile generation. They can be summarized as follows:
- "Amazingly fast", focusing on high data-rates for future mobile broadband users;
- "Great service in a crowd", focusing on mobile broadband access even in very crowded areas and conditions;
- "Ubiquitous things communicating", focusing on efficient handling of a very large number of devices with widely varying requirements;
- "Best experience follows you", focusing on delivering high levels of user experience to mobile end users; and
- "Super real-time and reliable connections", focusing on new applications and use cases with stringent requirements on latency and reliability.

The performance targets of this next generation are quite demanding:
- ten to one hundred times higher typical user data rates, where in a dense urban environment the typical user data rate will range from one to ten Gbps;
- one thousand times more mobile data per area (per user) where the volume per area (per user) will be over 100 Gbps/km$^2$ (respectively, 500 Gbyte/user/month);
- ten to one hundred times more connected devices;
- ten times longer battery life for low-power massive machine communications, where machines, such as sensors or pagers, will have a battery life of a decade;
- support of ultra-fast application response times (e.g. for tactile internet), where the end-to-end latency will be less than 5 ms with high reliability; and
- a key challenge will be to fulfill the previous requirements under a similar cost and energy dissipation per area as in today's cellular systems.

In LTE evolution there is not any concern at the moment about waveform compatibility, so there is a concrete possibility to introduce new types of waveforms in a near future. Twisted waves represent an additional channel rather than an additional waveform, but they can be interpreted as an evolution of the physical layer and therefore a more complex waveform type. It is important to note that the coexistence of systems such 3G and 2G with 4G and 5G are compatible with the introduction of time twisted waves for 2G and 3G, considering that time twist allows the operations slightly degraded of the transmission with traditional system without time twist receiver.

In particular, 5G view is that new waveforms can deal with the physical layer problems that will be more severe in the GHz band. METIS 2020 project's view is that a redesign of the channel characteristics is required rather than a completely new waveform. This position is rather favorable to frequency twisted waves; in fact, they fit exactly this architectural and high-level approach.

It is worth noting that there is a full compatibility in the introduction of twisted waves in the current projects for future mobile communications. This aspect opens interesting opportunities in planning the effective introduction of this transmission technology in the evolution of LTE Advanced and 5G development.

The evolution of the mobile communication systems is very fast, but it has to take into account the already installed infrastructure and the mobile market swapping time from a technology to the next one, including the backward compatibility. The integration of frequency twisted waves is fully compatible with the evolution roadmap of future mobile communications, while time twisted waves can be used with 2G and 3G technologies.

Some implementation aspects related to frequency twisted waves will be discussed in the following.

Figure 47:
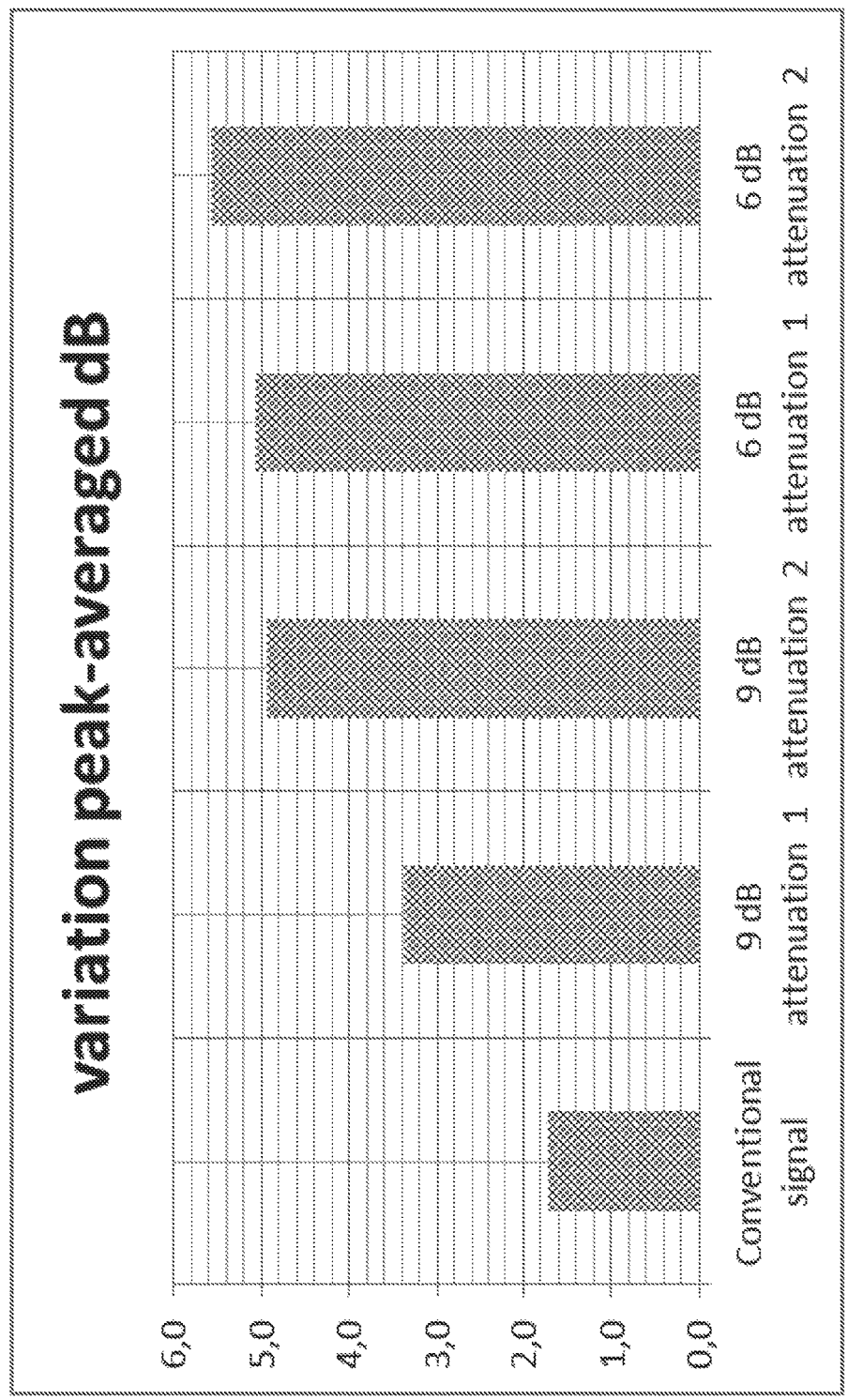
FIG. 47 schematically illustrates peak-to-average power ratios related to the use of frequency twisted waves.

Frequency twisted wave signals exhibit higher crest factors (i.e., peak-to-average power ratios—PAPRs) than conventional signals, thereby reducing efficiency of power amplifiers. Using one and the same modulation scheme QPSK for all the modes, the maximum crest factor, with an attenuation factor of 9 dB, is about 3 dB more than conventional signal (which has about 1.7 dB of crest factor), while, with a 6 dB attenuation factor, is about 3.5 dB more than conventional signal, as schematically illustrated in FIG. 47.

High-speed communication systems employ non-constant envelope modulation techniques such as M-PSK and quadrature amplitude modulation (QAM). This aspect places stringent linearity requirements on the power amplifiers. Digital pre-distortion linearization techniques, including both look-up table (LUT) and polynomial approaches, can be efficiently implemented by using field-programmable gate arrays (FPGAs). The multipliers in the digital signal processing blocks can reach speeds up to hundreds of MHz and can be effectively time-shared to implement complex multiplications.

At the receiver side, digital Intermediate Frequency (IF) techniques can be used to sample an IF signal and perform channelization and sampling rate conversion in the digital domain. Using under-sampling techniques, high-frequency IF signals (typically >100 MHz) can be quantified. For Software Defined Radio (SDR) applications, since different standards have different chip/bit rates, non-integer sampling rate conversion is required to convert the number of samples to an integer multiple of the fundamental chip/bit rate of any standard.

Wireless standards are continuously evolving to support higher data rates through the introduction of advanced baseband processing techniques such as adaptive modulations and coding, space-time coding (STC), beam-forming, and MIMO antenna techniques.

It is useful considering that twisted waves, which are a representation of the Hilbert transform can be seen also as a time-frequency interferometry. Therefore FPGAs are very suited for dealing with such signals.

Baseband processing often requires both processors and FPGAs, where the processor handles system control and configuration functions, while the FPGA implements the computationally-intensive signal processing data path and control, minimizing the latency in the system. Modern FPGAs give the possibility to use soft and hard processors that fit these needs.

As explained in the foregoing, the implementation of the frequency twisted waves according to the present invention can be regarded as an approximation of the frequency Hilbert transform. This fact implies, on the one hand, a bandwidth increase, and, on the other hand, the presence of an absolute limitation on the increase in frequency reuse, which is lower than two. In this respect, the following TABLE I lists some features related to the use of frequency twisted waves according to the present invention, as a basis for a practical implementation thereof.

TABLE I

| Parameter | Parameter value (considering using up to modes ± N) | Parameter approximate value for N = 2 |
|---|---|---|
| Frequency reuse | $\dfrac{2^{N+2} - 1}{2^{N+1} + 1}$ | 1.67 |
| Vestigial band rate reduction | $\dfrac{2^{N+2} + 2}{2^{N+2} + 3}$ | 0.95 |
| Frame length | $T_F = (2^{N+1} + 1)T_S$ | 9 |
| Super Frame loss | <1% | 0.99 |
| Additional bandwidth noise (dB) | $10 \log\left(\dfrac{2^{N+2} + 3}{2^{N+2} + 2}\right) \cong \dfrac{4.34}{2^{N+2} + 2}$ dB | 0.25 dB |
| Digitalization noise < −30 dB phase error | $\dfrac{N}{2^N - 1}$ | 9 bits |
| Maximum inter-frame interference (dB) | < −19−3N dB | < −20 dB |

Figure 48:
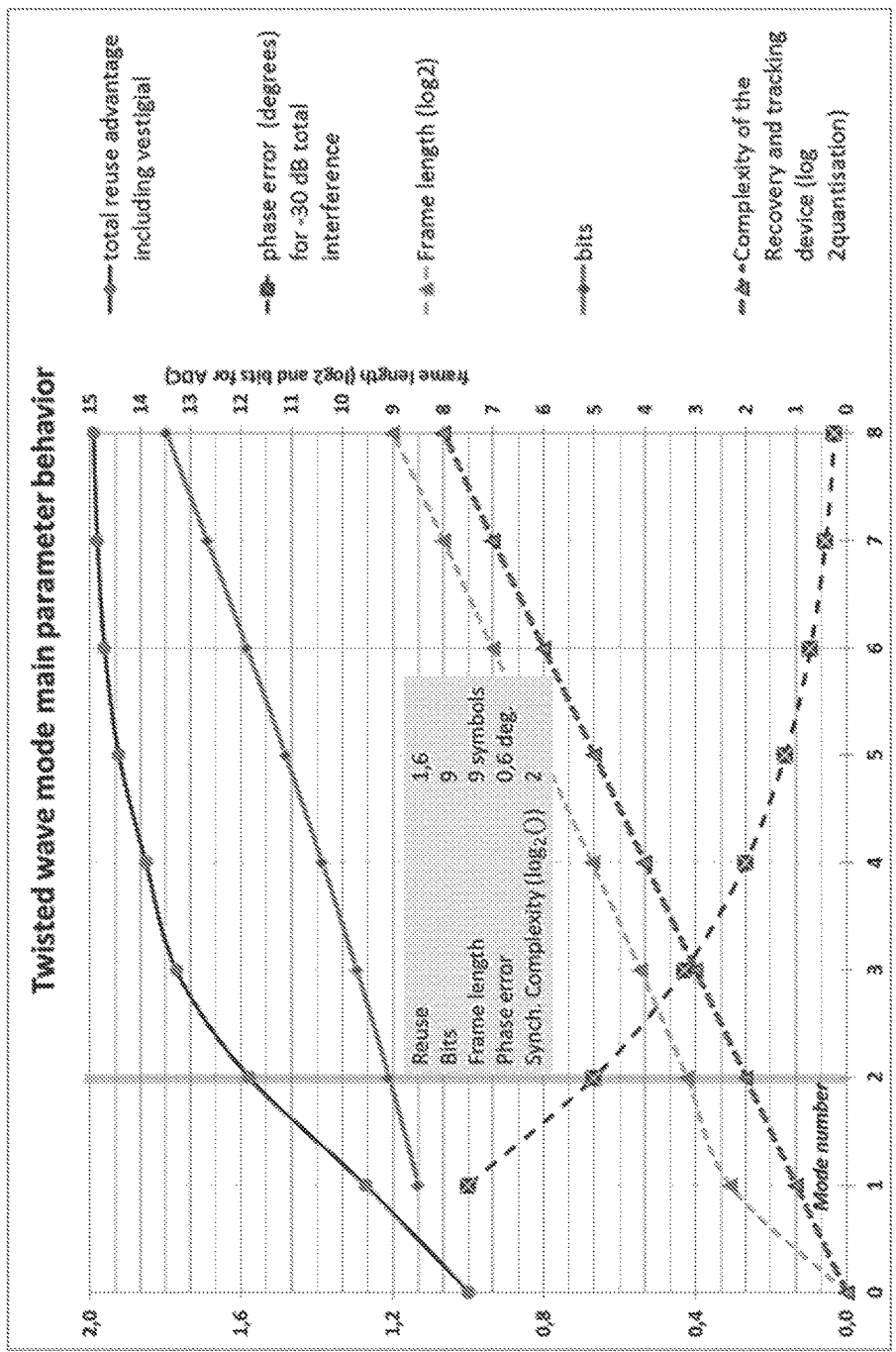
FIG. 48 schematically illustrates behavior of main parameters of frequency twisted modes with respect to topological charge of the highest twisted modes used.

Moreover, FIG. 48 schematically illustrates behavior of the main parameters of frequency twisted modes with respect to topological charge (or mode number) of the highest twisted modes used. On the basis of what shown in FIG. 48 some considerations can be made on the best implementation criteria as a compromise between performance and implementation complexity. In particular, a choice to use up to modes ±1, ±2 and ±3 seems to be a very good compromise. In particular, for N=±2 the frame length is 9 symbols, the necessary number of bits about 9, the increase in the thermal noise lesser than 0.2 dB, and the frequency reuse close to 1.6. Instead, the solution proposed to maximize the OFDM flexibility and, thence, the capacity of reacting against selective fading is N=±1, which is a very good compromise considering the positive effects of non-linearities on the frequency twist advantage.

From the foregoing, it may be immediately appreciated that the present invention, by exploiting frequency twisted waves, allows to increase transmission capacity of:

in general, wireless communication systems based on OFDM and/or OFDMA and/or SC-FDMA and/or combinations/variants/developments of these technologies; and, in particular, 4G cellular networks based on LTE and/or LTE Advanced standards, future 5G cellular networks, and also wireless communication systems based on WiMAX standard.

As previously explained, 4G network evolution and 5G network development are fully compatible with the integration of the frequency twisted waves.

The increase in the capacity performance are rather interesting and represent an additional layer of the Physical layer itself.

According to the overall transmission conditions, this advantage could be very close to the upper limit of doubling the transmission capacity, without increasing the bandwidth and the overall transmitted power per Hz.

The introduction at the transmission side of the GIFFT and at the reception side of the GFFT represents only a slightly more demanding hardware for the system elements, but simpler than the additional hardware requirements for handling MIMO and smart antennas.

In fact, the complexity related to the introduction of the frequency twisted waves is simpler, from a system point of view depending on a well-defined configuration of the main channel and the approximation of the frequency Hilbert one, than the introduction of MIMO and smart antenna technologies, and is compatible with these latter, which are much more depending on the knowledge of the transmission environment. The two layers (MIMO and twisted waves) are anyway largely non-correlated: MIMO is a generalization of a spatial filter, while twisted waves are a generalization of the complex base band channel.

From the hardware point of view, the additional requirements for implementing the frequency twisted wave technology are a small percentage step in the overall complexity of the international mobile telecommunications advanced generation.

In conclusion, it is clear that numerous modifications and variants can be made to the present invention, all falling within the scope of the invention, as defined in the appended claims.

The invention claimed is:

1. A method for radio communications in a wireless communication system including one or more base stations and one or more user terminals the method comprising:
   performing a radio communication between a base station and a user terminal of said wireless communication system;
   wherein performing a radio communication includes transmitting, in a given time slot, first digital symbols by using a frequency-division technique, whereby the first digital symbols are carried by first frequency samples at respective sub-carriers, that are distributed over a predefined frequency band and belong to a given sub-carrier block;
   wherein performing a radio communication further includes transmitting, in said given time slot, second digital symbols by means of one or more frequency twisted modes, wherein each frequency twisted mode carries a respective orbital angular momentum mode with a respective topological charge different than zero by means of respective second frequency samples, that:
are phase-shifted with respect to each other on the basis of phase shifts related to said respective orbital angular momentum mode;
carry one or more respective symbols of said second digital symbols via said respective orbital angular momentum mode; and
are at respective frequencies, that are distributed over said predefined frequency band and are different than the sub-carriers belonging to said given sub-carrier block.

2. The method of claim 1, wherein the sub-carriers belonging to the given sub-carrier block are spaced apart by a predetermined frequency spacing; and wherein each frequency twisted mode includes respective second frequency samples at respective frequencies that are spaced apart by said predefined frequency spacing and are distributed over said predefined frequency band between pairs of consecutive sub-carriers belonging to the given sub-carrier block.

3. The method of claim 2, wherein the one or more frequency twisted modes comprise 2N frequency twisted modes, N denoting an integer higher than one;
wherein each frequency twisted mode is identified by a respective index, that is an integer comprised between −N and +N and different than zero, and is related to the respective orbital angular momentum mode carried by said frequency twisted mode;
and wherein each pair of frequency twisted modes identified by indexes n and −n includes respective second frequency samples at respective frequencies that are:
the same ones for both said frequency twisted modes identified by said indexes n and −n;
spaced apart by said predefined frequency spacing; and, each, located between a respective pair of consecutive sub-carriers belonging to the given sub-carrier block;
n denoting an integer comprised between one and +N.

4. The method according to claim 1, wherein, for each second digital symbol to be transmitted in said given time slot, a respective frequency twisted mode carries, by means of respective second frequency samples, said second digital symbol via a phase-modulation related to the orbital angular momentum mode carried by said respective frequency twisted mode.

5. The method according to claim 1, wherein the used frequency-division technique is comprised in the group including: Orthogonal Frequency-Division Multiplexing, Orthogonal Frequency-Division Multiple Access, and Single-Carrier Frequency-Division Multiple Access.

6. The method of claim 5, wherein the used frequency-division technique is Orthogonal Frequency-Division Multiplexing or Orthogonal Frequency-Division Multiple Access;
and wherein performing a radio communication further includes:
at transmission side,
computing the first and second frequency samples carrying the first and second digital symbols, and generating a digital time signal representing a transform from frequency domain to time domain of said first and second frequency samples by using a predefined transmission matrix, and
transmitting a radio frequency signal carrying the digital time signal generated; and
at reception side,
receiving the radio frequency signal,
processing the received radio frequency signal so as to obtain a corresponding incoming digital signal, and
extracting the first and second digital symbols from the incoming digital signal by using a reception matrix derived from the predefined transmission matrix.

7. The method of claim 5, wherein the used frequency-division technique is Single-Carrier Frequency-Division Multiple Access;
and wherein performing a radio communication further includes:
at transmission side,
computing the first and second frequency samples carrying the first and second digital symbols, and generating a digital time signal representing a transform from frequency domain to time domain of said first and second frequency samples by using a predefined transmission matrix and by applying to the first digital symbols a pre-processing based on Fourier Transform according to Single-Carrier Frequency-Division Multiple Access, and
transmitting a radio frequency signal carrying the digital time signal generated; and
at reception side,
receiving the radio frequency signal,
processing the received radio frequency signal so as to obtain a corresponding incoming digital signal, and
extracting the first and second digital symbols from the incoming digital signal by using a reception matrix derived from the predefined transmission matrix and by carrying out a postprocessing based on Inverse Fourier Transform according to Single-Carrier Frequency-Division Multiple Access so as to obtain the first digital symbols.

8. The method according to claim 6, wherein the reception matrix is derived from the predefined transmission matrix through a pseudo-inverse technique.

9. The method according to claim 6, wherein generating a digital time signal includes generating a digital time signal that includes a cyclic prefix followed by a time signal portion; wherein said time signal portion represents the transform from frequency domain to time domain of the first and second frequency samples; and wherein the cyclic prefix is a replica of an end portion of said time signal portion.

10. The method according to claim 1, wherein:
if the base station and the user terminal performing the radio communication are not in a multipath scenario, the second digital symbols are transmitted up to a first maximum distance between said base station and said user terminal;
if the base station and the user terminal performing the radio communication are in a multipath scenario and are configured to use a Multiple Input Multiple Output technology, the second digital symbols are transmitted up to a second maximum distance between said base station and said user terminal, wherein said second maximum distance is smaller than said first maximum distance; and,
if the base station and the user terminal performing the radio communication are in a multipath scenario and are not configured to use any Multiple Input Multiple Output technology, the second digital symbols are transmitted up to a third maximum distance between said base station and said user terminal, wherein said third maximum distance is smaller than said second maximum distance.

11. A wireless communication system including one or more base stations configured to communicate with one or more user terminals; said wireless communication system comprising a transmitter, wherein the transmitter is configured to carry out the method claimed in claim 1.

12. The wireless communication system of claim 11, wherein said wireless communication system is designed to operate based on Worldwide Interoperability for Microwave Access (WiMAX) standard.

13. The wireless communication system of claim 11, wherein the transmitter forms part of a user terminal.

14. A wireless communication system, wherein said wireless communication system is a cellular network including a transmitter of one or more base stations that is configured to communicate with one or more user terminals by carrying out the method claimed in claim 1.

15. The wireless communication system of claim 14, wherein said cellular network is configured to operate based on Long Term Evolution (LTE) standard and/or LTE Advanced standard.

16. A non-transitory, computer-readable medium including a computer-executable program,
wherein the computer-executable program when executed by a processor of a base station of a wireless communication system causes the processor
to communicate with one or more user terminals by carrying out the method claimed in claim 1.

17. A non-transitory, computer-readable medium including a computer-executable program,
wherein the computer-executable program when executed by a processor of a mobile electronic device designed to operate as a user terminal in a wireless communication system causes the processor
to communicate with one or more base stations of said wireless communication system by carrying out the method claimed in claim 1.

* * * * *